United States Patent
Peckover

(10) Patent No.: US 7,319,976 B1
(45) Date of Patent: Jan. 15, 2008

(54) INTELLIGENT AGENTS FOR ELECTRONIC COMMERCE

(75) Inventor: Douglas L. Peckover, Dallas County, TX (US)

(73) Assignee: Paradox Technical Solutions LLC, Wilmington, DE (US)

( * ) Notice: Subject to any disclaimer, the term of this patent is extended or adjusted under 35 U.S.C. 154(b) by 0 days.

(21) Appl. No.: 09/670,514

(22) Filed: Sep. 26, 2000

Related U.S. Application Data

(63) Continuation of application No. 09/235,898, filed on Jan. 22, 1999, now abandoned, which is a continuation of application No. 08/784,829, filed on Jan. 17, 1997, now Pat. No. 6,119,101.

(60) Provisional application No. 60/010,087, filed on Jan. 17, 1996, provisional application No. 60/034,395, filed on Dec. 30, 1996.

(51) Int. Cl.
*G06Q 30/00* (2006.01)

(52) U.S. Cl. ..................................................... 705/14
(58) Field of Classification Search .................. 705/26
See application file for complete search history.

(56) References Cited

U.S. PATENT DOCUMENTS

| | | | |
|---|---|---|---|
| 4,817,080 A | 3/1989 | Soha | |
| 4,984,155 A | 1/1991 | Geier et al. | |
| 4,992,940 A | 2/1991 | Dworkin | |
| 4,999,806 A | 3/1991 | Chernow et al. | |
| 4,999,833 A | 3/1991 | Lee | |
| 5,131,039 A | 7/1992 | Chaum | |
| 5,202,921 A | 4/1993 | Herzberg et al. | |
| 5,239,617 A | 8/1993 | Gardner et al. | |
| 5,283,731 A | 2/1994 | Lalonde et al. | |
| 5,299,115 A | 3/1994 | Fields et al. | |

(Continued)

FOREIGN PATENT DOCUMENTS

EP      0749081 A1    12/1996

(Continued)

OTHER PUBLICATIONS

Rik Farrow, "Securing the Web: Fire walls, proxy servers, and data driven attacks", InfoWorld, San Mateo, Jun. 19, 1995, vol. 17 Issue 25, p. 103, downloaded from ProQuest on the Internet on Jun. 20, 2006.*

(Continued)

*Primary Examiner*—James Zurita

(57) ABSTRACT

A system for electronic commerce (10) having personal agents (12 and 13) that represent consumers and providers in a virtual marketplace (28). Consumer personal agents conceal the identity of the consumer and are capable of creating decision agents (14) that shop for products and assist consumers in comparing and ranking products. Provider personal agents are capable of creating demand agents (16) that quantify demand and target specific consumers without learning the identity of the consumers. Based on data generated by the activities of the decision agents and on preference data maintained by consumer personal agents, provider personal agents can quantify current, historical, and future demand, simulate demand, and target specific consumers for advertising and other messages. Provider personal agents can cooperate with consumer personal agents to collect data about reasons for sales and lost sales and to offer consideration payments to consumers. Consumer personal agents can automatically reject unsolicited messages that do not satisfy the consumer's preferences.

18 Claims, 46 Drawing Sheets

U.S. PATENT DOCUMENTS

| | | | |
|---|---|---|---|
| 5,299,125 | A | 3/1994 | Baker et al. |
| 5,317,677 | A | 5/1994 | Dolan et al. |
| 5,319,542 | A | 6/1994 | King, Jr. et al. |
| 5,321,620 | A | 6/1994 | Tanaka et al. |
| 5,347,632 | A | 9/1994 | Filepp et al. |
| 5,355,327 | A | 10/1994 | Stent et al. |
| 5,369,577 | A | 11/1994 | Kadashevich et al. |
| 5,379,420 | A | 1/1995 | Ullner |
| 5,390,281 | A | 2/1995 | Luciw et al. |
| 5,414,838 | A | 5/1995 | Kolton et al. |
| 5,434,777 | A | 7/1995 | Luciw |
| 5,440,634 | A | 8/1995 | Jones et al. |
| 5,444,823 | A | 8/1995 | Nguyen |
| 5,473,732 | A | 12/1995 | Chang |
| 5,557,518 | A | 9/1996 | Rosen |
| 5,603,031 | A | 2/1997 | White et al. |
| 5,636,346 | A | 6/1997 | Saxe |
| 5,664,115 | A | 9/1997 | Fraser |
| 5,668,953 | A | 9/1997 | Sloo |
| 5,696,965 | A | 12/1997 | Dedrick |
| 5,701,451 | A * | 12/1997 | Rogers et al. ............ 700/1 |
| 5,717,866 | A | 2/1998 | Naftzger |
| 5,717,923 | A | 2/1998 | Dedrick |
| 5,721,827 | A | 2/1998 | Logan et al. |
| 5,721,831 | A | 2/1998 | Waits et al. |
| 5,721,832 | A | 2/1998 | Westrope et al. |
| 5,724,521 | A | 3/1998 | Dedrick |
| 5,740,549 | A | 4/1998 | Reilly et al. |
| 5,745,882 | A | 4/1998 | Bixlet et al. |
| 5,752,238 | A * | 5/1998 | Dedrick ............ 705/14 |
| 5,754,938 | A | 5/1998 | Herz et al. |
| 5,794,210 | A * | 8/1998 | Goldhaber et al. ........ 705/14 |
| 5,799,284 | A | 8/1998 | Bourquin |
| 5,809,317 | A | 9/1998 | Kogan et al. |
| 5,812,134 | A | 9/1998 | Pooser et al. |
| 5,812,135 | A | 9/1998 | Kotchey |
| 5,884,272 | A | 3/1999 | Walker et al. |
| 5,924,084 | A | 7/1999 | De Rooij |
| 5,937,163 | A | 8/1999 | Lee et al. |
| 5,961,593 | A | 10/1999 | Gabber et al. |
| 6,006,200 | A | 12/1999 | Boies et al. |
| 6,029,195 | A | 2/2000 | Herz |
| 6,029,890 | A | 2/2000 | Austin |
| 6,035,280 | A | 3/2000 | Christensen |
| 6,119,101 | A * | 9/2000 | Peckover ............ 705/26 |
| 6,193,155 | B1 | 2/2001 | Walker et al. |
| 6,286,002 | B1 | 9/2001 | Axaopoulos et al. |
| 6,366,933 | B1 | 4/2002 | Ball et al. |
| 6,636,833 | B1 | 10/2003 | Flitcroft et al. |

FOREIGN PATENT DOCUMENTS

| | | | |
|---|---|---|---|
| EP | 0855659 A1 | | 7/1998 |
| IE | S81088 | | 3/2000 |
| JP | 2005196704 A | * | 7/2005 |
| WO | WO 96/30864 | | 10/1996 |
| WO | WO 97/26612 | | 7/1997 |
| WO | WO 99/49424 | | 9/1999 |
| WO | WO 00/49586 | | 8/2000 |

OTHER PUBLICATIONS

Steve Stecklow, "Cyberspace Clash: Computer Users Battle High-Tech Marketers Over Soul of Internet—Firms Believe There is Room For Ads on Vast Network, But Risk Being 'Flamed'" Wall Street Journal. (Eastern edition) New York, Sep. 16, 1993, downloa.*

Pattie Maeis, "Agents that reduce work and information overload" Association for Computing Machinery. Communications of th ACM. New York, Jul. 1994. Vol. 37, Iss. 7; p. 30, 11pgs, downloaded from ProQuest on the Internet on Jun. 20, 2006..*

Marketing in the network economy, Ravi S Achrol, Phillip Kotler. Journal of Marketing. Chicago: 1999. Vol. 63 p. 146, downloaded from the Internet on Jul. 18, 2007 from ProQuest Direct, 30 pages.*

Chaum, D. "Security Without Identification: Card Computers to make Big Brother Obsolete", Communications of the ACM, vol. 28, pp. 1030-1044, Oct. 1985, copy supplied printed from http://digicash.support.nl/publish/bigbro.html on Apr. 3, 1997.

Chaum, D. "Achieving Electronic Privacy", Scientific American, Aug. 1992, pp. 96-101, copy supplied printed from http://digicash.support.nl/publish/sciam.html on Apr. 3, 1997.

Chavez et al., "Kasbah: An Agent Marketplace for Buying and Selling Goods", PAAM-96—Proceedings of the First International Conference on the Practical Application of Intelligent Agents and Multi-Agent Technology, Apr. 22-24, 1996, pp. 75-90, Blackpool, GB.

Cheong, Fah-Chun, "Internet Agents: Spiders, Wanderers, Brokers, and Bots", New Riders Publishing, 1996, pp. ii, iv-xiv, 1, 3-35, 183, 185-226.

International Preliminary Examination Report dated Jan. 13, 1998 (PCT/US97/01057, filed Jan. 17, 1997), 6 pages.

Connolly, Daniel W. "Proposals for Gathering Consumer Demographics", http://www.w3.org/pub/WWW/Demographics/Proposals.html, pp. 1-6.

Tassone, Dominic "The Lilypad White Paper" http://www.lilypad.net/paper.html, pp. 1-9 and 1-5.

Streams Online Media Development, "Streams Readies Release of Breakthrough Internet Media Planning and Assessment", http://streams.com/press_release.html, pp. 1-2.

Moukherjea, et al., "Visualizing the World-Wide Web with the Navigational View Builder", Computer Networks and ISDN Systems, vol. 27, Issue 6, Apr. 1995, pp. 1075-1087.

Aubrey, "Nomads of the Net", Computer Shopper, vol. 15, No. 12, Dec. 1995 (supplied copy printed from Internet, 6 pages).

"Buying Online", Farm Industry News, Primedia Intertec, Mar. 31, 1999 (supplied copy printed from Internet, 3 pages).

"YourCommand Introduces New Search Engine with Certified Privacy", Business Wire, Oct. 7, 1998 (supplied copy printed from Internet, 2 pages).

"Internet Start-Up Announces Anonymity for Children", Business Wire, Oct. 7, 1998 (supplied copy printed from Internet, 2 pages).

Steinke, "What Can E-Money Do for Me?", Network, Dec. 1997, vol. 12, No. 13, p. 71(5) (supplied copy printed from Internet, 7 pages).

"Risks of Anonymity", Communications of the ACM, Dec. 1996, vol. 39, No. 12, p. 162 (Supplied copy printed from Internet, 2 pages).

Hoffman, et al., "Building Consumer Trust Online", Communications of the ACM, Apr. 1999, vol. 42, No. 4, pp. 80-85 (supplied copy printed from Internet, 7 pages).

"CommerceNet Partners with @ YourCommand to Help Solve Privacy Problems on the Internet", PR Newswire, Dec. 3, 1998, p. 236 (supplied copy printed from Internet, 2 pages).

Machrone, "Again, the Privacy Bugaboo", PC Magazine, Apr. 6, 1999, p. 85(1) (supplied copy printed from Internet, 2 pages).

Low, et al., "Anonymous Credit Cards", Proceedings of the Second ACM Conference on Computer and Communication Security, Fairfax, Virginia, Nov. 2-4, 1994, pp. 1-10.

Hauser et al., "On Shopping *Incognito*", IBM Zürich Research Laboratory, Rüschlikon, Switzerland, Mar. 20, 1996, pp. 1-10.

Gabber et al., "How to Make Personalized Web Browsing Simple, Secure, and Anonymous", Bell Laboratories, Murray Hill, New Jersey, Apr. 5, 1997, cover page and pp. 1-14.

Gray, "Ph.D. Thesis Proposal: Transportable Agents", May 19, 1995, pp. 1-47.

Adam, et al., "Strategic directions in electronic commerce and digital libraries: Towards a digital agora", ACM Computing Surveys, Baltimore, Maryland, Dec. 1996, vol. 28, Issue 4 (submitted copy printed from Internet, 16 pages).

Ray, "Information economics and libraries in the digital age", The Bottom Line, 1996, vol. 9, Issue 2, p. 29 (submitted copy printed from Internet, 7 pages).

Camp, et al., "Token and notational Money in Electronic Commerce", Carnegie Mellon University, Pittsburgh, Pennsylvania, undated (submitted copy printed from Internet, 17 pages).

Wright, "The Law of Electronic Commerce", Second Edition, Little, Brown and Company, Boston, Massachusetts, Nov. 1996, title page and pp. ET:3-6, ET:29-31, App.1:1-28.

Jeffrey Mark Zucker, Douglas L. Peckover, and Ralph Spencer Poore, U.S. Appl. No. 09/100,671, filed Sep. 19, 1998 for "Third Party Privacy System".

* cited by examiner

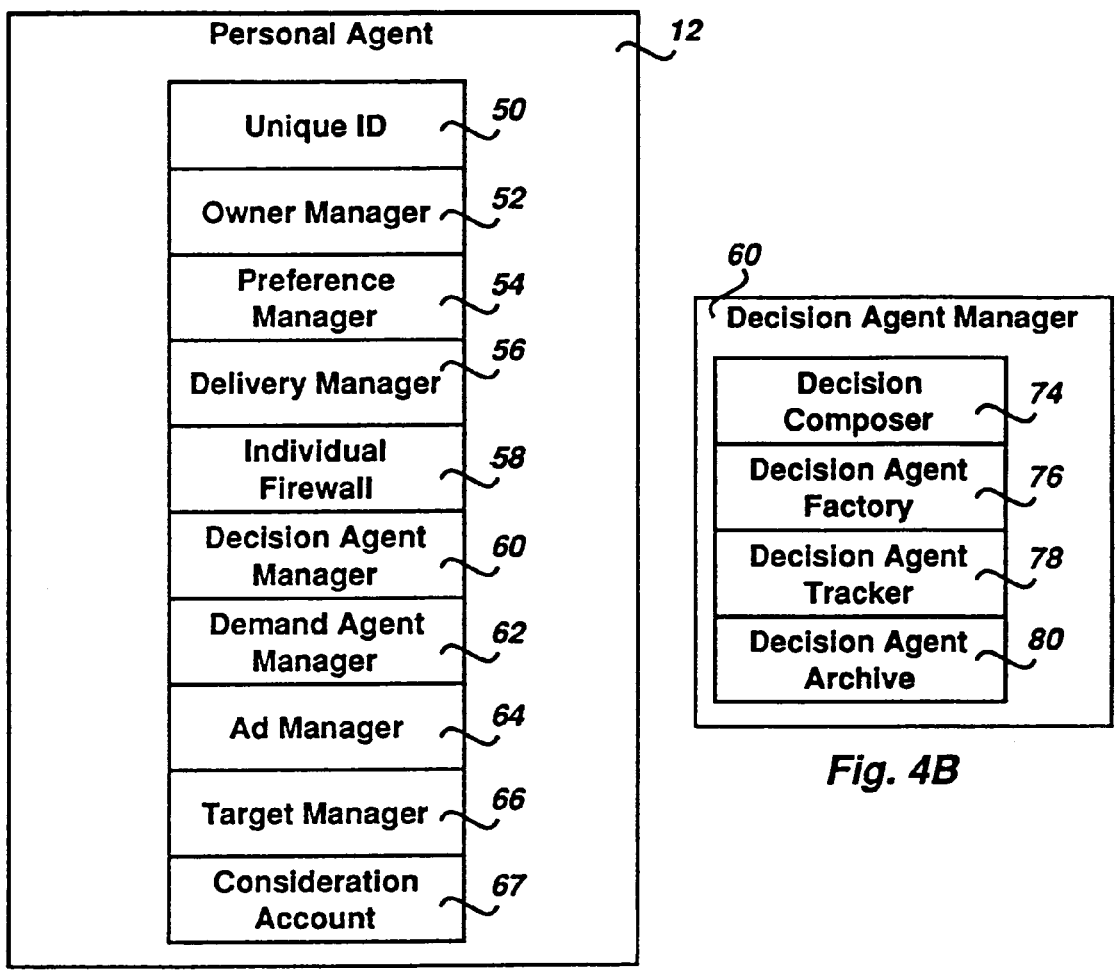
Fig. 4A
Fig. 4B
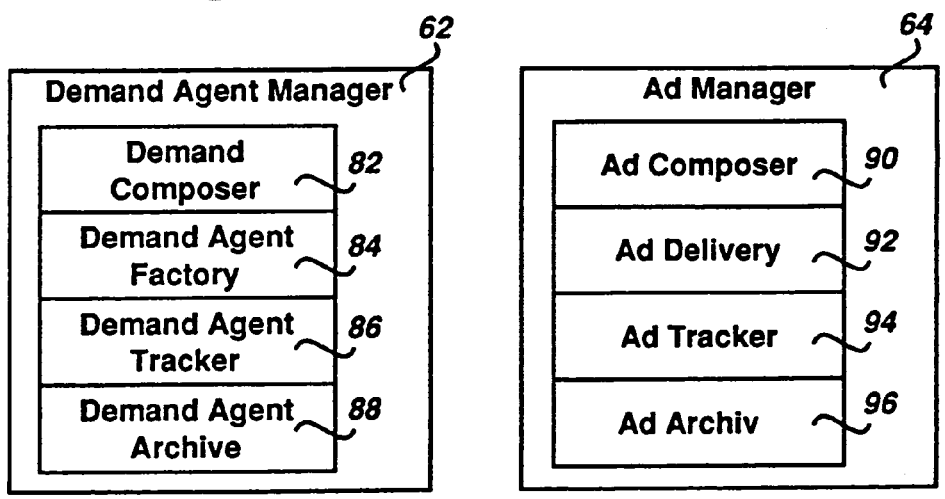
Fig. 4C
Fig. 4D

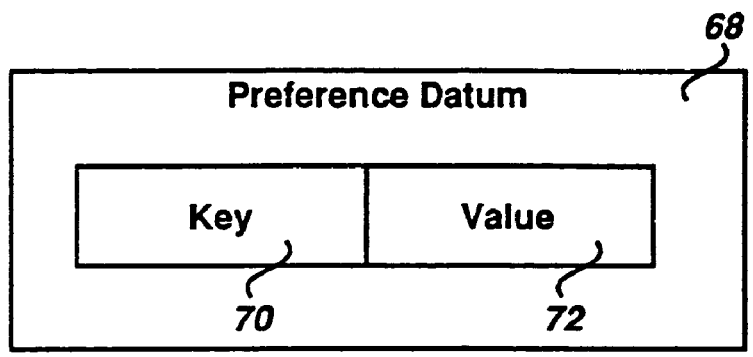

*Fig. 5A*

| Key | Value |
|---|---|
| Age | 34 |
| Homeowner | Yes |
| Gender | Male |
| Cats | interested |
| brand name 1 | like |
| brand name 2 | dislike |
| brand name 3 | neutral |
| brand name 4 | like > brand name 3 |
| brand name 5 | a favorite |
| email Consideration Fee | greater than $1.00 |
| alpine skiing | dislike |
| cross country skiing | like |
| MSG in food | dislike |
| delivered pizza | No |
| phone solicitation | never |
| favorite color | blue, red |
| health and fitness | interested |
| weight lifting | rank 1 in 10 |
| stair climbing | rank 3 in 10 |
| swimming | rank 10 in 10 |

*Fig. 5B*

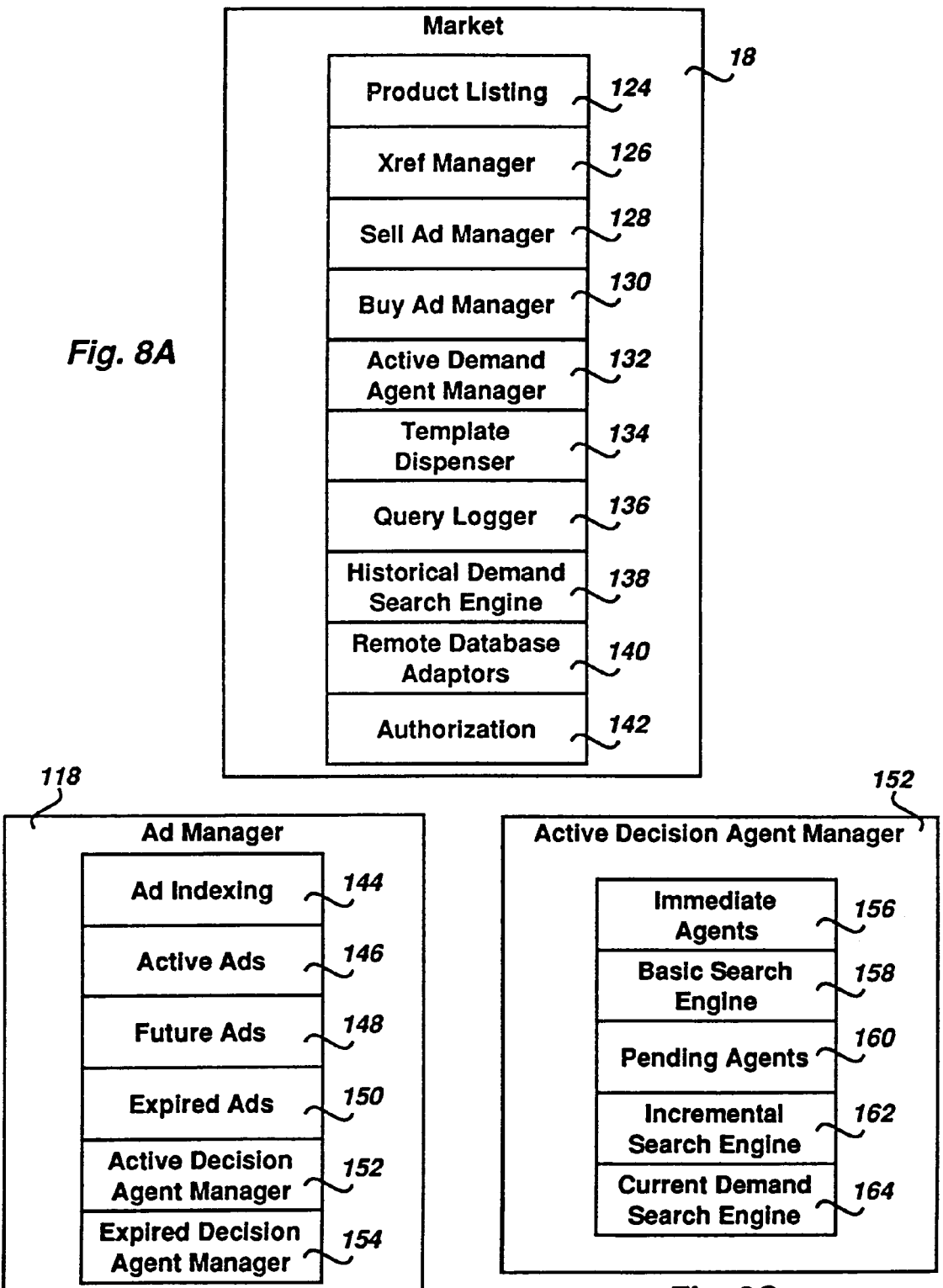

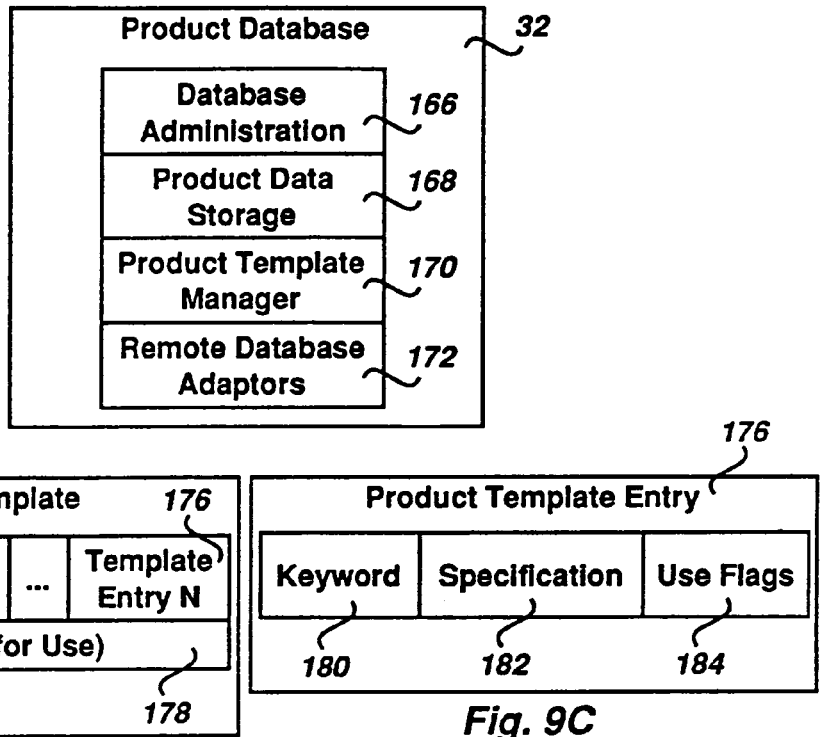

| Keyword | Specification | Use Flags | Value |
|---|---|---|---|
| Product | enumeration | search,ad | Television Set |
| Brief Description | text | ad | 27" TV |
| Brand | enumeration | search,ad | brand name |
| Model | text | search,ad | 392-43 |
| Mfr Sug Retail Price | money | search,ad | $500.00 |
| Screen Size | number | search,ad | 27 |
| Remote Control | boolean | search,ad | yes |
| Cable Ready | boolean | search,ad | yes |
| Stereo Sound | boolean | search,ad | yes |
| Cabinet Color | enumeration | search,ad | black |
| Expanded Info | text | ad | Futuristic design... |
| Image | image | ad | (picture of product) |
| rating guide Rating | rank | search | 3 of 14 |
| Endorser | text | search | endorser |

Fig. 9D

Product Search Method

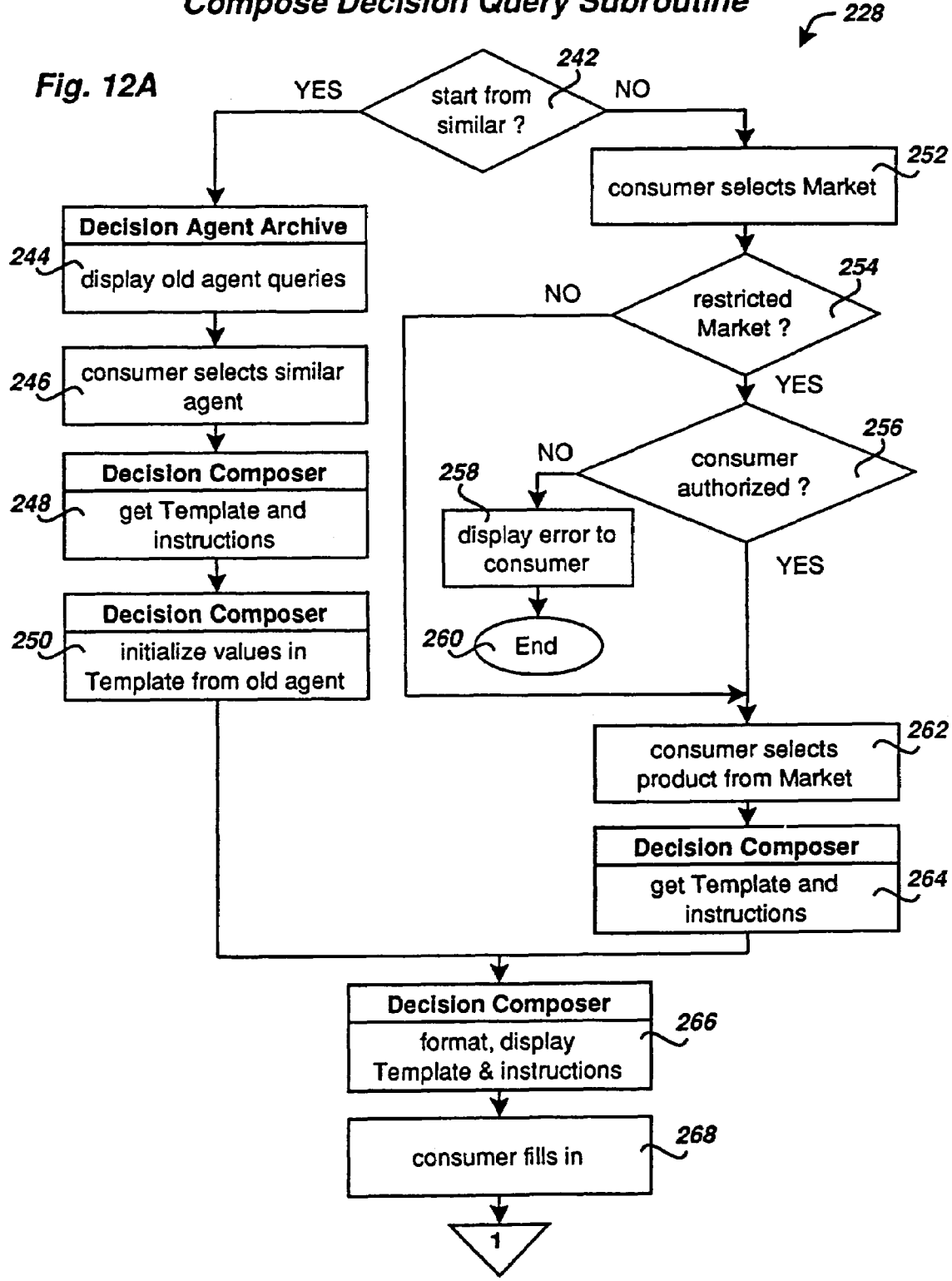
Fig. 12A — Compose Decision Query Subroutine

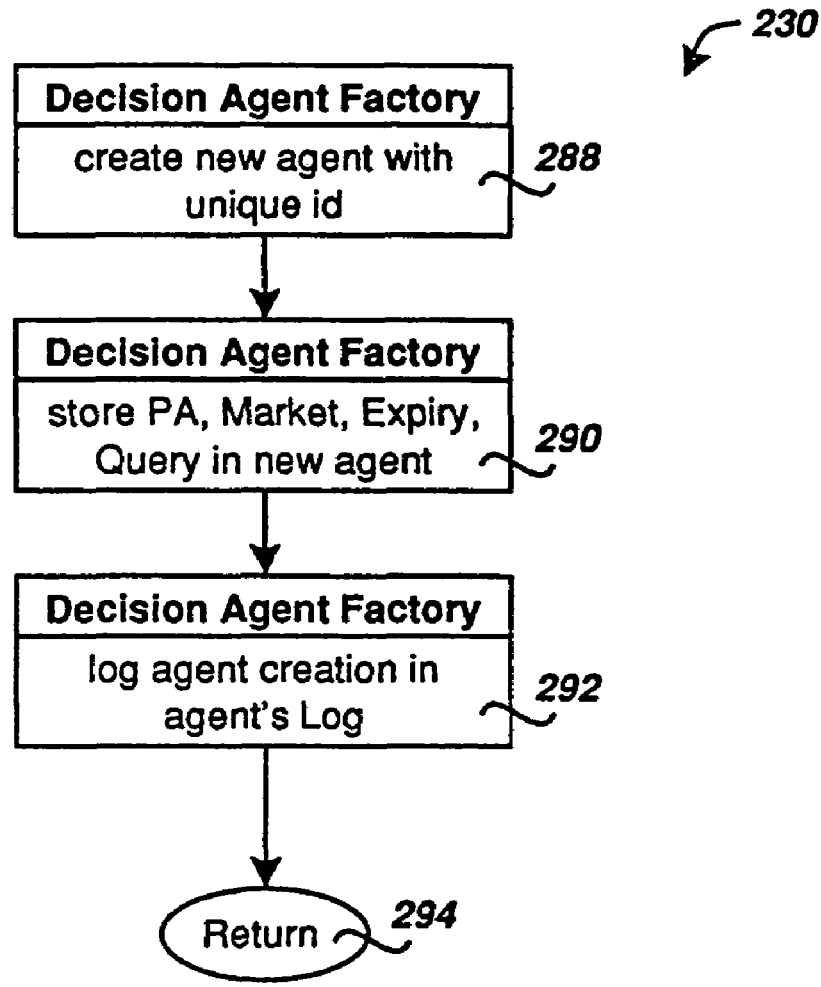

Accept New Decision Agent Subroutine

Perform Decision Search Subroutine

Perform Immediate Search Subroutine

End Decision Search Subroutine

Extended Search Subroutine

Deliver Search Results Subroutine

Expire Decision Agent Subroutine

Quantify Demand Method

Compose Demand Query Subroutine

Create Demand Agent Subroutine

Accept New Demand Agent Subroutine

Perform Demand Search Subroutine

Perform Current Demand Subroutine

Perform Historical Demand Subroutine

Deliver Demand Results Subroutine

Expire Demand Agent Subroutine

Place Ad Method

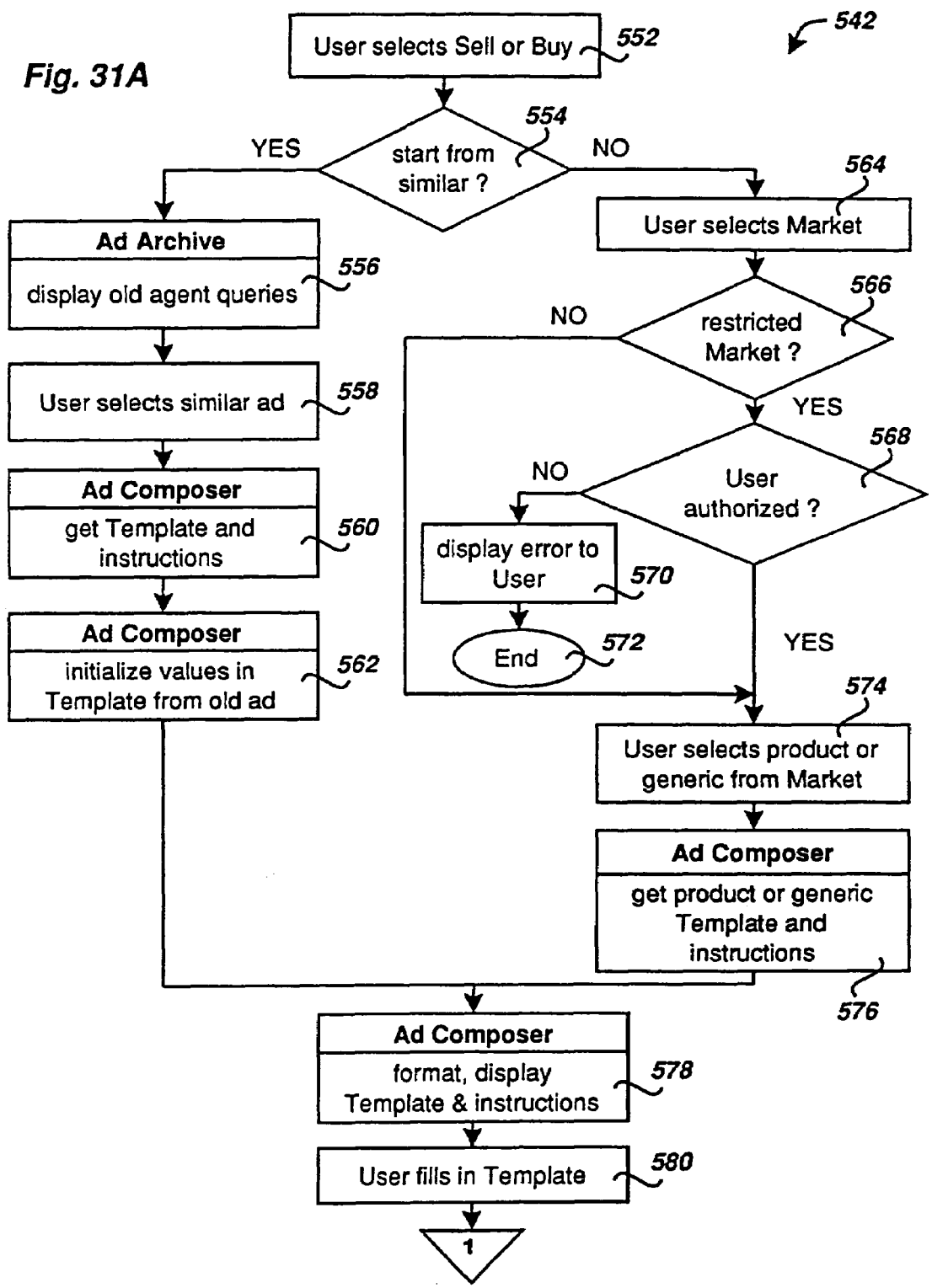
Fig. 31A — Compose Ad Subroutine

Create Ad Subroutine

Accept New Ad Subroutine

Expire Ad Subroutine

Fig. 35 Target Consumers Method

Target Personal Agents Subroutine

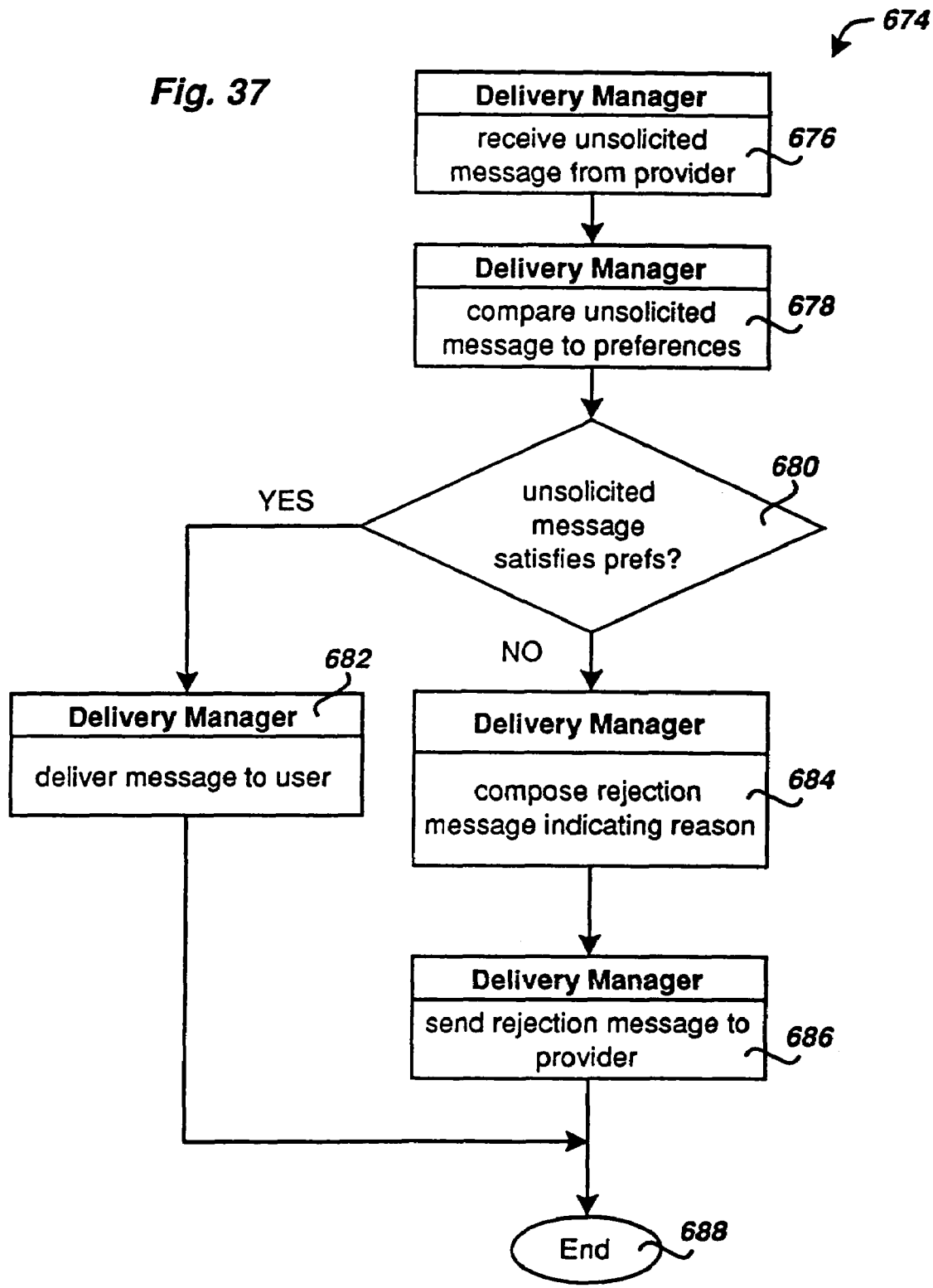

Simulate Demand Method

Replay Demand Method

```
┌─────────────────────────────────────────────────────────────┐
│ Login to Agent System                                       │
├─────────────────────────────────────────────────────────────┤
│                                                             │
│              ⎛ Agent ⎞   *Agent System Name*                │
│              ⎝ Logo  ⎠                                      │
│                                                             │
│                   Welcome to Agent System                   │
│                                                             │
│         What is a Personal Agent?  Create your own for FREE!│
│                                                             │
│                                                             │
│              If you already have a Personal Agent,          │
│                                                             │
│         enter your Agent Id: [_____]        │
│                                                             │
│            and Password: [_____]            │
│                                                             │
│              [ then Click here to enter the system ]        │
│                                                             │
└─────────────────────────────────────────────────────────────┘
```

*Fig. 39*

Search the Consumer Electronics Market

*Need detailed instructions?* <u>*Click here*</u>

(icon) Search for Consumer Electronics

Tell us what you're looking for, and let your Personal Agent immediately search for you!

Category

☐ TV  ☐ VCR  ☐ Laser Disk Player
☐ Cassette Player  ☐ Cassette Recorder  ☐ Compact Disc Player
☐ Complete Stereo System  ☐ Speakers
☐ Receiver  ☐ Amplifier  ☐ Tuner
☐ Game Systems  ☐ Clock Radio  ☐ Radio
☐ Accessories
☐ Component  ☐ Portable  ☐ Console

| | | | |
|---|---|---|---|
| Product | Brand: | | Model: |
| Location | Merchant: | | City: |
| Price Range | From: | | Up to: |

| Click here to specify additional features | Click here to start looking |

*Fig. 40*

Search the Automobile Market

*Need detailed instructions?* <u>Click here</u>

( icon )  Search for Automobiles

Tell us what you're looking for, and let your Personal Agent immediately search for you!

- ☐ Sedan
- ☐ Sport Utility
- ☐ High Performance
- ☐ 2 door
- ☐ 4 wheel drive
- ☐ Compact
- ☐ New

- ☐ Mini Van
- ☐ Mini Pickup
- ☐ Luxury
- ☐ 4 door
- ☐ Front wheel drive
- ☐ Midsize
- ☐ Used

- ☐ Full size Van
- ☐ Full size Pickup
- ☐ Convertible
- ☐ Hatch back
- ☐ Rear wheel drive
- ☐ Fullsize

| Vehicle | Make: | select | Model: | |
|---|---|---|---|---|
| Location | Dealer: | | City: | |
| Age | From Year: | | Thru Year: | |
| Price Range | From: | | Up to: | |
| Maximum mileage: | | | | |

| Click here to specify additional features | Click here to start looking |
|---|---|

*Fig. 41*

```
Compose Ad
```

Need detailed instructions? *Click here*

(icon) Compose a Sell Ad for Television Set

Details from Product Database are automatically included in ad.

| Brand name: | | Model number: | |
|---|---|---|---|
| UPC code: | | ☐ Identify seller in ad | |
| Price: | | ☐ Buyer responses to Personal Agent | |

*If neither box is checked, responses will go to Personal Agent only*

| Start date & time: | | Run through: | |
|---|---|---|---|

Enter additional text for ad. Delivered to searchers who request more info.

[ Click here to continue to next step ]

*Fig. 42*

INTELLIGENT AGENTS FOR ELECTRONIC COMMERCE

CROSS-REFERENCES TO RELATED APPLICATIONS

This application is a continuation of U.S. Ser. No. 09/235,898 filed Jan. 22, 1999 (now abandoned), which is a continuation of U.S. Ser. No. 08/784,829 filed Jan. 17, 1997 (now U.S. Pat. No. 6,119,101), which claims the priority under 35 U.S.C. § 119 of provisional application No. 60/010,087 filed Jan. 17, 1996 and provisional application No. 60/034,395 filed Dec. 30, 1996.

BACKGROUND OF THE INVENTION

1. Field of the Invention

The present invention relates to the gathering and analysis of market transaction data, where such transactions are contemplated or completed by electronic means, and specifically to the use of software agents to represent and to assist the activities of consumers and providers within an electronic "virtual marketplace".

2. Description of Related Art

The trading of goods and services is one of the basic human activities. From the first meeting of pre-historic men to trade animal skins for berries, to country fairs, to the most intricate computer-based trading of international financial instruments, the marketplace supports the survival and flourishing of our lives.

Every era has established a marketplace based on the technology of its time. Early marketplaces were locations for face-to-face meetings between people offering items for trade. The development of printed material and postal correspondence made it possible for people to trade without ever meeting in person. In modern times, a sophisticated division of labor system involving producers, suppliers, distributors, advertisers, market researchers, payment clearinghouses, customers, and many others, supports our economic lives.

The flow of goods and services, however, is not the whole story. The people and organizations on the production, distribution, sales, and marketing side 1 of trade ("providers") need to understand what goods and services are desired by buyers. The people and organizations who purchase or acquire offered items ("consumers") need to learn what goods and services are available. The flow of this market information is critical to the successful operation of a market.

A brief consideration of modern methods of commerce shows us that consumers have many ways to gather information about available goods and services. Some of these are: visiting stores; browsing catalogs; viewing advertisements on television, on billboards, and in magazines and newspapers; soliciting recommendations from friends; and receiving unsolicited mail advertisements.

We also observe that vendors and other providers use many avenues to disseminate information about available goods and services. These include: broadcast and direct advertisements; in-store displays; telephone solicitations; and so on.

Providers also try to collect information about consumers' desires and buying habits so that they can better serve their current customers and gain new ones, thereby enhancing profits. Current market research methods include: keeping current customer purchase data on file; buying or renting mailing lists of other vendors; listening to focus groups; running pilot sales in test markets, and so on.

However, even with so many pathways for information exchange, there are many disadvantages inherent in the current methods of commerce.

Disadvantages of Current Methods of Commerce

Although consumers clearly reap many benefits in today's marketplace, there are still many disadvantages that lead to consumer frustration. Here are some obvious disadvantages for consumers:

Just collecting basic information about available goods and services, their features, and their prices is tedious and time-consuming. To find a particular product or verify availability, price, and features, the consumer typically may need to visit several stores across a wide area. Another consumer may choose to spend hours on the telephone, perhaps incurring various communication charges, navigating irritating automated attendants, trying to reach a human who can answer questions. Yet another consumer will peruse stacks of catalogs and accumulated direct mail advertisements. This process wastes the consumer's valuable time, especially when the search falls.

Information isn't always available when it's needed. Consumers frequently rely on ephemeral television and radio advertisements to learn of products and special promotions. But these ads seldom arrive when the consumer is ready to make a selection. Even with print ads, the information is soon lost as the stack of newspapers is carried away for recycling.

It is very difficult for consumers to pick out items of interest from the daily bombardment of advertising. Television and radio spots, billboards, street corner kiosks, the daily newspaper, direct mail coupon packages, in-store merchandise displays, magazine advertisements and inserts, posters on and in mass transportation vehicles, storefront banners—these advertisements and a host of others vie for the consumer's attention daily. Marketing research firms use the term "impression" to denote one occurrence of a person perceiving an advertisement. Some authorities claim that an urban consumer in New York City receives up to 15,000 impressions per day! It is no wonder that consumers become desensitized to the advertising around them, and fail to see the items that are truly of interest.

Consumers have little or no control over the timing or presentation of advertising. They can't arrange to receive information at a convenient time. Telephone solicitors always seem to interrupt dinner. The radio advertisement for an anticipated concert is on the air during "drive-time"—when the consumer is driving and can't write down the phone number of the ticket agency. Consumers can't even choose a preferred format for receiving advertisements. If the merchant advertises only in broadcast media, the consumer won't be able to find the information in today's newspaper. Sorting through the barrage of direct mail may require more time than the consumer can allocate to this task, and so the consumer discards a potentially useful notice.

A consumer usually receives no direct benefit for inspecting a provider's advertisements, except for the information itself if the advertisement is relevant. Occasionally, providers and marketing research firms give consumers a small fee or gift in return for participating in a survey. This is called "paying a consideration." However, there are few opportunities for consumers to receive considerations, and no way for consumers to seek out providers that are willing to pay considerations.

When a consumer has an immediate need for product or service information, it may be nearly impossible to gather the information quickly. This is especially true when the consumer doesn't know where to look for the information, or doesn't have quick and convenient access to sources of information.

Many consumers rely on the recommendations or evaluations of third parties to help them make buying decisions. Consumer rating guides and endorsers provide this kind of information, but the information is not always available at the time or place of the consumer's purchase decision.

Providers, too, have their share of frustrating difficulties using the current methods of commerce. Some of the disadvantages for providers are:

Much of the demographic data from traditional sources is out-of-date or incorrect. Providers frequently buy or rent magazine subscription lists and other providers' customer lists. However, a name on a list is not necessarily removed when the individual no longer subscribes or is no longer a customer. It is expensive to examine lists for data entry errors, duplicates, minor spelling variations, and so on. When a provider exchanges a list with another provider, who exchanges with a third provider, who exchanges with yet another provider, a provider can easily end up with a list that contains a high proportion of names of consumers who are not at all interested in the provider's goods.

It is expensive to target advertisements to specific customers. As mentioned above, mailing lists frequently contain a high percentage of names of uninterested customers, yet buying or renting mailing lists is costly. Controlled circulation magazines, where potential subscribers complete a qualification form to receive a (usually complimentary) subscription, don't always yield truly qualified names, since there typically is no mechanism to verify the information that the potential subscribers report.

It is difficult for a provider to deliver information directly to a consumer who is ready to buy. Even if providers could easily identify those consumers, there is a time lag for the delivery of pertinent information. For example, direct mail requires planning weeks in advance. An in-store salesperson can assist the consumer, but only if the consumer has previously learned that the store carries suitable products. Providers need a mechanism for delivering information to consumers precisely at the moment when it is most helpful.

It is difficult and costly to personalize information to a consumer. Most consumers are unimpressed by feeble attempts at personalization such as form letters that read "Dear MR. JONES JOHN, The JOHN FAMILY may have already won . . . "

It is especially difficult to determine what specific interests a particular consumer has. Most data of this nature must be inferred from subscription lists, member lists, spotty purchase history, etc. It is rare that a consumer directly informs a provider of a particular interest.

Providers have little control over the timing of the delivery of their printed advertising messages. The use of special mailing classes for bulk mail to reduce mailing costs results in erratic delivery times. In the United States, providers using Third Class mail cannot pinpoint even the week that the mail will be delivered. For example, sometimes consumers don't receive a special sale notice until after the sale date. Also, mailed notices must be prepared well in advance to take advantage of bulk mail, so the provider's quick response to market conditions is impeded.

It is difficult for providers to verify delivery of their messages. Did the direct mail piece get read by the consumer? Was it even delivered? Did interested consumers view the television advertisement? How many consumers noticed the billboard? How many consumers read the newspaper or magazine notice? Market survey and research firms attempt to measure delivery, but their methods are necessarily statistical since they can't survey every household in the target area. Even with their limited usefulness and contested accuracy, these services are expensive.

The low success rates of direct mail (typically 2% to 4%) wastes much of the natural resources for printing and distributing the mailing, as well as wasting the money for preparation of the direct mail. Huge amounts of unsolicited mail end up in the wastebasket. Some authorities estimate that up to 70% of unsolicited mail is never opened.

It is expensive and cumbersome for providers to offer "considerations" to consumers. A consideration is a payment or award of some value to a consumer in return for a consumer viewing an advertisement or participating in a marketing survey. Sometimes considerations are given to encourage the consumer to an action, as when marketing research firms include a dollar bill in an unsolicited direct mail survey. Not only is there the cost of the consideration itself, there are the additional costs to the provider of identifying potential consumer recipients and preparing some means of delivery such as direct mail.

Providers have no practical way to get real-time (immediate) feedback on the success of their promotions. Marketing research on a particular product typically requires at least several weeks or months and is very costly. This leads marketers to test only large product groups and discourages them from gathering data about individual products.

Providers typically have no way to collect information about why a consumer purchased an item. Providers run special promotions, and consumers buy things, but it is arduous, tedious, and error-prone to draw the connection. It is difficult to judge the effects of promotions targeted to different sets of consumers, because providers don't know which promotion persuaded the consumer to buy.

Providers have few ways to collect information about "lost sales", or why a consumer did not purchase an item. If lost sale data could be determined, a provider could better tailor offers to the consumer's needs and desires.

Providers attempt to measure and predict "consumer demand" to help determine the number and mix of products and services to offer and the prices to charge. Consumer demand is a measure of the number of consumers who want to purchase a product or service. It is typically calculated on a large scale with statistical models using historical purchase data. Demand can only be calculated based on purchases that have already occurred, since providers have few mechanisms to determine what new items consumers might want, or at what price consumers would buy. Demand information would be much more useful if it could guide providers into new territory, or if it could warn providers that a planned product would likely have few buyers or is being offered at an unsuitable price. With more accurate demand information, providers could plan inventories that are better matched to consumer desires, resulting in fewer markdowns.

Providers have no mechanism for using actual demand data to simulate consumer demand under varying conditions. It would be useful if providers could run "what if" scenarios to see the effects on demand of different prices, varying packaging, special discounts, etc. Using actual historical and current data to calculate this "theoretical demand" would be more accurate than using estimated or aggregate data.

The Promise of Electronic Commerce

The unexpected and explosive growth and popularity of the Internet in recent years has opened a new avenue for commerce—"electronic commerce". Electronic mail ("e-mail"), the delivery of messages via electronic communication networks, has become a major notification mechanism, especially for point-to-point communications. Numerous "bulletin board" systems and the USENET newsgroup distribution network are popular broadcast notification systems. But it is the advent of the World Wide Web, frequently referred to as "the Web", that has excited the imagination of thousands of consumers, providers, and entrepreneurs. The Web conveniently delivers text, images, and audio clips to individual users. In fact, the Web can be used to distribute any sort of information that can be represented in a computer data file.

The popularity of the Web has encouraged the establishment of many Internet Access Providers (LAPs), who provide communication access to the Internet for individuals and organizations; and Internet Service Providers (ISPs), who provide various services via the Internet, such as e-mail delivery, Web site hosting, search engines, and "chat" areas. This communications and information infrastructure continues to grow at a prodigious rate. With so many individuals and organizations now having convenient and inexpensive communications access, the Internet offers a promising base for a new mode of commerce.

Electronic commerce addresses many of the disadvantages of traditional commerce. It is convenient and inexpensive to prepare and deliver e-mail to specific persons or groups of persons. Many computer systems are repositories for immense databases that are useful for commerce, and the global communication network provides a means for accessing that data. Personal computer systems and specialized software are now enabling consumers to view online product catalogs and other information that providers publish on the Web. A multitude of researchers and organizations are working out the details of payment mechanisms to allow secure monetary transactions across the Internet.

The Disadvantages of Today's Electronic Commerce

Even with the colossal potential of the Internet, there are still a number of problems to be solved to support the establishment of a viable virtual marketplace, especially regarding the collection and exchange of market information. The electronic form of commerce doesn't address all of the problems of traditional commerce, and it raises a number of new difficulties.

Here are some of the disadvantages, from the consumer's point of view, of the electronic form of commerce:

Most search engines (Web sites that implement a capabilty for searching a database of information) are generic. They use general words as search keys, whereas consumers would benefit from information that is categorized by brands, product names, product category, store names, etc. Even though search engines are much faster than physical store visits, the search process is still tedious and prone to error.

Using search engines for comparative shopping is very slow. Search engines return pointers to information sites, not the actual information. Search engines frequently return thousands of "hits", or items that partially match the search request. Consumers must sift through these hits, determine which ones are likely to be truly of interest, and contact the individual Web sites to collect the product information.

Consumers find comparative shopping tedious because every Web site has its own format for information. It is difficult to automate comparative shopping because of the inconsistent and non-standardized data formats.

It is difficult for consumers to find independent opinions about product quality, comparative features, and how a provider treats other consumers.

Every search starts from scratch. Even though some search engines now have the capability to narrow a search during an episode of use, each episode of searching starts anew requiring the searcher to enter all of the relevant keywords again. The preferences of the consumer are not retained between uses of the search engine.

Consumer searching is not private. The search engine can collect data about who is searching and the keywords of their search. Many Web sites maintain "cookies" or "passports", that is, files that contain information about the consumer who is searching. In effect, the consumer's searching and decision making is exposed to public view.

Dealing directly with the provider exposes the consumer's identify and other data to the provider. When the consumer orders or purchases a product from a provider's Web site, the consumer must reveal name, delivery address, credit card data, etc. Even if the consumer is merely inspecting the information available on a Web site, the site's owner can still collect data about the consumer from the consumer's browser software.

Non-technical consumers may experience frustration in trying to construct appropriate queries for search engines. The syntax rules for queries commonly use Boolean logic and special separator characters. Even when the use of one search engine is mastered, the consumer must learn yet another set of rules for constructing queries for another engine, since the various engines use different Syntax rules for their queries.

Once a search engine successfully delivers a promising Web address (known as a "URL" for Uniform Resource Locator), the consumer may be disappointed to find that the URL is no longer valid. Thousands of Web pages are published and withdrawn daily, and the search engines are not always informed of the changes. Web pages customarily contain references to other Web pages ("links"), and a link is not always updated when the target URL changes, especially if the target URL names a page that is published by another entity. These "broken URLs" refer to Web pages that no longer exist or have moved to another address, so the consumer can no longer reach the information.

The style of presentation is still controlled by the provider. The consumer has no useful mechanism to request, for example, only summary information about products. The avenue of presentation is also fixed. If the data is available on the Web, it must be accessed via the Web; the consumer typically cannot arrange to have the data delivered, for example, via pager, facsimile, or cell phone display.

Usually there is no direct benefit to a consumer (a "consideration") for viewing an electronic advertisement, although some companies have proposed paying consumers for reading advertisements via e-mail or other electronic delivery.

Consumers have few means for publishing their own electronic advertisements for buying or selling. Most newsgroups do not accept advertisements. Even in the special newsgroups that do accept advertisements, it wastes bandwidth since most readers of the newsgroups-won't be interested in a specific advertisement.

Electronic commerce also presents a number of difficulties for providers, especially in the areas of deploying advertising and gathering "market intelligence." Some of these disadvantages are:

Many providers are reluctant to advertise on the Internet because of software agents that make recommendations based on price alone. For example, the BargainFinder service, a research project of Andersen Consulting, that gathers pricing data on audio compact disks has been blocked from many providers' Web sites. Without the opportunity to present other features that justify a higher price, higher-priced providers would lose sales or be forced to lower their prices (and erode their retail margins).

Consumers may not be aware of a provider's Web site. A provider typically advertises the existence of a Web site via traditional means, driving up the cost of maintaining a Web presence.

Very few tools have emerged to help providers judge the effectiveness of their Web sites. For example, providers cannot gather enough information to calculate market share, since the statistics associated with competitor's Web sites are not publicly available.

Providers have little control over the search engines that consumers use to locate products, beyond carefully choosing a few keywords. They can't choose to emphasize different aspects of their products depending on the origin of the request.

It is impossible to collect useful demographic data about many online consumers, because consumers frequently use pseudonyms to disguise identity.

Due the lack of useful demographic data about online consumers, there is little guidance in targeting advertisements to potential customers.

Even though it is easier to personalize e-mail, how does the provider determine the target audience? Many online users summarily reject unsolicited e-mail advertising, disparagingly called "spam".

Many Web sites now have the capability to generate Web pages ("content") on the fly, but it is difficult for the Web server to obtain enough data about the requester to personalize the content in a useful way.

"Banner" advertisements placed on popular Web sites have not been particularly successful. Many online users don't "click-through" the banner to the more extensive advertiser information, because the placement of such banners is not finely targeted. Some Web activity statistics indicate that only one and one-half to three and one-half percent of users click-through.

Providers lose the goodwill of potential customers when they place advertisements in regular newsgroups.

Providers still have few ways to gather real-time feedback on special promotions or specific products.

Perhaps most critically, providers still have no method to derive useful market intelligence from the vast activity online. Providers still can't determine why consumers accept or reject offers, they can't calculate consumer demand, and they can't simulate demand based on actual demand data.

Other Electronic Commerce Systems

Much of the research relating to electronic commerce has been directed towards designing and implementing secure online money transactions. For example, U.S. Pat. No. 5,557,518 entitled "Trusted Agents for Open Electronic Commerce" issued 17 Sep. 1996 describes a system wherein a customer and a merchant can exchange electronic merchandise and electronic money by using trusted electronic agents. Even when this crucial aspect of electronic commerce is satisfactorily resolved, there remains the challenge of establishing a mechanism for the presentation, gathering, and exchange of market information in a way that encourages and supports broad participation in the online market. Of the current mechanisms related to online market information, most tend to fall into two categories: search engines, and various kinds of software or electronic agents.

Various problems with search engines have already been mentioned. Each engine has a different syntax and operation, making them error-prone and tedious to use. The information that engines return may be out of date or just plain incorrect. Search engines don't generally categorize information in a format that is handy for consumers, since they cater to general information seekers. Searches cannot make use of personal information about users, since the search engine has access only to the specific query data entered by the user.

A software agent is a software entity that is capable of performing certain delegated electronic actions (including holding information) on behalf of a user or another agent. An IBM white paper, "The Role of Intelligent Agents in the Information Infrastructure" (Gilbert, et. al., IBM Corporation, undated; also published on the Web at URL http://www.networking.ibm.com/iag/iagptc2.html; also hyperlinked from http://www.raleigh.ibm.com/iag/iaghome.html) describes three dimensions along which intelligent agents may be measured: agency, intelligence, and mobility. "Agency is the degree of autonomy and authority vested in the agent . . . Intelligence is the degree of reasoning and learned behavior . . . Mobility is the degree to which agents themselves travel through the network . . . " (IBM, italics author's). Software agents can be further classified along the dimension of mobility into three broad categories according to their location of execution and location of data reference: mobile agents, "wandering" agents, and local or static agents.

True mobile agents are software entities that can electronically move from one computer system to another. The software program of a mobile agent actually executes on the target computer system. Although some technology to support mobile agents is available (for example, Sun's Java and General Magic's Telescript), they have not been successful, partly because many computer "firewalls" block the entry of mobile agents for security reasons, and because the agents must be capable of operating on a number of specific kinds of computers.

A wandering agent is a software entity that resides within a single computer system and "visits" or communicates with other computer systems, frequently via the Internet. Wandering agents are being used successfully to map the Web, gathering the data that is used in the internal indexes of search engines. However, these agents are very slow in operation, especially when there are thousands of sites to visit, and some wandering agents may be blocked from accessing some sites (as the BargainFinder agent has been). As described in "Internet Agents: Spiders, Wanderers, Brokers, and 'Bots'" (Cheong, Fah-Chun, New Riders Publishing, 1996), wandering agents are also used for various Web maintenance tasks and for Web mirroring. Cheong lists and describes many instances of wandering agents. The following list of wandering agents was compiled on 26 Dec. 1995 from Appendix G of Cheong. The purpose of each agent is excerpted by the inventor from short descriptions in Cheong.

| Name | Purpose |
|---|---|
| ASpider (Associative Spider) | searches for keywords |
| Arachnophilia | collect documents |
| Aretha | (none given) |
| CS-HKUST WWW Index Server | Resource Discovery, validate HTML |
| ChURL | URL checking |
| Checkbot | (none given) |
| EIT Link Verifier Robot | verify links |
| Emacs W3 Search Engine | Resource Discovery |
| Fish Search | Resource Discovery |
| GetURL | validate links, mirroring |
| HTML Analyzer | check validity of Web servers |
| HTMLgobble | mirroring |
| Harvest | Resource |
| InfoSeek Robot | collect information for database |
| JumpStation Robot | Resource Discovery |
| Katipo | look for changed documents |
| Lycos | information retrieval and discovery |
| MOMspider | maintenance of distributed hypertext |
| Mac WWWWorm | keyword searching |
| NHSE Web Forager | Resource Discovery |
| NIKOS | Resource Discovery |
| NorthStar Robot | textual analysis, indexing |
| Open Text Corporation Robot | (none given) |
| Peregrinator | indexing |
| Python Robot | (none given) |
| RBSE Spider | Resource Discovery |
| SG-Scout | Resource Discovery |
| Scooter | Resource Discovery |
| Spry Wizard Robot | Resource Discovery |
| TITAL | Resource Discovery |
| Tarspider | mirroring |
| Tcl W3 Robot | validate links |
| TkWWW Robot | find logically related pages |
| W4 (World Wide Web Wanderer) | measure growth in Web |
| WM32 Robot | Resource Discovery, validate links |
| WWWW - World Wide Web Worm | indexing |
| WebCopy | mirroring |
| WebCrawler | Resource Discovery |
| WebLinker | traverses Web converting URN->URL |
| WebWatch | validate HTML |
| Webfoot Robot | (none given) |
| Weblayers | validate, cache, maintain links |
| Websnarf | mirroring |
| Webwalk | Resource Discovery, validate links, mirroring |

A local or static agent is a software entity that operates within a single logical computer system, accessing data local to that system. Clearly this kind of agent is of limited usefulness for the electronic marketplace, since, a local agent would not have access to the variety of data that is necessary for a thriving marketplace. However, if there were a mechanism to incorporate data from many sources and to provide access to a broad base of users, local agents could be extremely useful.

These technologies have not been used to collect market information that providers can use to quantify consumer demand or to help gain customers at reduced cost. Consumers are hesitant to use some of these technologies because of privacy concerns. There isn't a practical mechanism for the user to instruct an agent to "keep looking" if the immediate search fails or is only partially successful. Although these technologies may be useful for the electronic marketplace, additional mechanisms are required for practical, ubiquitous electronic commerce.

The Fundamental Problems to be Solved to Enable Electronic Commerce

An electronic marketplace, just like a traditional marketplace, must support the basic process of commerce: offers to sell or buy are made, offers are accepted, and considerations (payments) are paid. If the basic process does not work, there is no marketplace. A viable marketplace must also address side-effects of commerce such as issues of security, privacy, and confidence or trust; otherwise, even if the basic process works, consumers and providers will not feel comfortable enough to participate in the marketplace.

A practical and viable electronic marketplace involves the exchange of market information, as well as the more obvious trading for goods and services. From a consumer's point of view, shopping is a means of gathering data about goods and services offered. This data is used by the consumer to compare and rank offerings and to make decisions about purchases. From a provider's point of view, consumer shopping is an opportunity to gather data about consumer needs and interests. This data is used by the provider to improve product and service offerings.

For consumer, the fundamental problems relating to the flow of market information in electronic commerce, still to be solved, are:

Consumers need help in gathering information about available goods and services, quickly and with a minimum of fuss;

Consumer privacy needs to be assured while gathering information about available goods and services; and Consumers need a mechanism for ongoing, autonomous searches for information about available goods and services, searches that continue even when the consumer is not "on-line".

For providers, the fundamental problems relating to the flow of market information in electronic commerce, still to be solved, are:

Providers need to target advertising information to truly interested consumers without disturbing the privacy of those consumers;

Providers need to be able to quantify consumer demand, both offline and in real-time, using historical and current data;

Providers need to be able to determine reasons for sales and lost sales; and

Providers need a source of more accurate market data to serve as input to present and yet-to-be-developed market analysis methods.

Solutions to these problems for providers must be cost-effective.

OBJECTS AND ADVANTAGES

The principal object of the present invention is to provide a system that facilitates the gathering and exchange of market information in support of electronic commerce. The attainment of this object has many advantages for both consumers and providers.

Several objects and advantages of the invention for consumers are the following.

- A consumer's identifying and private information is protected from disclosure as the consumer gathers information about available products.
- Consumers can identify suitable products more easily, with less expenditure of effort, because the product information is presented in a consistent manner.
- Consumers can identify suitable products more quickly.
- Consumers can use advocate recommendations and evaluations in deciding between competing products.
- Consumers have more control over the presentation of advertising information. They can control what information is permitted to be delivered, when the information is delivered, and what devices are used for delivery.
- Consumers have a standardized mechanism for receiving considerations from advertisers in exchange for allowing delivery of advertisements and other provider information.
- Consumers can launch ongoing searches for products, and the searches can continue even when the consumer is not online.
- Consumers use search engines that have data that is more up-to-date.
- Consumers access search engines that are easier to use, especially for non-technical users.
- Consumers can place their own want-to-buy and want-to-sell advertisements.

Several objects and advantages of the invention for providers are the following.

- A provider's privacy is protected while searching for potential customers or surveying competitor's offerings.
- Providers can use demographic and preference data that is more up-to-date.
- Providers own and control the information about the products they offer, even when the information resides within the system contemplated by the invention.
- Providers can directly contact more consumers that are ready to buy.
- Providers can target consumers more economically.
- Advertising may have higher success rates since the targeted consumers have expressed an interest in the product.
- Providers can personalize special offers based on previous buying habits and future intent of the consumer.
- Providers have a mechanism for quantifying consumer demand.
- The mechanism for quantifying consumer demand is based on actual consumer buying data, both historical and current.
- The mechanism for quantifying consumer demand uses data based on individual buying decisions, not merely aggregate or estimated data.
- Providers can quantify demand in real-time.
- Providers have a mechanism for discovering the reasons for lost sales.
- Providers can provide a consideration to consumers for viewing advertisements and other notices.
- Providers can receive feedback in real-time about the success of promotions.
- Providers have access to market data based on individual consumer needs that can be used to simulate demand in various scenarios.

Several objects and advantages of the invention for all participants in the system are the following.

- A robust and thriving electronic marketplace may lower the amount of wasted paper and energy for the delivery of printed matter.
- The system provides results faster than mobile or wandering agents.
- Many industries and providers can participate in the system.
- Information used by both consumers and providers is more up-to-date.

Referring to the fundamental problems of the flow of market information in electronic commerce, the fundamental objects of the system for consumers are:

- to assist consumers in gathering market information quickly and easily;
- to protect consumer identity and private information while gathering market information; and
- to assist consumers in performing ongoing searches.

Referring to the fundamental problems of the flow of market information in electronic commerce, the fundamental objects of the system for providers are:

- to assist providers in targeting information delivery to interested consumers;
- to assist providers in quantifying consumer demand, both offline and in real-time, using historical and current data;
- to assist providers in determining reasons for sales and lost sales; and
- to assist providers by furnishing a huge base of accurate market data based on actual consumer activity to serve as input to present and future market analysis methods; and
- to assist providers in gathering and analyzing market information in a cost effective way.

Further objects and advantages of this invention will become apparent from a consideration of the drawing and ensuing description.

BRIEF DESCRIPTION OF THE DRAWING

The invention is described in greater detail below with reference to the attached drawing. In the drawing, closely related figures have the same number but different alphabetic suffixes.

FIGS. 4A-4D illustrate the functional components of Personal Agents.

FIG. 5A illustrates the data components of a Preference Datum.

FIG. 5B shows example Preference Data.

FIGS. 8A-8C illustrate the functional components of Markets.

FIGS. 9A-9C illustrate the functional and data components of a Product Database.

FIG. 9D shows example Product Template Entries with example values.

FIGS. 12A-12B comprise a flow diagram representation of a method for composing a Decision (product search) query.

FIG. 13 is a flow diagram representation of a method for creating a Decision Agent.

FIGS. 31A-31B comprise a flow diagram representation of a method for composing an Ad.

FIG. 37 is a flow diagram representation of an overall method for rejecting unsolicited messages.

FIG. 39 is a schematic representation of a Web page used to "login" to a agent system.

FIG. 40 is a schematic representation of an example Web page used to specify search criteria when composing a Decision query in an example consumer electronics Market.

FIG. 41 is a schematic representation of an example Web page used to specify search criteria when composing a Decision query in an example automobile Market.

FIG. 42 is a schematic representation of an example Web page used when composing an advertisement for a television set.

SUMMARY OF THE INVENTION

Figure 1:
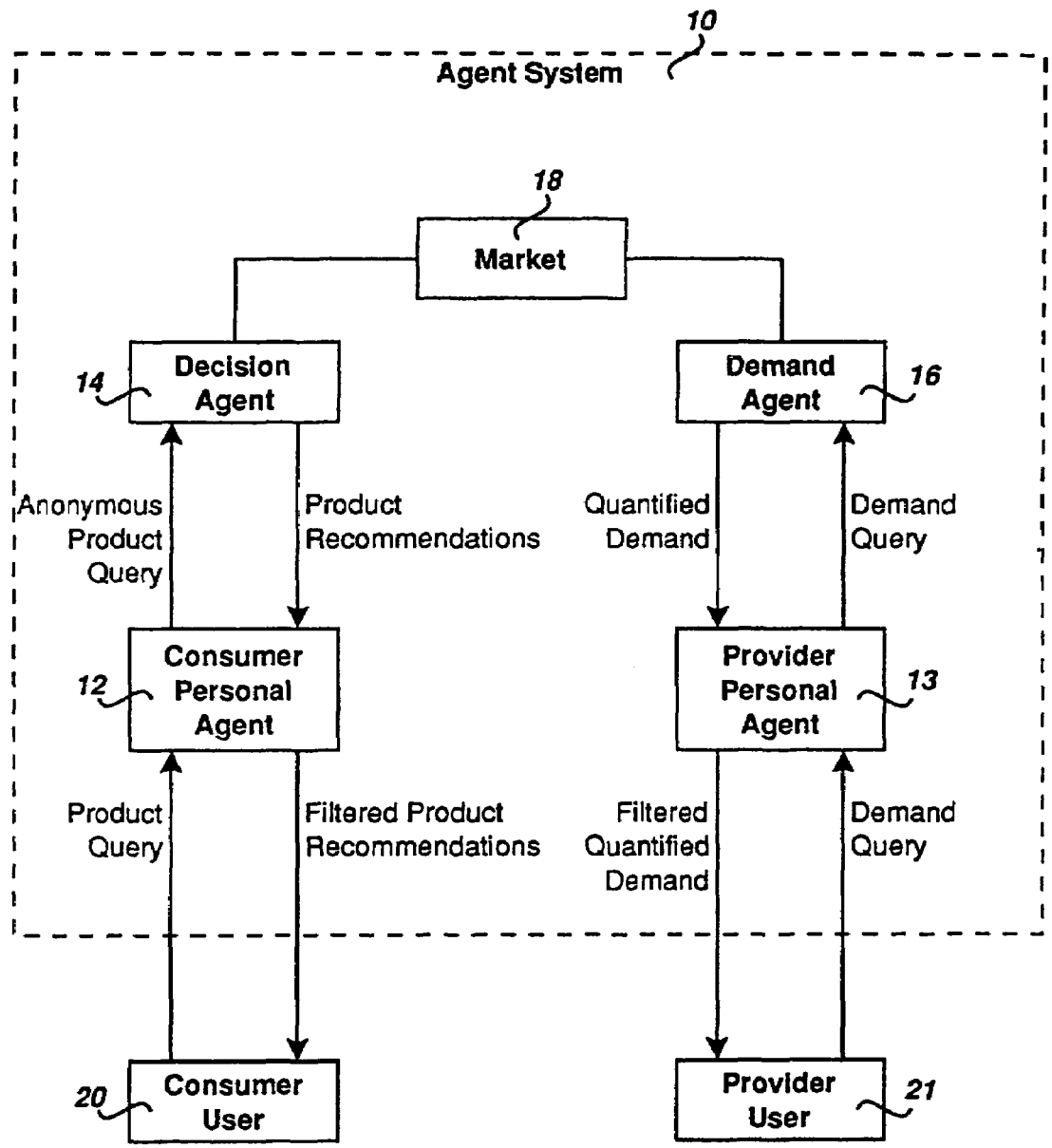
FIG. 1 is a schematic diagram showing the basic interaction of several kinds of agents within an agent system.

The present invention contemplates a system for enabling the collection of market information, especially data needed to quantify various kinds of consumer demand, while protecting the particular identity and privacy of consumers. Consumers, because their identity is protected, feel secure in using the system, thereby generating market data as a by-product of their shopping activities. Providers can query and analyze this market data in many ways, including the calculation of actual instantaneous and historical consumer demand for products and product categories. This kind of market data is not available by any other means.

The system comprises a "virtual marketplace" in which various kinds of agents represent human owners. Although the system has access to data outside its boundaries, the system behaves as a logically single system. The agents of the system need not travel outside the system to perform their tasks.

Consumers and providers both may place sell and buy advertisements (ads) in the marketplace. Providers can target groups of consumers to receive special messages such as special offer ads.

Consumers and providers are each represented in the system by Personal Agents. A Personal Agent stores and learns the preferences of its human owner and arranges for delivery of messages to the owner according to the owner's desired delivery times and desired delivery devices. The Personal Agent ensures that private or identifying data about the owner is never revealed without authorization to other agents in the system.

Consumers use Decision Agents to gather the information that helps consumers make purchasing and usage decisions. Decision Agents can search for ads meeting various criteria, and order the matching ads according to the consumer's preferences.

Providers use Demand Agents to assist with market analysis of various kinds of demand and to target consumers. Demand Agents can target consumers based on consumer preferences, demographics, and shopping activity.

DESCRIPTION OF THE PREFERRED EMBODIMENT

Within this description, the term "product" is understood to include all kinds of merchandise, tangible and intangible goods, services, intellectual property, information, electronic merchandise, etc. whether offered for a price, offered for barter, or offered for free.

The term "consumer" is understood to mean a user of the system who is acting to find information about or purchase products offered by other users of the system. A consumer is typically an individual. The term "provider" is understood to mean a user of the system who is acting to present information about products and/or sales offers to other users of the system. The term "provider" includes manufacturers, retailers, wholesalers, distributors, etc. When the term "consumer" is used in this description, it is understood to mean a user of the system acting in the role of a consumer. When the term "provider" is used, it similarly is understood to mean a user of the system acting in the role of a provider. The term "user" is understood to apply in a context where the particular role is unimportant.

Agent Interaction

Referring now to the drawing, and in particular to FIG. 1, an Agent System 10 is shown schematically, together with some of its internal components, in order to illustrate the basic interaction between several system components in a preferred embodiment of the system. Two users, a Consumer 20 and a Provider 21, who are not part of the invention, are shown to illustrate their relationship to Agent System 10. Many components of the system are not illustrated in this figure, in order to focus attention on the basic interaction, which enables the generation and the retrieval of market data.

Referring to the left side of the figure, actions of Consumer 20 generate market data. Consumer 20 controls a Consumer Personal Agent 12 that represents the Consumer to the system. The Consumer Personal Agent is capable of creating a Decision Agent 14 to carry out a search, within a Market 18, for products that satisfy certain constraints and preferences. For example, a Consumer might query for the local retailers that carry a certain brand of sports shoes. Decision Agent 14 gathers data without knowing, and therefore without revealing, the identity of the Consumer 20. Both Decision Agent 14 and Market 18 store data about the search. Decision Agent 14 returns a set of product recommendations, which Consumer Personal Agent 12 further filters and orders according to Consumer preferences before presenting to Consumer 20.

Referring to the right side of the figure, actions of Provider 21 retrieve and analyze market data. Provider 21 (merchant, service provider, etc.) controls a Provider Personal Agent 13 that represents the Provider to the system. The Provider Personal Agent is capable of creating a Demand Agent 16 to collect data, from a Market 18, about consumer demand. For example, the Provider might query for the number of consumers that are currently searching, or have searched within the past 24 hours, for a certain brand of sports shoes. Demand Agent 16 accesses data stored in the Market 18 and in active and expired Decision Agents 14. Demand Agent 16 returns a response for the query to the Provider Personal Agent 13, which uses the Provider's preferences to determine how to present the retrieved data to the Provider 21.

Agent System 10 contains different Markets 18 for various categories of products and services. The various kinds of agents and the markets are software components. These components are more fully described in conjunction with other figures. In a preferred embodiment, the software components utilize but are not limited to conventional object-oriented technology, distributed object-oriented technology, object-oriented database technology, relational database technology, general Internet communication technology, World Wide Web (WWW or Web) technology, and electronic mail (e-mail) technology.

Agent System Schematic

Figure 2:
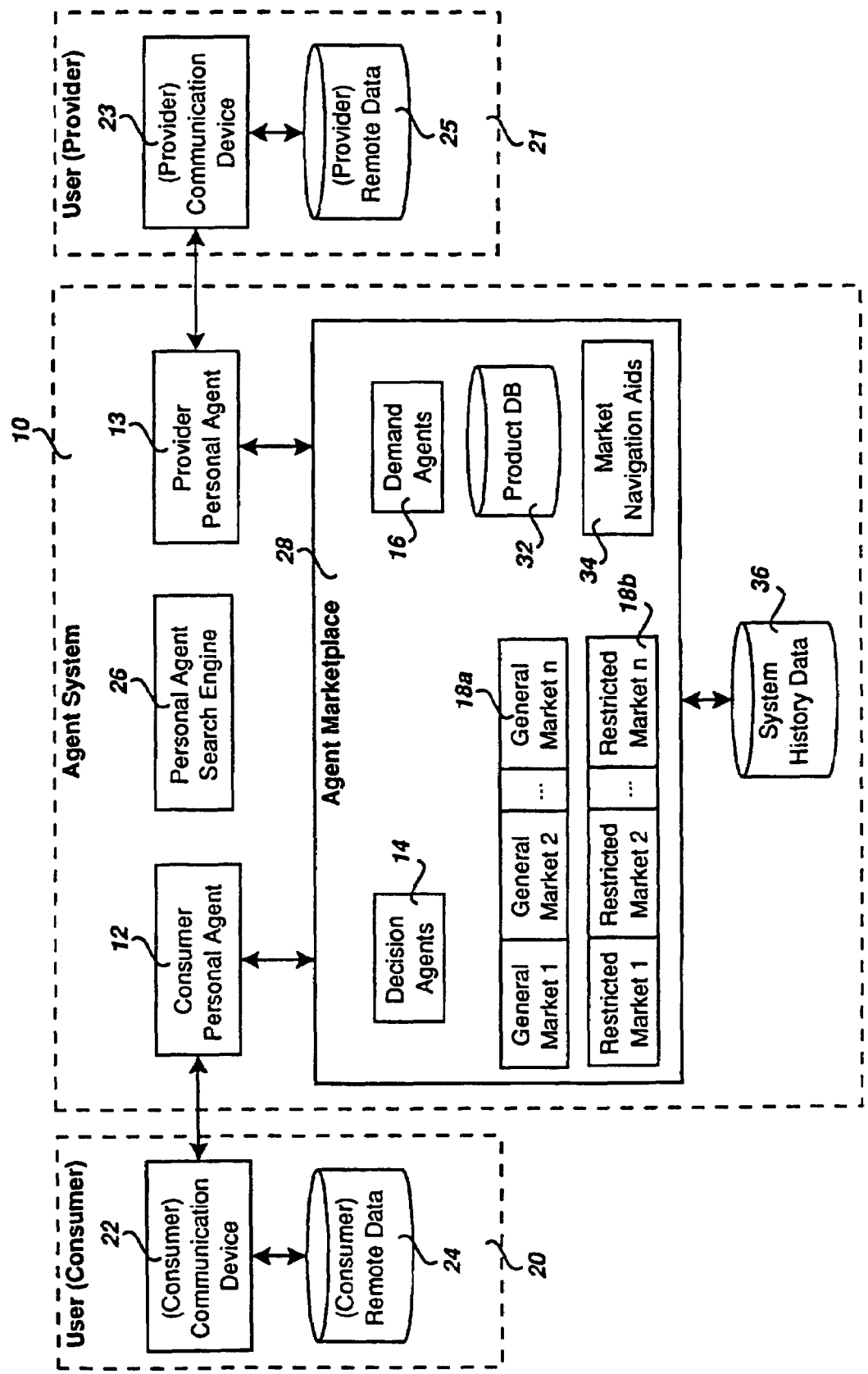
FIG. 2 is a schematic diagram of an agent system and its major components.

Referring to FIG. 2, there is shown a more detailed schematic diagram of a preferred embodiment of the invention. Agent System 10 is a combination of hardware and software components; the components, taken together, are considered to be a single, logical system, regardless of the physical topology of the hardware components. It is expected that the physical topology of Agent System 10 will change over time, especially for the addition of processing units to distribute the load as more users participate in the system.

Two users of Agent System 10 (not part of the invention) are shown schematically, a User 21 (a Provider) and another User 20 (a Consumer), to indicate their relationship to the Agent System. When a User 20 or 21 uses Agent System 10 to present information about products and/or sales offers to other users of the system, that User is referred to as a Provider. For example, merchants, distributors, retailers, wholesalers, etc. fall in this category. When a User 20 or 21 uses Agent System 10 to find information about or purchase products offered by other users of the system, that User is referred to as a Consumer. In this document, the term "products" comprises products, services, tangible goods, intellectual property, etc. Persons and organizations are registered to become users of Agent System 10, and each user is authorized to perform certain functions. Not all functions of Agent System 10 are permitted to every user.

Each User of Agent System 10 has a means of communicating with the system, as indicated by Communication Device 22 or 23 of each User 20 or 21 respectively, and may have multiple means and devices. These communication devices can be any device capable of communicating over the Internet (such as personal computers with Web browser and/or e-mail software), other devices capable of operating with computer control (such as facsimile machines and pagers), and other means of transferring data and commands between the User and the Agent System. A User may also store data on various devices outside Agent System 10, as indicated by Provider Remote Data 25 and Consumer Remote Data 24, provided that such data can be accessed by the system via (at least one of) the User's Communication Device(s). In this context, "remote" means located outside the direct control of Agent System 10.

Agent System 10 contains software agents representing both consumers and providers. Each User controls a Personal Agent 12 or 13 (PA) that coordinates the communication of the User with the other parts of Agent System 10. A User establishes a communication session with User's PA using conventional authentication means appropriate to the Communication Device 22 or 23.

A Personal Agent Search Engine 26 maintains indexes over preference data and demographic data of all Personal Agents, so that users may query to identify a set of Personal Agents whose users have certain characteristics or preferences. However, private data about the user (name, address, etc.) is not maintained in Personal Agent Search Engine 26.

Continuing to refer to FIG. 2, an Agent Marketplace 28 within Agent System 10 provides a means for various agents to interact on behalf of their owners. Consumer's Decision Agents 14 and Provider's Demand Agents 16 are "launched" into the marketplace to perform their delegated tasks. Agent Marketplace 28 comprises a number of Markets 18, which may be either General Markets 18a, in which all Users may launch specialized agents or place advertisements, or Restricted Markets 18b, in which only authorized Users may launch specialized agents (such as Decision Agents 14 or Demand Agents 16) or place advertisements. General Markets 18a correspond to conventional broad product categories; some examples are: Home Appliances, Office Supplies, Groceries, Consumer Electronics, Residential Real Estate, Commercial Real Estate, etc. Restricted Markets are used, for example, by wholesalers to restrict access to special prices to distributors. The basic structure of both General Markets 18a and Restricted Markets 18b is the same, and is described in conjunction with FIG. 8A below. Various specialized agents are described in conjunction with other Figures. Agents and other components operating in Agent Marketplace 28 have access to a Product Database (Product DB or PDB) 32.

Agent Marketplace 28 contains a number of Market Navigation Aids 34 to help users find the appropriate Market 18 in which to search or place ads. These aids might include keyword searches, word alias searches, hierarchical browsers of market layouts, etc.

Agents and other components of Agent System 10 record and access system history data (records of searches, transactions, etc.) in System History Data 36 component. Most of the system history is more conveniently accessed through logs and archives located within various functional components, but System History Data 36 maintains the "master" copy.

System Administrator users (not shown) perform or supervise various conventional maintenance functions for Agent System 10, such as performing backups, adding new product data, redistributing functions between processors for load balancing, etc.

Agent System Topology

Figure 3A:
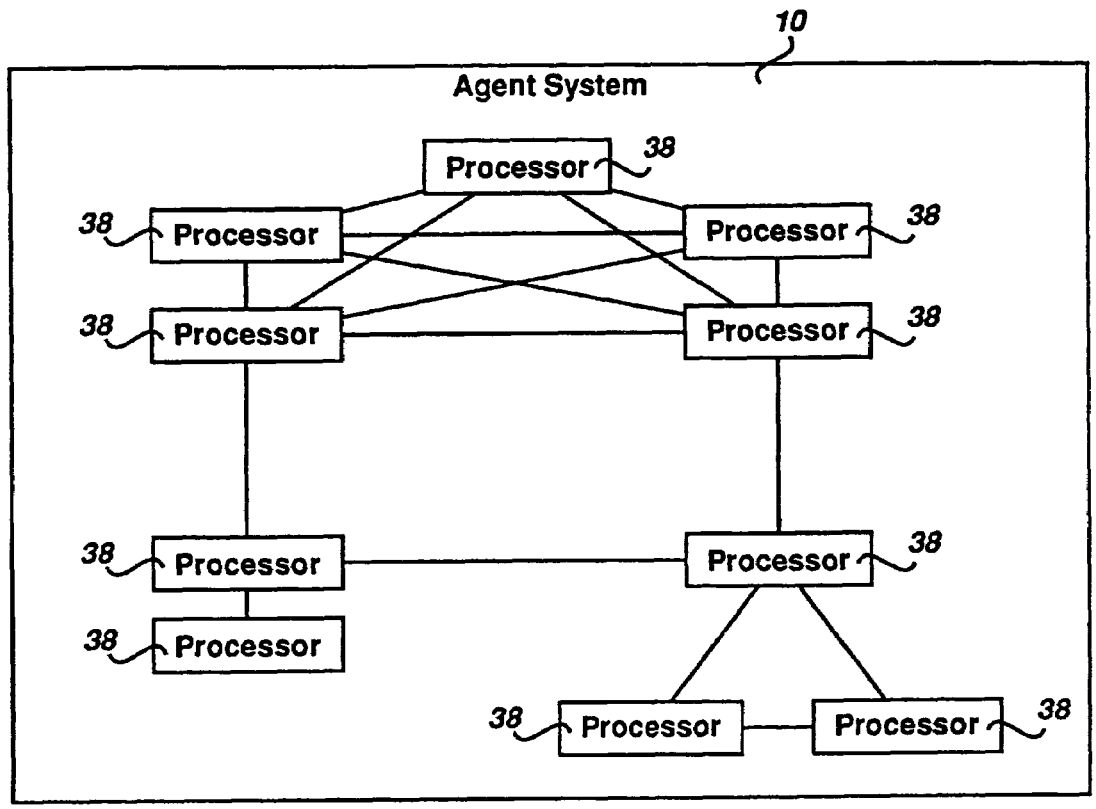
FIG. 3A is a topological diagram showing an example arrangement of processors in an agent system.

Referring to FIG. 3A, there are shown hardware components of Agent System 10 from a topological point of view. Agent System 10 may have any convenient hardware topology; FIG. 3A is intended as an example. The hardware of Agent System 10 comprises a number of Processors 38, each capable of communicating with other Processors. As illustrated, normally a group of Processors is clustered together, with one or more Processors in a group configured to communicate with one or more Processors in other clusters. The clusters may be geographically dispersed, and Processors within a cluster may be geographically dispersed. The actual number of Processors and their topology will change over time, to support additional capacity, load balancing, and ease of administration.

The various functional components of Agent System 10, described in conjunction with several Figures, reside on one or more Processors 38, and may be duplicated to reside on one or more Processors 38 simultaneously. The distribution of the functional components across the various Processors 38 will change over time, to support additional capacity, load balancing, and ease of administration.

Figure 3B:
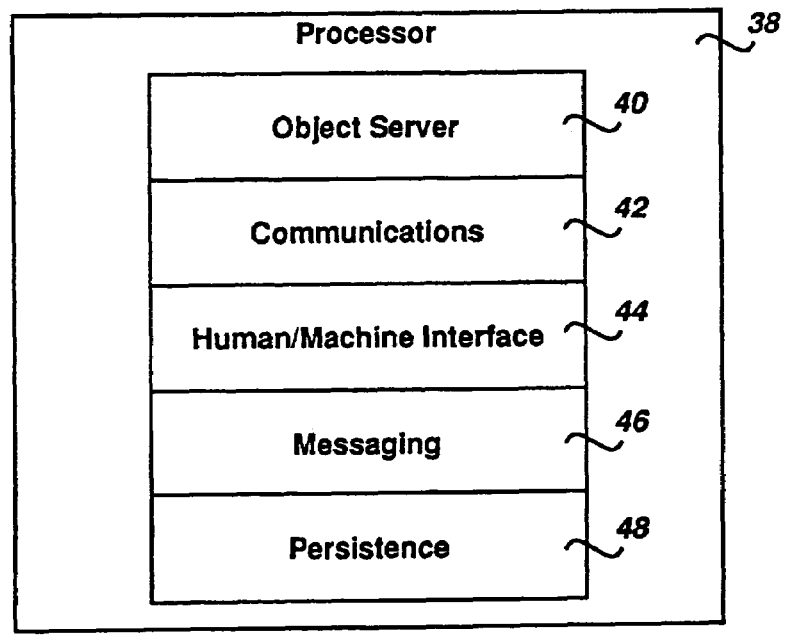
FIG. 3B illustrates the functional components of a processor.

Referring to FIG. 3B, a Processor 38 comprises the functional components of:
an Object Server function 40,
a Communications function 42,
a Human/Machine Interface function 44,
a Messaging function 46,
and a Persistence function 48.

These functional components of Processor 38 are available for use by any software component of Agent System 10 that resides on Processor 38.

A Object Server function 40 executes the software objects that comprise the various software functional components of Agent System 10, for example, the various agents, the markets, the data repositories, and lower level utility software objects (not shown). A particular Object Server 40 need not execute every kind of object; for example, some Object Servers 40 may contain only Personal Agents 12 or 13 and their related data repositories, but will not contain any Market 18 objects.

A Communications function 42 supports communications between Processor 38 and the outside world. Such communications may be wired or wireless, broad or narrow band, so long as the Processors 38 use compatible communications. Communications function 42 sets up the connection between two Processors 38, or connects a Processor 38 to a network for indirect connection to another Processor 38 or to a User's Communication Device 22 or 23.

A Human/Machine Interface function 44 provides the look and feel of Processor 38. It could include a keyboard, mouse, pen, voice, touch screen, icons, menus, etc. Human/Machine Interface function 44 communicates with other functions in Processor 38. In some situations, a Human/Machine Interface function may not be necessary, for example, when a Processor 38 communicates only with other Processors 38 but not with a User's Communication Device 22 or 23.

A Messaging function 46 routes messages between software objects executing on various Processors 38.

A Persistence function 48 manages storage of data belonging to the various software objects that reside on the Processor 38. The actual data is stored on conventional storage devices (not shown), such as computer disks.

Personal Agent

Personal Agent 12 or 13 is the point of contact between a user and the Agent System 10. Personal Agent 12 or 13 acts as an electronic "butler" or assistant, accepting requests from the user, delegating tasks to other agents in the system, and arranging for responses from various agents to the user to be delivered at a time and in a manner that is convenient for the user. Consumer Personal Agent 12, via its internal functions, maintains the user's preferences and other data about the user, some of which is protected from unauthorized access.

Referring to FIG. 4A, a Personal Agent 12 or 13 comprises the functional components of:
a Unique identification (ID) 50,
an Owner Manager 52,
a Preference Manager 54,
a Delivery Manager 56,
an Individual Firewall 58,
a Decision Agent Manager 60,
a Demand Agent Manager 62,
an Ad Manager 64,
a Target Manager 66, and
a Consideration Account 67.

A Unique ID function 50 maintains an identifier that uniquely identifies this agent within Agent System 10. Unique ID 50 is generated automatically when the agent is created, and is never reused to identify a different agent, even if the original agent ceases to exist within the Agent System. Unique ID 50 carries no information that reveals the human "owner" of this agent. Unique ID 50 is used to address messages to the agent.

An Owner Manager function 52 maintains data about the human "owner" of the agent, i.e. the user that controls this Personal Agent 12. This data includes the user's name, postal addresses, e-mail addresses, telephone and fax numbers, etc. This data is always protected by an Individual Firewall 58; it is never revealed to other agents, and is used only by components of Personal Agent 12 to deliver messages, for system invoicing, etc.

A Preference Manager function 54 maintains data about the preferences of the user. Preferences indicate items of interest to the user, such as favorite brands, interest in sports, etc. Within Agent System 10, preference data also includes "demographic" data. Demographic data indicates facts about the user, such as whether the user is a homeowner, the user's gender, the user's age group, etc. Although marketing industry usage of the term "demographics" may include a person's name, address, or other identifying data, a Preference Manager's demographic data does not include data that identifies the particular user. Preference data may be entered manually by the user using, for example, a form on a Web page, or data may be loaded by a System Administrator. Preferences may also be updated automatically by the system as, for example, when the user instructs the system to "remember" a product brand name from a product search. Preference Manager 54 uses preference data to order search results, so that items that are more likely to be preferred by the user will be displayed first when the results are delivered to the user. Referring now to FIG. 5A, each preference datum 68 comprises not only a value 72, but also a key 70 for ease of searching. Referring to FIG. 5B, a small sample of preference data illustrates the kind of data that might be used. A particular user typically will have much more preference data. Some values are shown as "rank m in n" to illustrate that ranking data may also be stored. The specific keys of any particular set of preference data depends on what the user has entered, etc. Only keys that are relevant to a particular user are included in that user's preferences, and the specific data maintained will change over time.

Referring again to FIG. 4A, a Delivery Manager function 56 accepts all messages, generated by agents or other components of the system, that are directed to the user, and delivers those messages according to the user's desired delivery time and delivery media. Default delivery time and delivery media are specified as part of the user's preferences (maintained by Preference Manager 54). Individual messages may also have a specified delivery time and delivery media that overrides the defaults. Delivery Manager 56 establishes communication with the user's Communication Device 22 or 23 to effect delivery. Messages may be sent to multiple devices if the user so desires. Delivery Manager 56 queues messages that are to be delivered at a future time.

Delivery Manager 56 also rejects unsolicited messages, unless the message meets the user's preferred criteria as maintained by Preference Manager 54. Delivery Manager 56 sends a rejection message in reply to the original sender of a rejected message. The rejection message indicates why the original message was rejected, so that the sender may gather quantifiable feedback.

An Individual Firewall function 58 mediates all access to the data that is maintained by the various internal functions, ensuring that only authenticated and authorized agents and users can access private data.

A Decision Agent Manager 60 assists the user with the creation and management of Decision Agents 14. Referring now to FIG. 4B, a Decision Agent Manager 60 comprises the functional components:

a Decision Composer 74,
a Decision Agent Factory 76,
a Decision Agent Tracker 78,
and a Decision Agent Archive 80.

Continuing to refer to FIG. 4B, a Decision Composer 74 assists the user in composing queries to be executed by Decision Agents. Decision Composer 74 retrieves a Product Template 174 (described later in conjunction with FIG. 9B) for a particular product from a Market 18 in which the user wishes to search, present instructions to the user for completing Product Template 174 to describe the object of the search, and produces the appropriate query.

A Decision Agent Factory 76 creates a new Decision Agent 14 to carry out a query.

A Decision Agent Tracker 78 enables the user to monitor the activities of Decision Agents 14 that are active, i.e., agents that have not completed their tasks. Decision Agent Tracker 78 also enables the user to cancel an active Decision Agent 14 before its scheduled expiry time.

A Decision Agent Archive 80 stores and accesses Decision Agents 14 that are expired, i.e., agents that have completed their tasks, whether successfully or not. For example, if a Demand Agent 16 needs more detailed data about a query than is stored in a Query Logger 136 of a Market 18, it can access the details of the related Decision Agent 14 through Decision Agent Archive 80.

Referring back to FIG. 4A, a Demand Agent Manager function 62 assists the user with the creation and management of Demand Agents 16. Only users of Agent System 10 who are authorized to launch Demand Agents will have a Demand Agent Manager 62 as part of their Personal Agent. Referring now to FIG. 4C, a Demand Agent Manager 62 comprises the functional components:

a Demand Composer 82,
a Demand Agent Factory 84,
a Demand Agent Tracker 86,
and a Demand Agent Archive 88.

These components provide functions similar to the analogously-named functional components of Decision Agent Manager 60 (described above), except that Demand Agent Manager 62 components work with Demand Agents 16 instead of Decision Agents 14.

Referring back to FIG. 4A, an Ad Manager function 64 assists the user in placing advertisements. Referring now to FIG. 4D, an Ad Manager 64 comprises the functional components of:

an Ad Composer function 90,
an Ad Delivery function 92,
an Ad Tracker function 94,
and an Ad Archive function 96.

Figure 10:
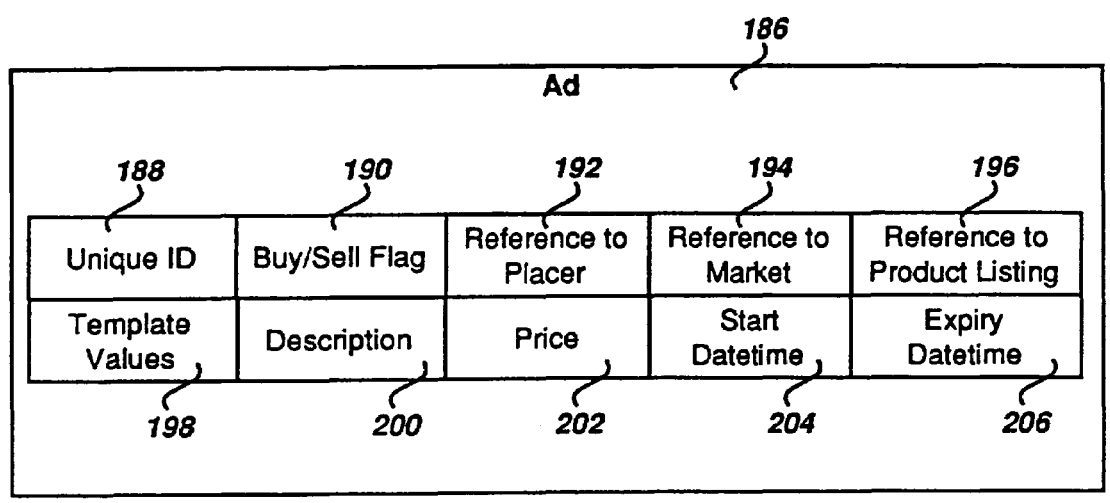
FIG. 10 illustrates the data components of an Ad.

An Ad Composer function 90 retrieves a Product Template 174 (described later in conjunction with FIG. 9B) for a particular product from a Market 18 in which the user wishes to advertise, presents instructions to the user for completing Product Template 174 to describe the product, and produces a new Ad 186 (see FIG. 10).

An Ad Delivery function 92 delivers Ad 186 ft the desired destination. For consumer users, Ad 186 is delivered to Market 18, where it is accessible to other agents in the system. For provider users, Ad 186 may be delivered to Market 18 (just like a consumer ad); or Ad 186 may be delivered (as a special offer) to a set, determined by a Demand Agent 16, of consumer Personal Agents 12.

An Ad Tracker function 94 monitors the activity of Ad 186, including any messages received in response to the Ad, until Ad 186 expires or is canceled by the user. Ad Tracker function 94 enables the user to cancel an Ad 186 before its scheduled expiry time.

An Ad Archive function 96 stores and access Ads 186 that are expired.

Referring again to FIG. 4A, a Target Manager function 66 assists the user in identifying Personal Agents to which targeted ads may be delivered. Target Manager 66 can identify Personal Agents based on preferences, demographic characteristics, and Decision Agent activity. Target Manager 66 does not have access to private data of consumer Personal Agents 12 such as name, address, etc.

A Consideration Account function 67 maintains a "consideration" account for the user. When the user earns a consideration by, for example, viewing a directly delivered advertisement or message, or completing a marketing survey, the consideration amount is credited to Consideration Account 67. The account is denominated in a convertible exchange media such as electronic cash tokens.

Decision Agent

Figure 6:
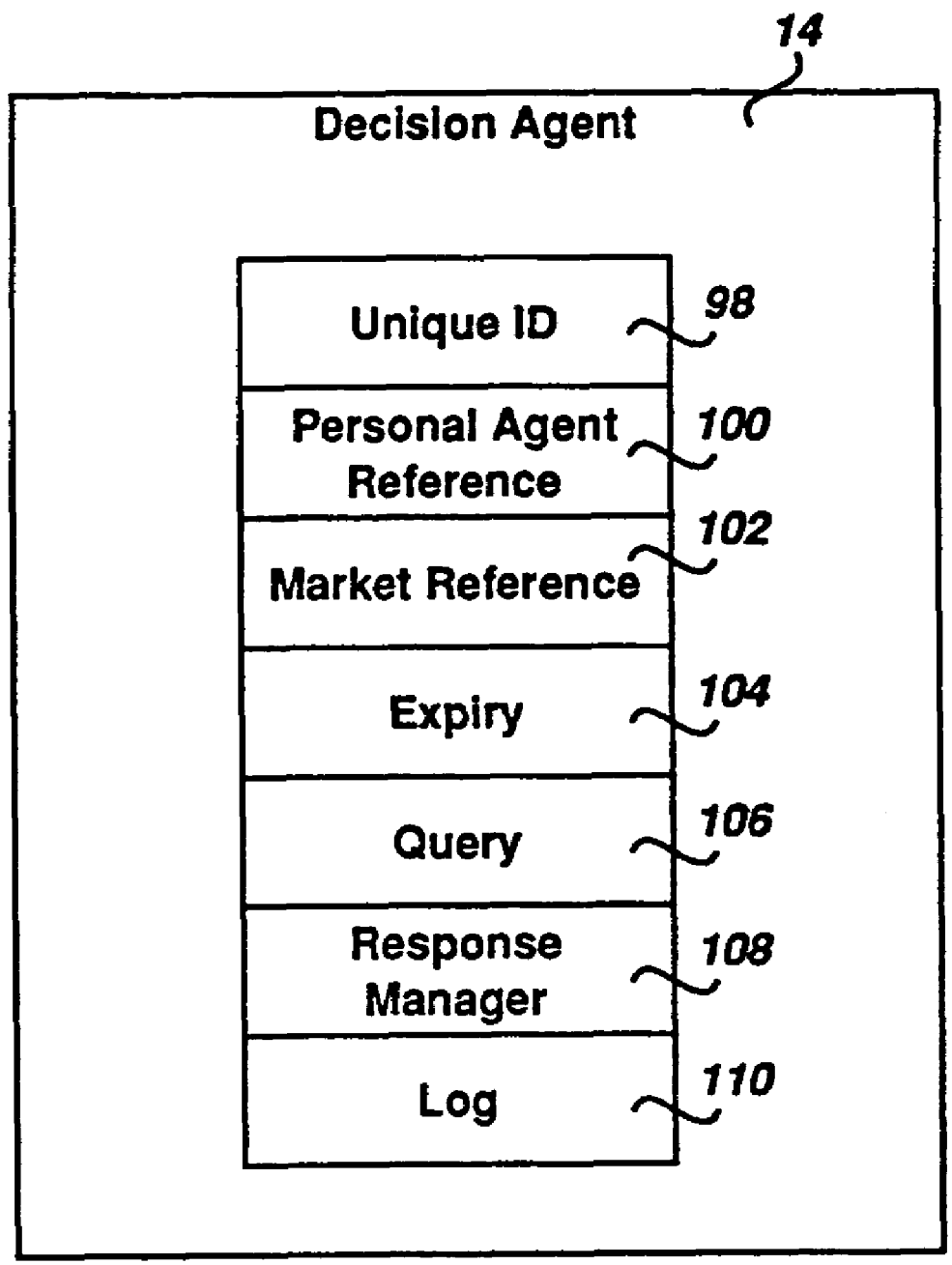
FIG. 6 illustrates the functional components of Decision Agents.

Referring to FIG. 6, a Decision Agent 14 comprises the functional components of:
- a Unique ID 98,
- a Personal Agent Reference 100,
- a Market Reference 102,
- an Expiry function 104,
- a Query 106,
- a Response Manager 108,
- and a Log function 110.

A Decision Agent 14 acts on behalf of a consumer user, as instructed by the consumer's Personal Agent 12, to search out and collect information from Agent System 10 that helps the consumer make purchasing and usage decisions. A consumer may have multiple Decision Agents 14 active within the Agent System 10 at any time. For example, a consumer may have one Decision Agent 14 searching for a good buy on a certain sports shoe, and have another Decision Agent 14 searching for a television set with special features.

A Unique ID function 98 maintains an identifier that uniquely identifies this agent within Agent System 10. Unique ID 98 is generated automatically when the agent is created, and is never reused to identify a different agent, even if the original agent ceases to exist within Agent System 10. Unique ID 98 carries no information that reveals the human "owner" of this agent. Unique ID 98 is used to address messages to the agent.

A Personal Agent Reference 100 holds a copy of the Unique ID 50 of consumer Personal Agent 12 that controls this Decision Agent 14. Personal Agent Reference 100 is used to address messages to the controlling Personal Agent 12.

A Market Reference 102 indicates in which Market 18 that Decision Agent 14 should search.

An Expiry function 104 indicates how long Decision Agent 14 should continue searching. Expiry 104 may indicate either that the search should be performed and the responses returned immediately (an "immediate search"), or that the search should continue for a specific period of time, for example, one week, with responses being returned periodically during that time (an "extended search").

A Query 106 describes the product or product category for which to search. Query 106 includes data from Product Template 174 completed by the consumer and relevant data from the consumer's preferences, as assembled by Decision Agent Factory 76 of the consumer's Personal Agent 12.

A Response Manager 108 receives search results and returns them to the consumer's Personal Agent 12.

A Log function 110 stores records of the activities of Decision Agent 14. These records may be consulted later, for example, by a Demand Agent 16 that is calculating historical demand for a product.

Demand Agent

Figure 7:
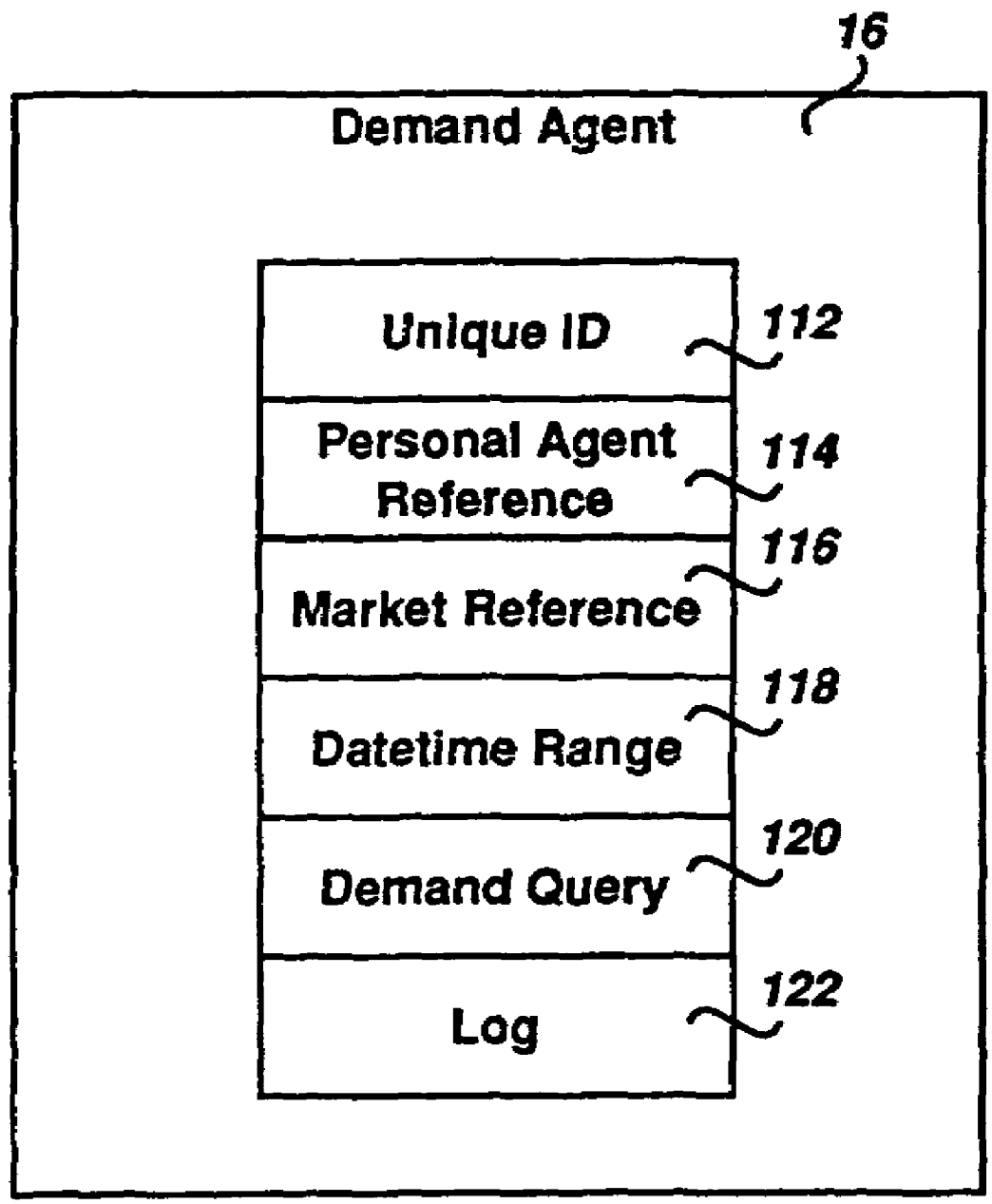
FIG. 7 illustrates the functional components of Demand Agents.

Referring to FIG. 7, a Demand Agent 16 comprises the functional components of:
- a Unique ID 112,
- a Personal Agent Reference 114,
- a Market Reference 116,
- a Datetime Range function 118,
- a Demand Query 120,
- and a Log function 122.

A Demand Agent 16 acts on behalf of a provider user, as instructed by the provider's Personal Agent 13, to search out and collect information from the Agent System 10 that helps the provider quantify consumer demand and helps target specialized advertisements to a group of consumers. A provider may have multiple Demand Agents 16 active within Agent System 10 at any time. For example, a provider may have one Demand Agent 16 calculating historical demand over the past month for a certain model of sports shoe, and have another Demand Agent 16 searching for consumers who have purchased sports shoes in the past month to receive ads for sports socks.

A Unique ID function 112 maintains an identifier that uniquely identifies this agent within Agent System 10. Unique ID 112 is generated automatically when the agent is created, and is never reused to identify a different agent, even if the original agent ceases to exist within Agent System 10. Unique ID 112 carries no information that reveals the human "owner" of this agent. Unique ID 112 is used to address messages to the agent.

A Personal Agent Reference 114 holds a copy of the Unique ID 50 of provider Personal Agent 13 that controls this Demand Agent 16. Personal Agent Reference 114 is used to address messages to the controlling Personal Agent 13.

A Market Reference 116 indicates in which Market 18 or Markets 18 that Demand Agent 16 should search.

A Datetime Range function 118 indicates that demand should be quantified over the date/time range specified; i.e., only Decision Agents 14 that were (or are) active during the datetime range specified should be searched when quantifying demand.

A Demand Query 120 describes a product or product category query that can be matched against the Queries 106 of Decision Agents. Demand Query 120 is similar to a Decision Agent's Query 106, except that a Demand Query 120 is matched against other queries (Decision Agent Queries 106), whereas a Decision Agent's Query 106 is matched against product advertisements. Demand Query 120 causes the selection of Decision Agents 14 whose queries are searching for certain products or product categories.

A Log function 122 stores records of the activities of Demand Agent 16 for later consultation by other components of Agent System 10.

Market

Referring back briefly to FIG. 2, recall that there are a variable number of Markets 18 within Agent System 10. The Markets 18 are of two basic kinds, General Markets and Restricted Markets, which have similar structure. Referring now to FIG. 8A, a Market 18, of either the General or Restricted kind, is comprised of various functional components:
- a Product Listing function 124,
- a Cross Reference (Xref) Manager function 126,
- a Sell Ad Manager function 128, a Buy Ad Manager function 130,
an Active Demand Agent Manager function 132,
a Template Dispenser function 134,
a Query Logger function 136,
an Historical Demand Search Engine function 138,
some number of Remote Database Adaptors 140,
and an Authorization function 142.

Market 18 corresponds to a traditional broad product category, such as Home Appliances, Office Supplies, Groceries, Consumer Electronics, Residential Real Estate, Commercial Real Estate, etc. The major purposes of a Market 18 are to maintain the advertisements (ads) for products of that market, to provide the capability for specialized agents to search the advertisements, and to collect data about searches for later demand calculations.

A Product Listing function 124 maintains a list of the products that can be advertised in this market. Each product references detailed product data that is kept in a Product Database (PDB) 32 described in conjunction with FIG. 9A.

Referring again to FIG. 8A, a Cross Reference (Xref) Manager function 126 maintains, upon command from a System Administrator, cross references to other Markets 18 that carry similar products.

A Sell Ad Manager function 128 accepts advertisements of offers to sell that are submitted by users' Personal Agents 12. A Buy Ad Manager function 130 accepts advertisements of offers to buy that are submitted by users' Personal Agents 12. Both consumers and providers may place ads for selling or buying in a Market 18.

The structure of both Sell Ad Manager 128 and Buy Ad Manager 130 are similar, the difference being the kind of advertisements that are accepted.

Referring to FIG. 8B, either kind of Ad Manager comprises the functional components:
an Ad Indexing function 144,
an Active Ads function 146,
a Future Ads function 148,
an Expired Ads function 150,
an Active Decision Agent Manager function 152,
and an Expired Decision Agent Manager function 154.

Continuing to refer to FIG. 8B, an Ad Indexing function 144 maintains indexes for quick searching of the ads by, for example, brand name, UPC code, product name, vendor name, etc.

An Active Ads function 146 maintains the ads that are currently active. As each new add is accepted by Active Ads function 146, an Active Decision Agent Manager 152 (see below) is notified so that pending searches can be matched against the new advertisement.

A Future Ads function 148 maintains ads that have been submitted to the Market, but are not yet active because their effective datetime has not yet been reached. These ads are moved to Active Ads when their starting datetime is reached.

An Expired Ads function 150 maintains an archive of ads that have expired, for later analysis by other components.

An Active Decision Agent Manager function 152 maintains a list of all Decision Agents 14 that are currently searching this Market 18 for products. Provider's Demand Agents 16 refer to Active Decision Agent Manager 152 while calculating current (or instantaneous) demand.

Referring to FIG. 8C, Active Decision Agent Manager 152 comprises a number of functional components:
an Immediate Agents function 156,
a Basic Search Engine function 158,
a Pending Agents function 160,
an Incremental Search Engine 162,
and a Current Demand Search Engine 164.

An Immediate Agents function 156 keeps track of Decision Agents 14 that are performing an immediate search. An immediate search is a search that is to be performed and results returned as soon as practical. Immediate Agents function 156 uses a Basic Search Engine function 158 to execute the query associated with each incoming Decision Agent 14. For example, a Decision Agent 14 might present a query to find a certain brand of sports shoe within a certain price range. Basic Search Engine 158 consults Active Ads 146 to match the query against all active ads. After the immediate search is complete, if there will not be an extended search, Active Decision Agent Manager 152 moves the Decision Agent 14 to Expired Decision Agent Manager 154 (see below). If there will be an extended search, Active Decision Agent Manager 152 delivers the Decision Agent 14 to Pending Agents 160.

Continuing to refer to FIG. 8C, a Pending Agents function 160 keeps track of Decision Agents 14 that are performing an extended search. An extended search is a search that remains active for an extended but specific period of time. Results from an extended search may be returned periodically during the time that the search remains active. Pending Agents 160 is notified by Active Ads 146 when a new advertisement enters the market, and uses an Incremental Search Engine 162 to match each new advertisement against the queries of the pending extended Decision Agents 14. In this way pending Decision Agents 14 are matched against ads, especially limited time special offer ads of providers, that enter the system later than the Decision Agent. Pending Agents 160 also arranges to expire Decision Agents 14 at the end of their expiry time, and to move them to Expired Decision Agent Manager 154 (see below).

A Current Demand Search Engine 164 matches demand queries of Demand Agents 16 against the queries of Decision Agents 14 that are residing in Immediate Agents 156 or Pending Agents 160, to identify active Decision Agents 14 that are searching for a certain product or product category.

Referring back to FIG. 8B, an Expired Decision Agent Manager function 154 maintains a list of Decision Agents 14 that are expired, that is, Decision Agents 14 that have completed their searches, whether successfully or not. The expired Decision Agents themselves are archived under the control of the consumer Personal Agent 12 that created them. Expired Decision Agent Manager 154 maintains indexes on the expired agents for quick searching by Producer's Demand Agents 16 that are, for example, calculating historical demand for a product.

Referring again to FIG. 8A, an Active Demand Agent Manager function 132 maintains a list of all Demand Agents 16 that are currently calculating demand e in this Market 18.

A Template Dispenser function 134 retrieves the Product Template 174 for a particular product. Product Template 174 describes the data that is available within the system about the particular product. Personal Agents 12 or 13 use the Template Dispenser 134 when consumers or providers are constructing ads or product search queries. Template Dispenser 134 consults the Product Template Manager 170 in a Product Database 32 (described in conjunction with FIG. 9A) to collect the template data.

A Query Logger function 136 archives summary information about queries performed by Basic Search Engine 158 or Incremental Search Engine 162, so that historical data about queries may be quickly accessed without having to access the detailed data archived by the searching agent. For example, summary information about queries launched by Decision Agents 14 are logged so that Demand Agents 16 can perform routine demand calculations without having to access the archived Decision Agents 14.

An Historical Demand Search Engine 138 matches demand queries of Demand Agents 16 against the queries that have been previously logged by Query Logger 136, to identify Decision Agents 14 that previously, during a specified datetime range, had searched for a certain product or product category.

A Remote Database Adaptor 140 provides communication and session management services to connect to a database (a "remote database", not shown) belonging to a manufacturer or a provider. Remote Database Adaptor 140 also provides translation services to translate between the data formats used by a remote database and the data formats used by PDB 32. Remote Database Adaptor 140 allows a provider to submit ads directly from the provider's remote database into Market 18. Remote Database Adaptor 140 also allows access "by reference" to advertisement data that remains stored in a remote database; that is, the data is not copied into Agent System 10, but is accessed as needed. Market 18 includes a Remote Database Adaptor 140 for each provider that chooses to supply ads in this manner; alternatively, a provider uses various functional components accessed via provider's Personal Agent 13 to place ads manually.

An Authorization function 142 restricts the placement and searching of ads in the Market 18 to authorized users only. General Markets 18a allow any authorized user of the system to place and search ads. A Restricted Market 18b allows market access only to certain authorized users of the system. For example, a Restricted Market might be used by wholesalers marketing exclusively to distributors.

Product Database

Referring to FIG. 9A, a Product Database 32 (PDB) comprises functional components:
 a Database Administration function 166,
 a Product Data Storage function 168,
 a Product Template Manager function 170,
 and, (optionally) some number of Remote Database Adaptors 172.

PDB 32 maintains generic data about products, to be referenced by ads placed by providers. Although PDB 32 is illustrated here as a single database (with several internal components) for ease of understanding, the contemplated PDB 32 will be split across several processors 38, as illustrated previously in FIG. 3A.

Referring to FIG. 9A, a Database Administration function 166 provides conventional add, delete, update, query, and backup access for a System Administrator user to the other components of PDB 32.

A Product Data Storage function 168 stores data about different products, for example, product name, product model number, manufacturer's suggested retail price for product, etc.

A Product Template Manager function 170 maintains a set of Product Templates 174, one for each product listed in PDB 32. Product Template 174 describes the kinds of data that is kept in PDB 32 for a product. PDB 32 makes Product Templates 174 available to other components, for example, a Template Dispenser 134 as illustrated in FIG. 8A. Referring now to FIG. 9B, Product Template 174 is comprised of a number of Product Template Entries 176 and, optionally, some Instructions for Use 178. Instructions for Use 178, if any, may be presented to the user when the user is supplying values for Product Template 174, to help the user decide what values to choose. A Product Template Entry 176 describes one property of a product. Referring to FIG. 9C, Product Template Entry 176 comprises several data components. A Keyword 180 names the property, for example, "Model Number" or "Brand Name". A Specification 182 indicates how values may be specified for the property, for example, as an integer number, as a text string, as one item from an enumeration, etc. A set of Use Flags 184 indicate where the property is used, for example, when entering an ad, or when composing a search query. Product Template Manager 170 consults Use Flags 184 when collecting a set of Product Template Entries 176 to satisfy a request from Template Dispenser 134. Referring to FIG. 9D, there is shown an example of some Product Template Entries 176 for a hypothetical television set product, including sample values that would be stored in PDB 32. As illustrated, some products will contain advocate information. Some advocate information may be a ranking done by an independent rating organization. Another kind of advocate information is an endorsement by a person or organization.

Referring again to FIG. 9A, a Remote Database Adaptor 172 provides communication and session management services to connect to a product database (a "remote database", not shown) belonging to a manufacturer or a provider. Remote Database Adaptor 172 also provides translation services to translate between the data formats used by a remote database and the data formats used by PDB 32. Remote Database Adaptor 172 is used to provide product data in real-time for manufacturers or providers that choose not to maintain product data directly in PDB 32 of Agent System 10, or to periodically update product data that is maintained directly in PDB 32. PDB 32 includes a Remote Database Adaptor 172 for each manufacturer or provider that chooses to supply product data in this manner; alternatively, a System Administrator may use Database Administration function 166 to maintain the data based on instructions from a manufacturer or provider.

Advertisement (Ad)

An advertisement (ad) is an offer to sell or buy a product. A placer is the user (person or organization) who is selling or buying.

Referring to FIG. 10, a preferred embodiment of Ad 186 comprises various data components:
 a Unique ID 188,
 a Buy/Sell Flag 190,
 a Reference to Placer component 192,
 a Reference to Market component 194,
 a Reference to Product Listing component 196,
 a Product Template Value component 198,
 a Description component 200,
 a Price component 202,
 a Start Datetime component 204,
 and an Expiry Datetime component 206.

A Unique ID component 188 uniquely identifies this advertisement within Agent System 10. Unique ID 188 is generated automatically when the advertisement is created, and is never reused to identify a different ad, even after the advertisement is expired.

A Buy/Sell Flag 190 indicates that this advertisement is either an offer to buy or an offer to sell a product.

A Reference to Placer component 192 identifies the provider Personal Agent 13 of the user placing Ad 186.

A Reference to Market component 194 identifies a Market 18 in which Ad 186 is placed.

A Reference to Product Listing component 196 refers to standard data about the product in Product Listing 124 of Market 18. Brand name, manufacturer, manufacturer's suggested retail price, etc. are examples of standard data.

A Product Template Values component 198 holds values, corresponding to the Product Template 174, that the placer specified when composing the advertisement. Offering price and locations of stores that carry the product are examples of values.

A Description component 200 holds additional data, not in Product Listing 124 nor in Product Template Values 198, that the placer wishes to make known about the product.

A Price component 202 states the price at which the product is offered (for selling) or requested (for buying). Price 202 may also be a price range, especially for buy ads.

A Start Datetime component 204 states the date and time at which the advertisement becomes effective, that is, the point at which the advertisement will be visible to Decision Agents 14 that are searching the market for products.

An Expiry Datetime component 206 states the date and time at which the advertisement expires, that is, the point at which the advertisement will no longer be visible to Decision Agents 14 that are searching the market for products. However, even after expiry, the advertisement is accessible through an Ad Archive 96.

Flow Charts

The flow charts indicate the functional component primarily responsible for carrying out a given task. For example, "Decision Composer" listed in the top part of a step means that the recited task is carried out by Decision Composer function 74 (see FIG. 11). The flow charts also use subroutines to make it easier to follow high-level flows.

All communication between a user (either a consumer user or a provider user) and Agent System 10 is mediated by user's Personal Agent 12 or 13. The flow charts and descriptions sometimes illustrate or state that a component receives input from the user or directs output to the user. These statements should be understood to mean that the component carries out the communication with the help of user's Personal Agent 12 or 13.

Some Figures illustrate example screen layout for input and output using a Web browser interface. Underlined text represents hyperlinks.

Simple, conventional processes are not illustrated by flow charts. For example, the process whereby a user invokes Ad Tracker 94 to view the status of active ads placed by the user is not shown, since this type of process is well-known to practitioners.

Product Search

One of the major consumer uses of Agent System 10 is to assist a consumer in locating information about a product that is advertised for sale. It need not be possible for the consumer to carry out the actual purchase within Agent System 10; it is only necessary that products be advertised within the system. However, when secure electronic transactions are available, it is anticipated that consumers will make actual purchases through the system. The product search process, while directly helping consumers, also generates consumer market data that is so crucial to providers. This data tells providers the products for which consumers are searching, the criteria that are important to those consumers, and how many consumers are searching the various markets.

Figure 11:
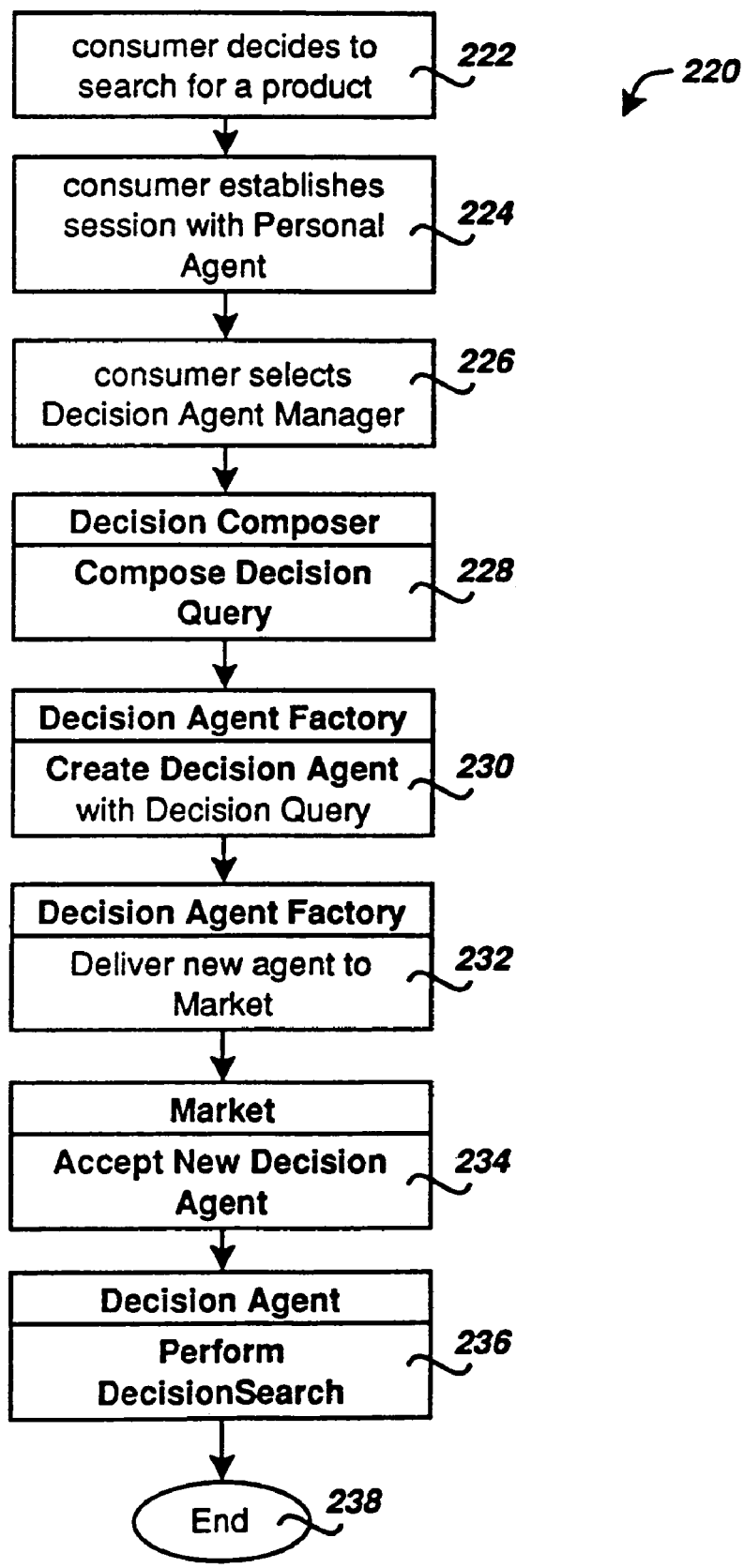
FIG. 11 is a flow diagram representation of an overall method for searching for products.

Referring to FIG. 11, an overall method according to the present invention for searching for a product is referred to generally by reference numeral 220. When a user acting as a consumer decides to search within Agent System 10 for a product or product category, the consumer establishes a communications session with consumer's Personal Agent 12 (steps 222-224). Typically the consumer, using a personal computer, connects to consumer's Internet access provider, directs consumer's Web browser software to Agent System's electronic address (known as a URL), and enters a login name and password. A sample login screen is illustrated in FIG. 39.

Referring again to FIG. 11, the consumer specifies that a product search is desired, which invokes Decision Agent Manager 60 (step 226) to supervise the subsequent steps. A Compose Decision Query subroutine of Decision Composer 74 is called to assist the consumer in composing the query for the desired product (step 228).

Referring now to FIG. 12A, there is shown a method for a Compose Decision Query subroutine, referred to generally by reference numeral 228. If the consumer wishes to specify a search that is similar to a previously performed search, Decision Agent Archive 80 displays a list of search queries from expired Decision Agents from which the consumer may select (steps 242-246). Decision Composer retrieves the Product Template mentioned in the selected Decision Agent, and also the current instructions, from the Market mentioned in the selected Decision Agent (step 248). The search criteria (values) from the expired Decision Agent are used to initialize the new search criteria (step 250).

Still referring to FIG. 12A, if the consumer alternatively wishes to specify an entirely new search, the consumer selects a Market 18 in which to search (step 252). If the selected Market is a Restricted Market for which the consumer is not authorized, an error message is displayed to the consumer, and the consumer is returned to the initial menu where another action may be selected (steps 254-260). If the consumer is authorized for the restricted Market, or if the Market is not restricted, the consumer selects a product for which to search (step 262). Decision Composer 74 retrieves Product Template and instructions from the Market's Template Dispenser 134 (step 264).

At this point Decision Composer 74 arranges to format and display the Product Template and the instructions (step 266). The consumer, following the instructions, completes the search criteria in the Product Template (step 268). When the consumer's interface is a Web browser, the Product Template is typically displayed as a combination of fill-in fields, selection lists, radio buttons, etc. as illustrated in the sample screens of FIG. 40 (searching for consumer electronics) and FIG. 41 (searching for automobiles).

Figure 12B:
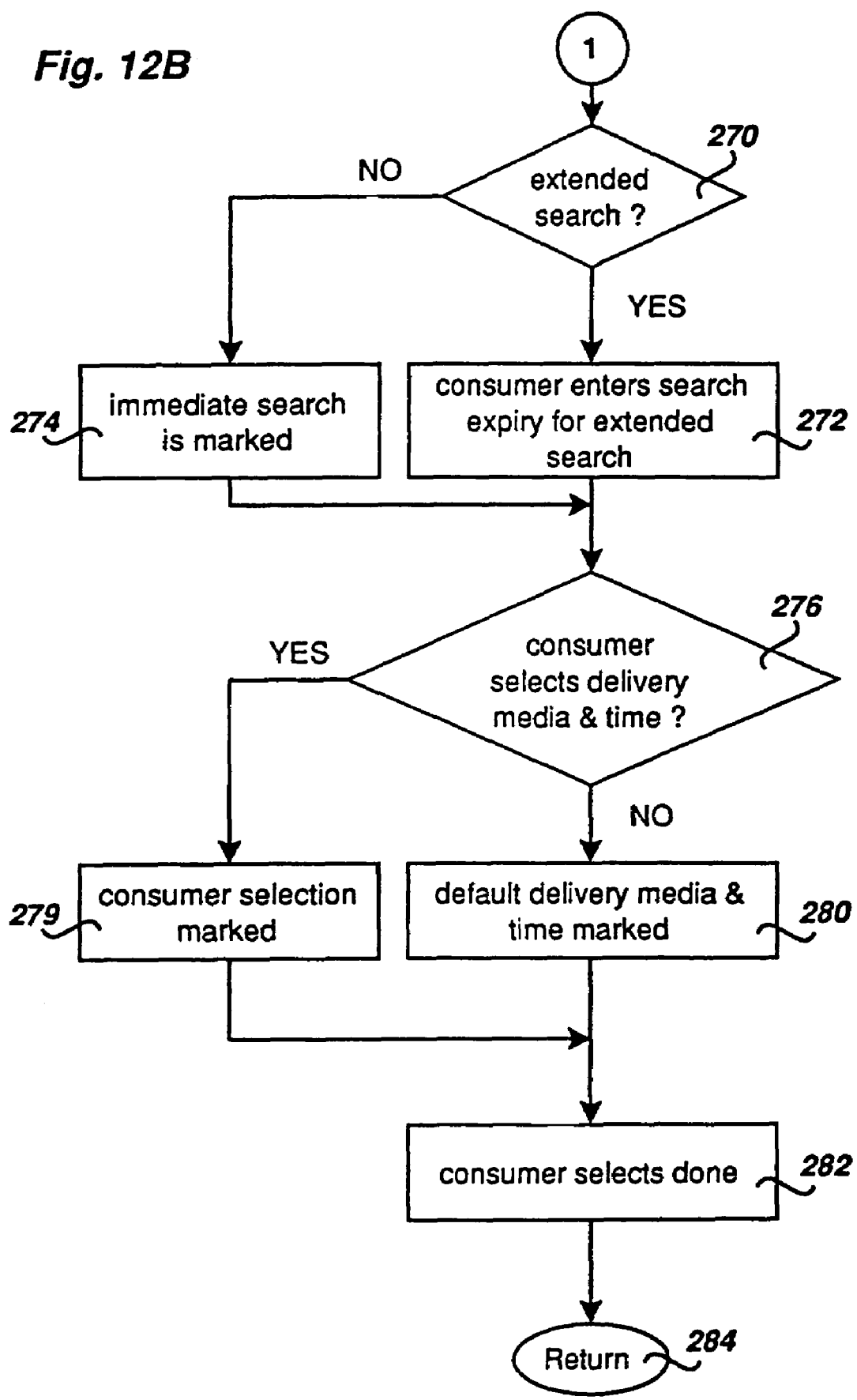

Referring to FIG. 12B, if the consumer wishes to perform an extended search, that is, a search that will continue for a period of time, the consumer enters a period of time for the search to continue (step 272). The extended search continues even when the consumer is not "on-line", that is, even when the consumer is not participating in a communication session with the Agent System. Search results are collected, as described below, for later delivery to the consumer. Alternatively, the consumer may instead choose an immediate search, that is, a search that will return results as soon as possible (step 274). The consumer need not be on-line to receive results from an immediate search; the results may be delivered later. The consumer may select a delivery media (e-mail, Web page display, etc.) and a delivery time and period (e.g., 6:00 p.m. daily, Monday noon weekly, etc.), or default media and time is noted (steps 276-280). At this point the Decision Query composition is complete (step 282).

Referring briefly to FIG. 11, Decision Agent Factory 76 invokes a Create Decision Agent subroutine to create a new Decision Agent 14. Referring now to FIG. 13, a Create Decision Agent subroutine is referred to generally by reference numeral 230. Decision Agent Factory 76 creates a new Decision Agent 14 possesing a unique identifier (step 288). This unique identifier can be used to send messages to the agent even after the agent has expired (completed its task). Decision Agent Factory 76 also initializes the other data components of the new agent by storing a reference to the Personal Agent of the consumer, a reference to the Market that is to be searched, the search expiry time, the delivery media, time, and period, and the query (search criteria) (step 290). Decision Agent Factory 76 logs the creation of the new agent with the new agent's Log function (step 292). Now the new Decision Agent 14 is ready to be launched.

Figure 14:
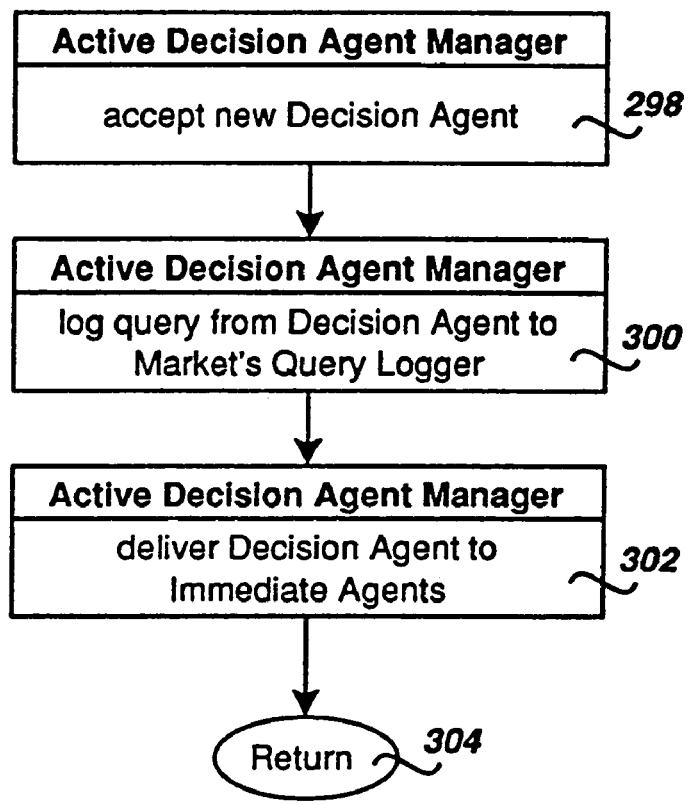
FIG. 14 is a flow diagram representation of a method for accepting a new Decision Agent into a Market.

Referring again to FIG. 11, Decision Agent Factory 76 delivers the new Decision Agent to the specified Market (step 232), where an Accept New Decision Agent subroutine is invoked (step 234) Referring now to FIG. 14, an Accept New Decision Agent subroutine is referred to generally by reference numeral 234. Active Decision Agent Manager 152 of the Sell Ad Manager 128 or Buy Ad Manager 130, as appropriate, accepts the new agent, logs the query from the agent to the Market's Query Logger function, and adds the agent to a queue of Immediate Agents 156 (steps 298-302).

Figure 15:
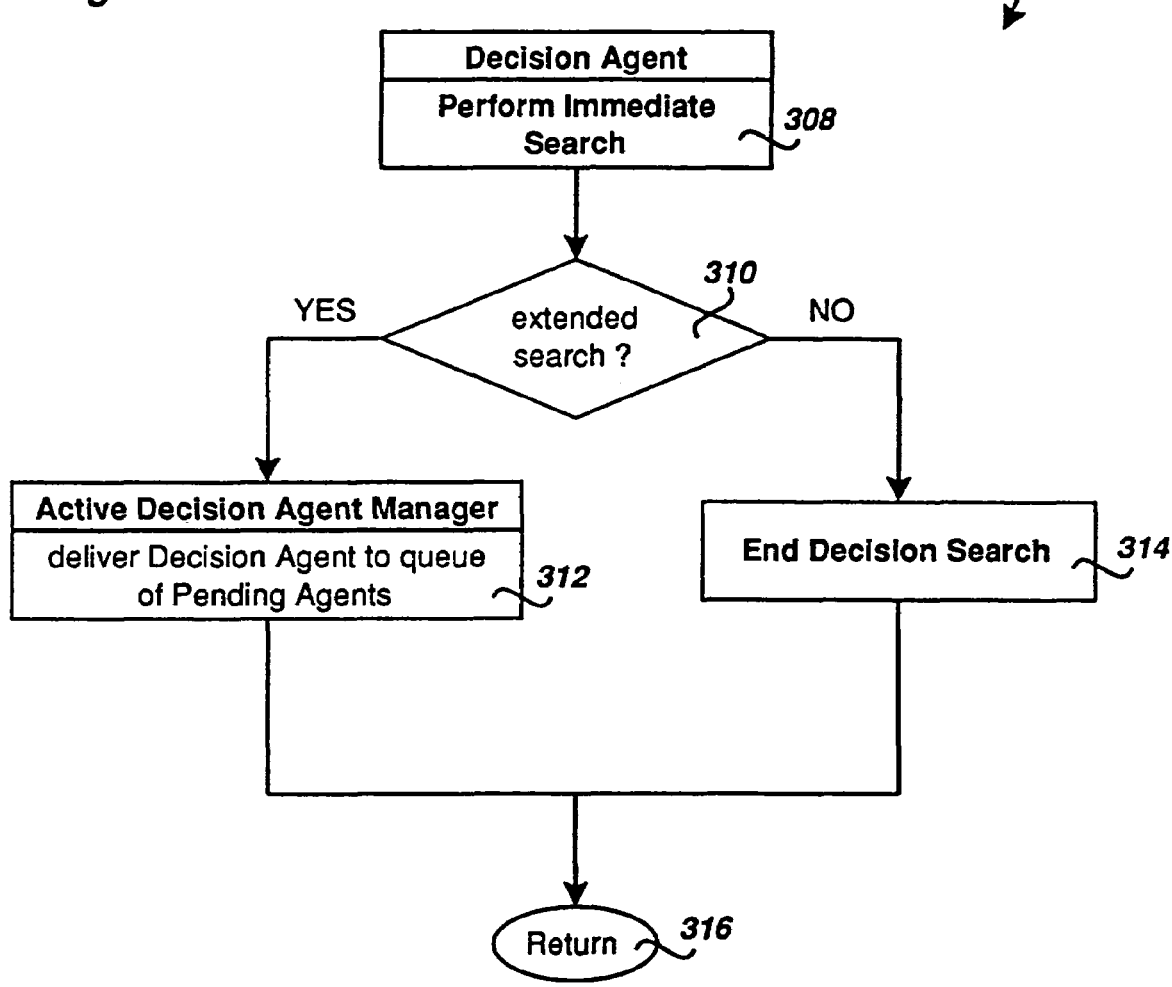
FIG. 15 is a flow diagram representation of a method for performing a Decision search.

Referring back to FIG. 11, Decision Agent 14 is now ready to perform the search for a product according to the consumer's criteria, so it invokes a Perform Decision Search subroutine (step 236). Referring to FIG. 15, a Perform Decision Search subroutine is referred to generally by reference numeral 236. Decision Agent 14 performs an immediate search by invoking a Perform Immediate Search subroutine (step 308). Even if an extended search is chosen by the consumer, an immediate search is done first to get initial results. Because the data to be searched resides within Agent System 10 or is easily and directly accessible to Agent System 10, the search process can be faster than a search that employs agents which visit multiple Web sites or databases over the Internet.

Figure 16:
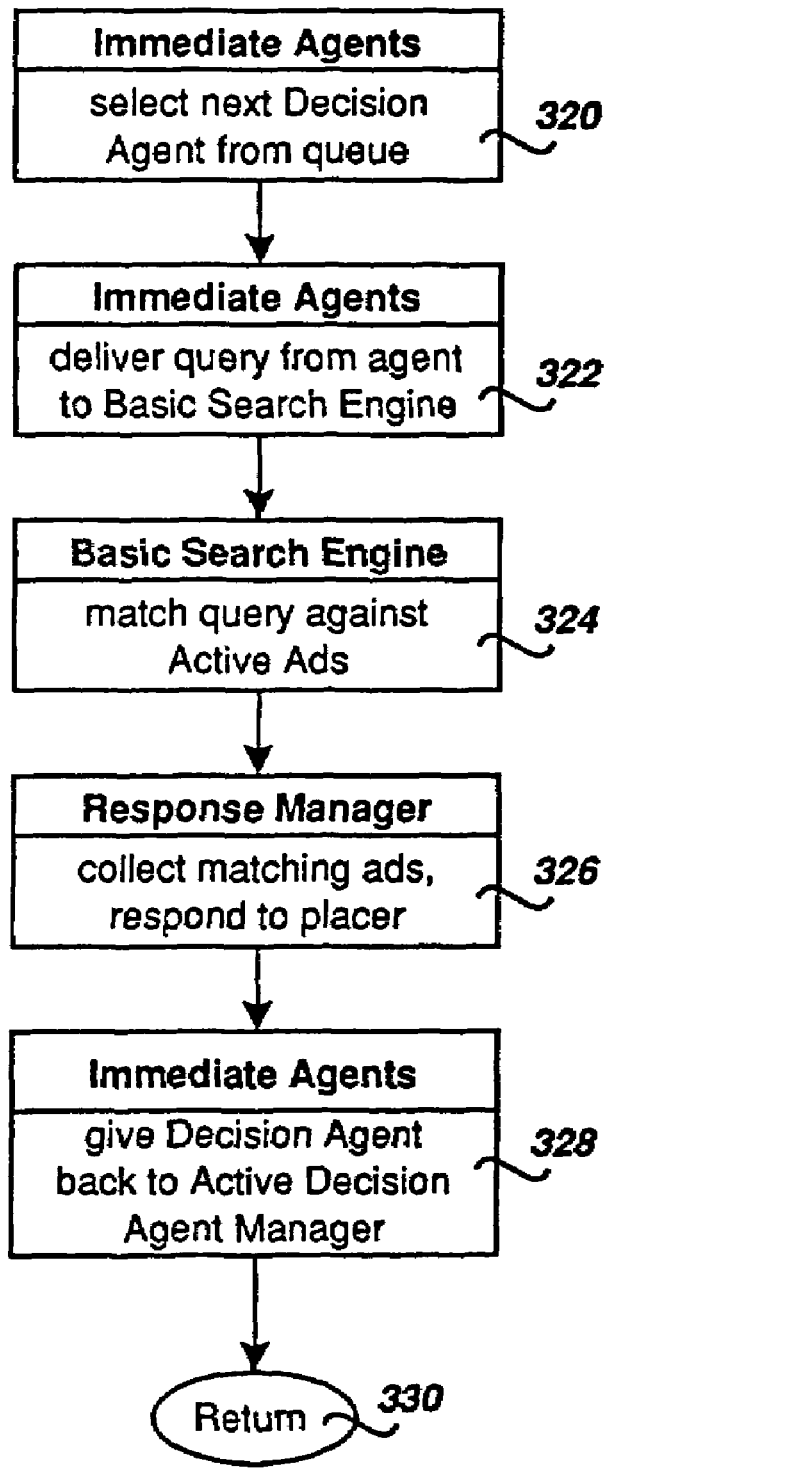
FIG. 16 is a flow diagram representation of a method for performing an Immediate search portion of a Decision search.

Referring now to FIG. 16, a Perform Immediate Search subroutine is referred to generally by reference numeral 308. An immediate search begins when Immediate Agents selects the next Decision Agent from its internal queue (step 320). Immediate Agents delivers the query from the chosen Decision Agent to Basic Search Engine 158 (step 322). Basic Search Engine 158 uses conventional database techniques to match the query against the ads in Active Ads, noting the ads that satisfy the query (step 324). The Decision Agent's Response Manager 108 collects references (step 326) to the matching ads found by Basic Search Engine. The Response Manager also sends a response to the Personal Agent that placed the advertisement (if the placer so desired and marked in the ad), providing real-time feedback to the placer. Immediate Agents then removes the Decision Agent from its internal queue and gives the Decision Agent back to Active Decision Agent Manager 152 (step 328).

Referring back to FIG. 15, if an extended search was chosen by the consumer, Active Decision Agent Manager delivers the Decision Agent to Pending Agents (step 312), so that the query of the Decision Agent will continue to be matched against incoming ads until the Decision Agent's expiry time is reached. If the consumer chose only an immediate search, an End Decision Search subroutine is called to end the search (step 314).

Figure 17:
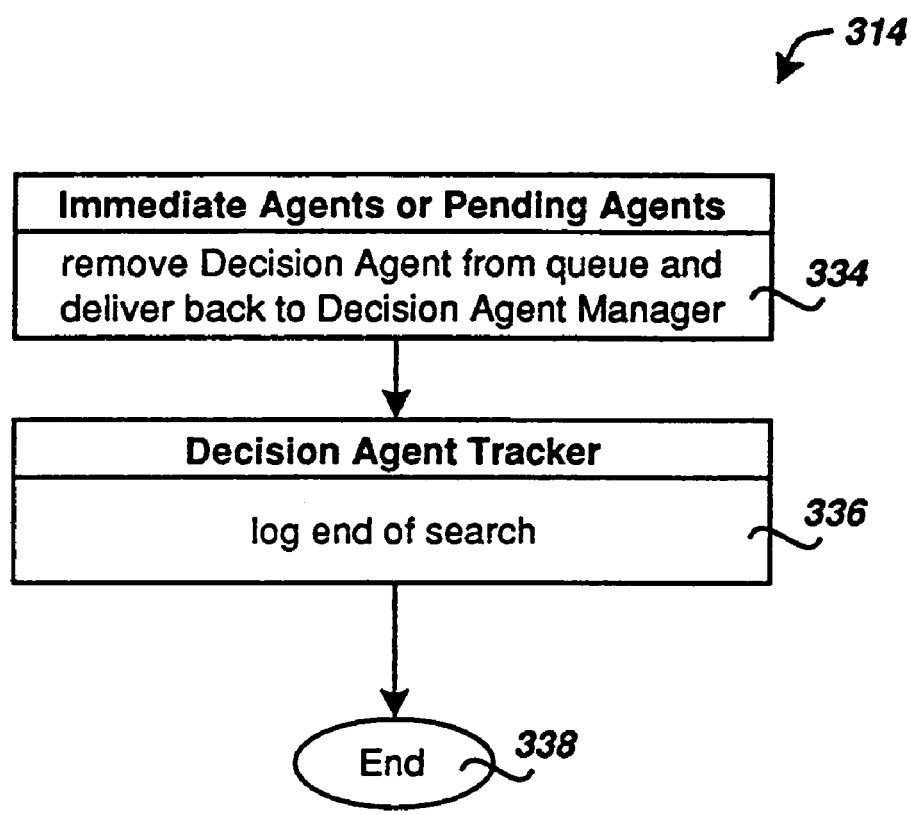
FIG. 17 is a flow diagram representation of a method for completing a Decision search.

Referring to FIG. 17, an End Decision Search subroutine is referred to generally by reference numeral 314. The Decision Agent is removed from the queue of Immediate Agents (if the agent was performing an immediate search) or Pending Agents (if the agent was performing an extended search), and is delivered back to Personal Agent's Decision Agent Manager (step 334). Decision Agent Tracker 78 logs the end of the search (step 336). Decision Agent's Response Manager 108 may still have undelivered search results. The results are held by the Response Manager until the consumer's specified delivery time arrives.

Figure 18:
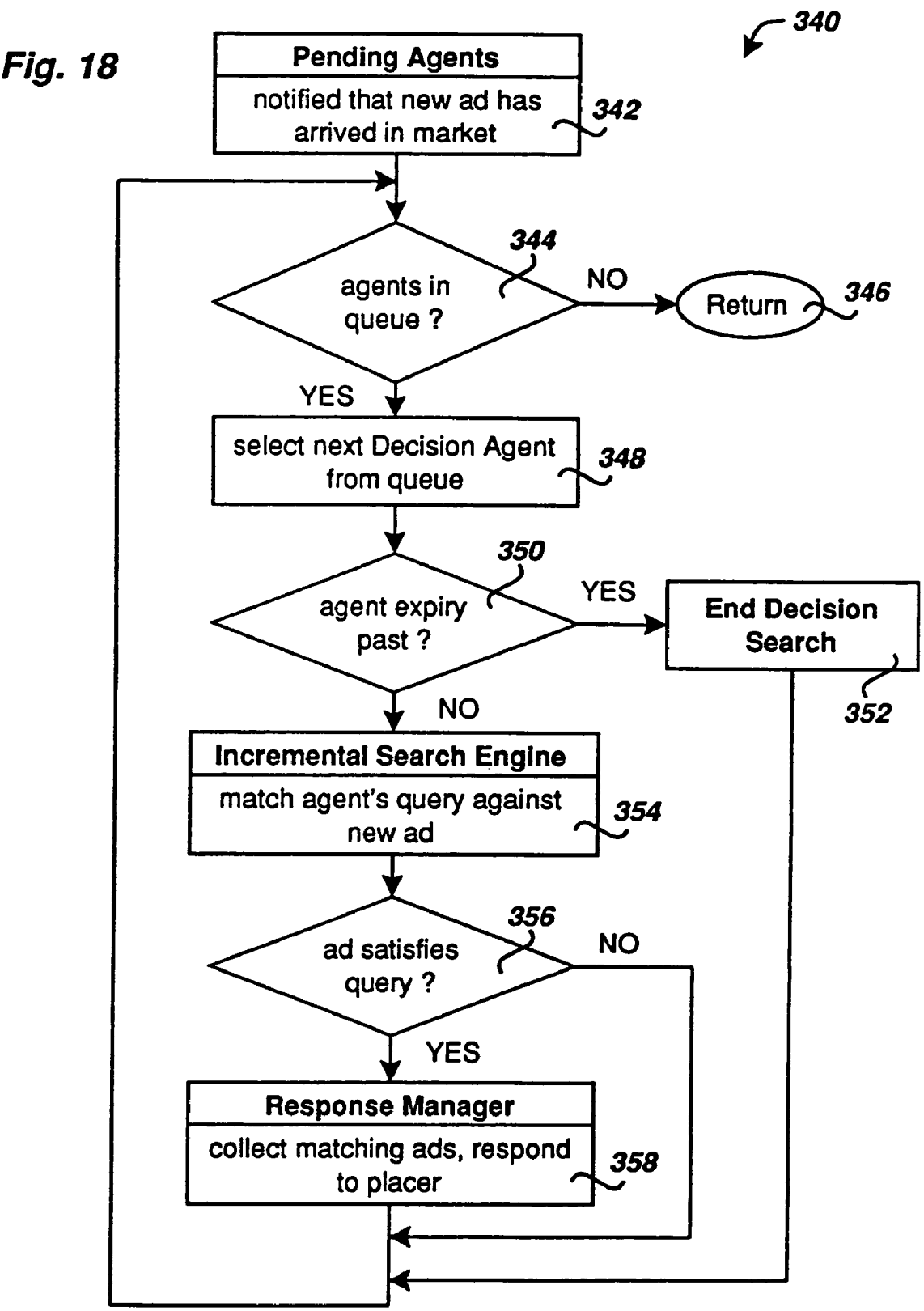
FIG. 18 is a flow diagram representation of a method for performing an Extended search portion of a Decision search.

Referring now to FIG. 18, an Extended Search subroutine is generally referred to by reference numeral 340. An episode of extended search begins each time a new advertisement arrives in a Market 18 (step 342). If there are no Decision Agents in Pending Agents (steps 344-346), there is no work to be done. However, if there are one or more Decision Agents pending for an extended search, the next agent is selected from the queue (step 348). If the agent's expiry time has been reached since the last sweep through the queue, the agent's search is stopped (step 352) with the End Decision Search subroutine previously illustrated. There is also a process (not shown) that periodically sweeps the queue and ends agents' searches, in case there is not enough advertisement activity in this market to activate Pending Agents on a regular basis. If the selected agent is not expired, Incremental Search Engine matches the agent's query against the data in the new advertisement (step 354). If the advertisement satisfies the query, Response Manager includes this advertisement in its list of results (steps 356-358), and notifies (if the advertisement so indicates) the placer of the advertisement that the advertisement was selected. This search process is repeated for each agent in Pending Agents.

Figure 19:
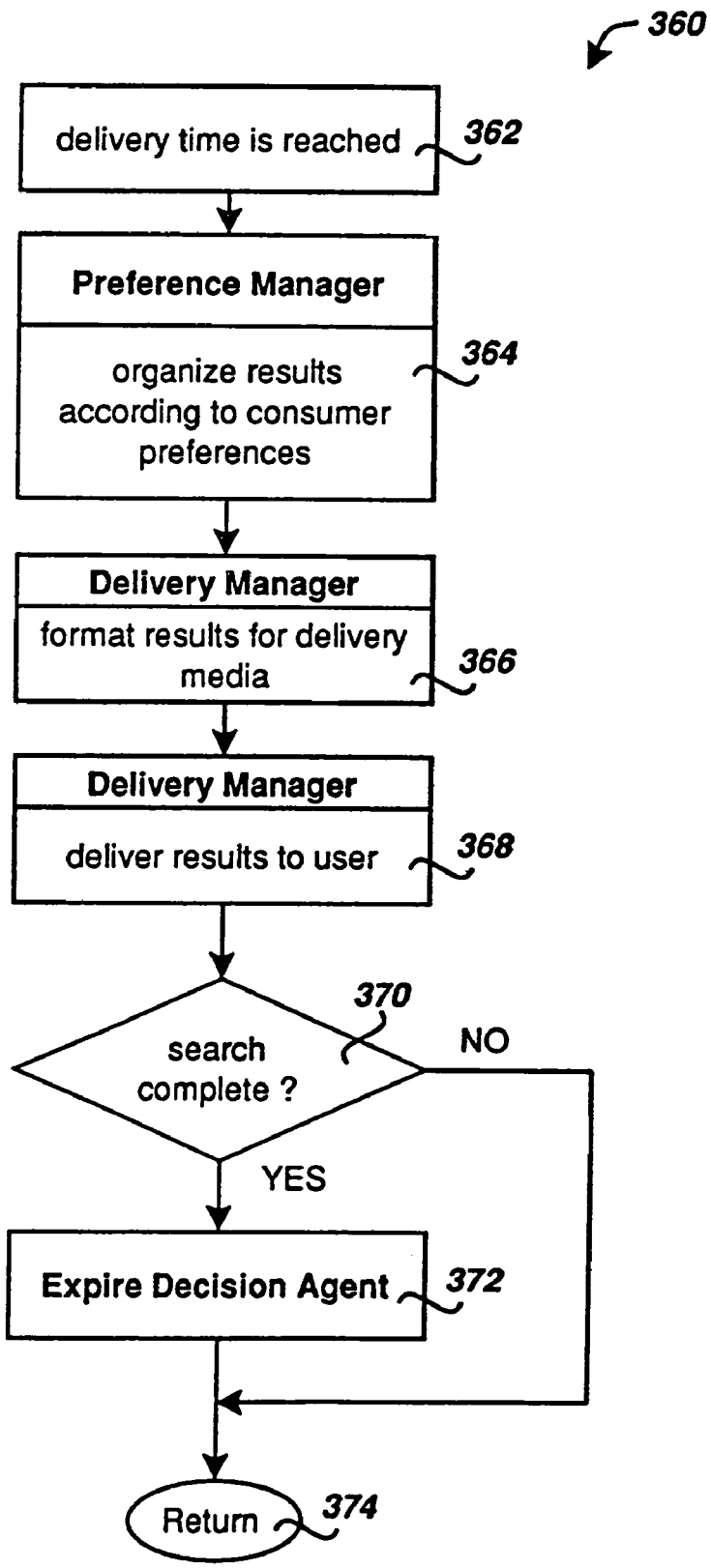
FIG. 19 is a flow diagram representation of a method for delivering Decision search results to the consumer.

Referring now to FIG. 19, a Deliver Search Results subroutine is referred to generally by reference numeral 360. Immediate search results are delivered to the consumer when the consumer's desired delivery time is reached (which may be immediately if the consumer has so requested). Intermediate results from extended searched are delivered periodically according to the consumer's desired delivery period. When the desired delivery time is reached (step 362), Preference Manager 54 organizes the not-yet-delivered results according to the consumer's preferences (step 364). For example, results that mention favored brands are ordered before results with less favored brands. Delivery Manager 56 formats the responses according to the consumer's desired delivery media (step 366). For example, if the consumer's desired delivery media is the Web, a Web page in HTML is generated. For another example, if the consumer desires e-mail delivery, a suitable representation is generated. When formatting is completes Delivery Manager 56 arranges the actual delivery of the search results (step 368). If the Decision Agent has completed its search, no more results will be forthcoming, so a subroutine Expire Decision Agent expires the Decision Agent (steps 370-372).

Figure 20:
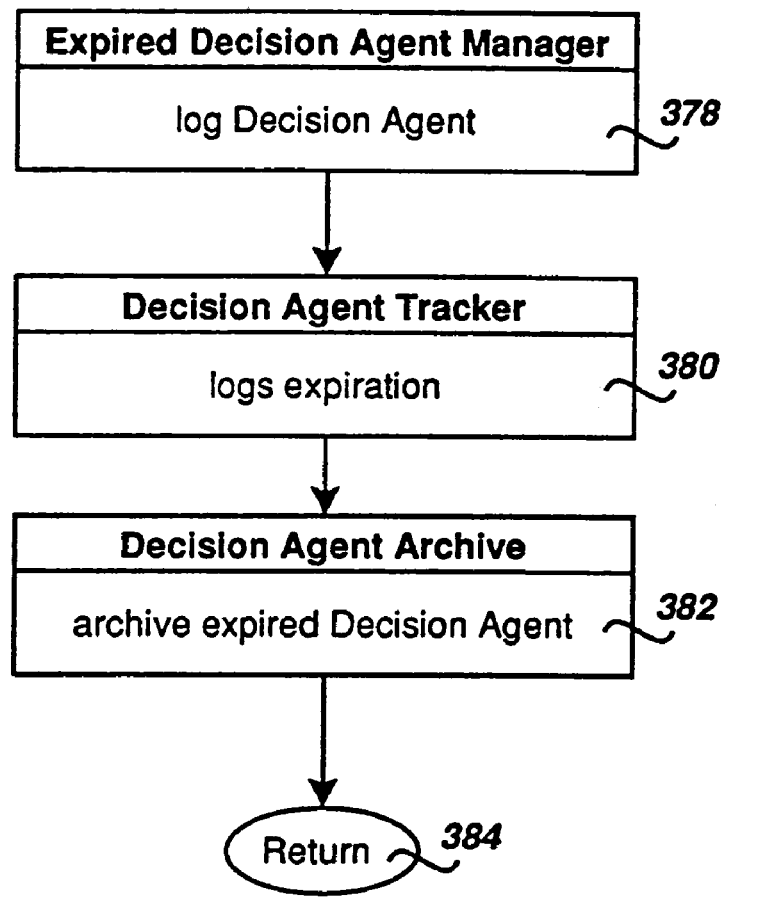
FIG. 20 is a flow diagram representation of a method for expiring a Decision Agent that has completed its task.

Referring to FIG. 20, an Expire Decision Agent subroutine is referred to generally by reference numeral 372. When a Decision Agent is expired, Expired Decision Agent Manager 154 logs the expired Decision Agent (step 378) so that Demand Agents can easily search through the expired Decision Agents of this market when calculating historical demand. The Decision Agent Tracker 78 notes that the agent is now expired (step 380), and the agent is permanently archived in Decision Agent Archive 80 (step 382).

Quantify Demand

Quantifying demand is a major activity of Agent System 10. Demand is a measure of the number of consumers interested in purchasing a product or interested in products in a category. Providers may quantify current demand or historical demand. Current demand measures the count of consumers that are currently searching for a product or searching within a product category. Historical demand measures the count of consumers that have searched for a product, or searched within a product category, during a previous time period. Agent System 10 can not only calculate demand, it can also deliver a means of contacting those consumers (without revealing the actual identity of those consumers). The demand search uses data that is generated by consumers as they search for products in the system.

Figure 21:
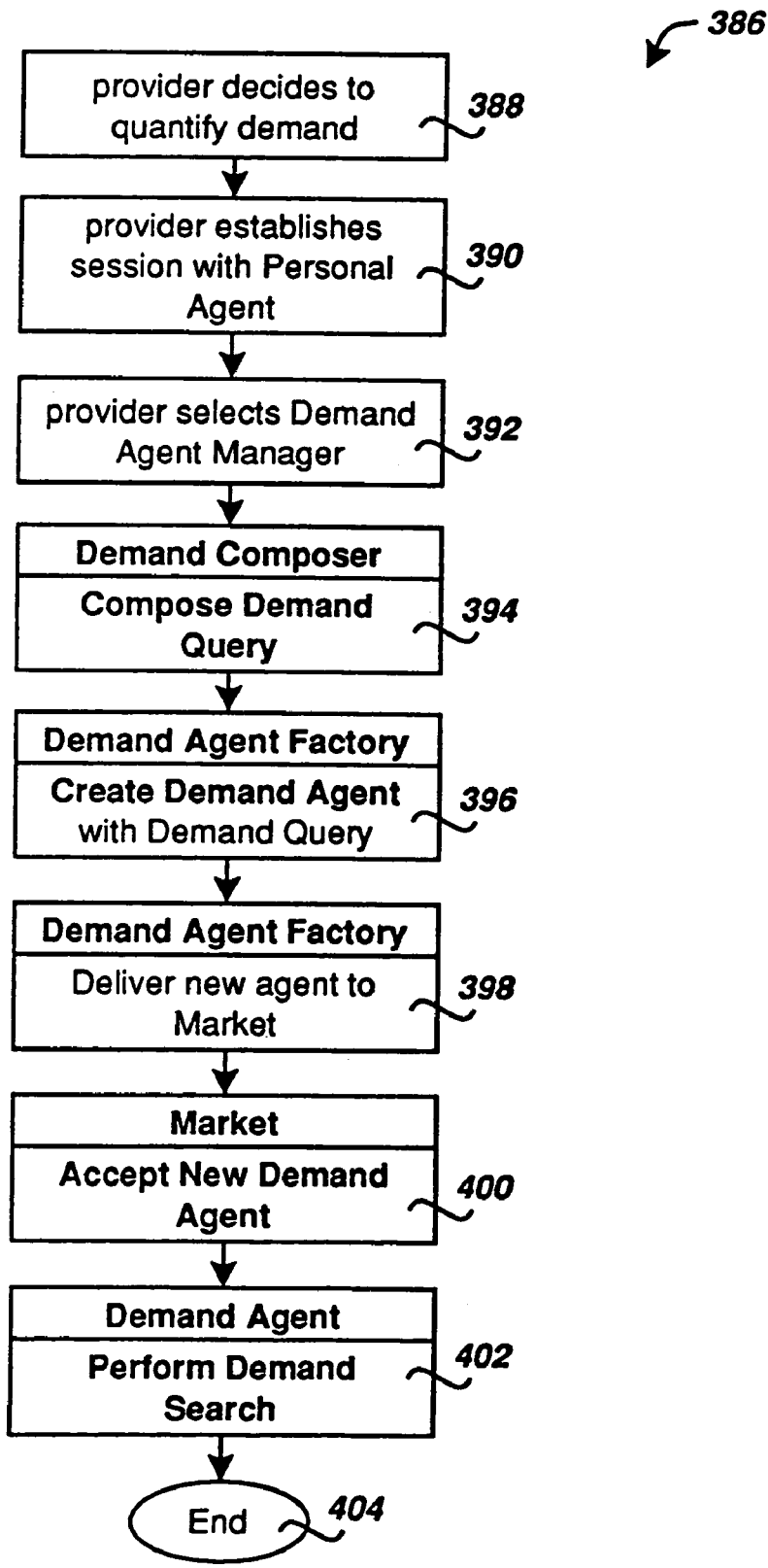
FIG. 21 is a flow diagram representation of an overall method for quantifying demand.

Referring to FIG. 21, an overall method according to the present invention for quantifying demand is referred to generally by reference numeral 386. When a user acting as a provider decides to quantify demand (perform a V demand search) within Agent System 10 for a product or product category, the provider establishes a communication session with provider's Personal Agent 13 (steps 388-390). Typically the provider, using a personal computer, connects to provider's Internet access provider, directs provider's Web browser software to Agent System's electronic address (known as a URL), and enters a login name and password. A sample login screen has already been illustrated in FIG. 39.

Referring to still to FIG. 21, the provider specifies that a quantify demand function is desired, which invokes Demand Agent Manager 62 (step 392) to supervise the subsequent steps. A Compose Demand Query subroutine of Demand Composer 82 is called to assist the provider in composing the query that will gather the demand data (step 394).

Referring now to FIG. 22, a Compose Demand Query subroutine is referred to generally by reference numeral 394. If the provider wishes to specify a demand search that is similar to a previously performed search, Demand Agent Archive 88 displays a list of search queries from expired Demand Agents from which the provider may select (steps 408-412). Demand Composer 82 retrieves the Product Template mentioned in the selected Demand Agent, and also the current instructions, from the Market mentioned in the selected Demand Agent (step 414). The search criteria (values) from the expired Demand Agent are used to initialize the new search criteria (step 416).

Figure 22A:
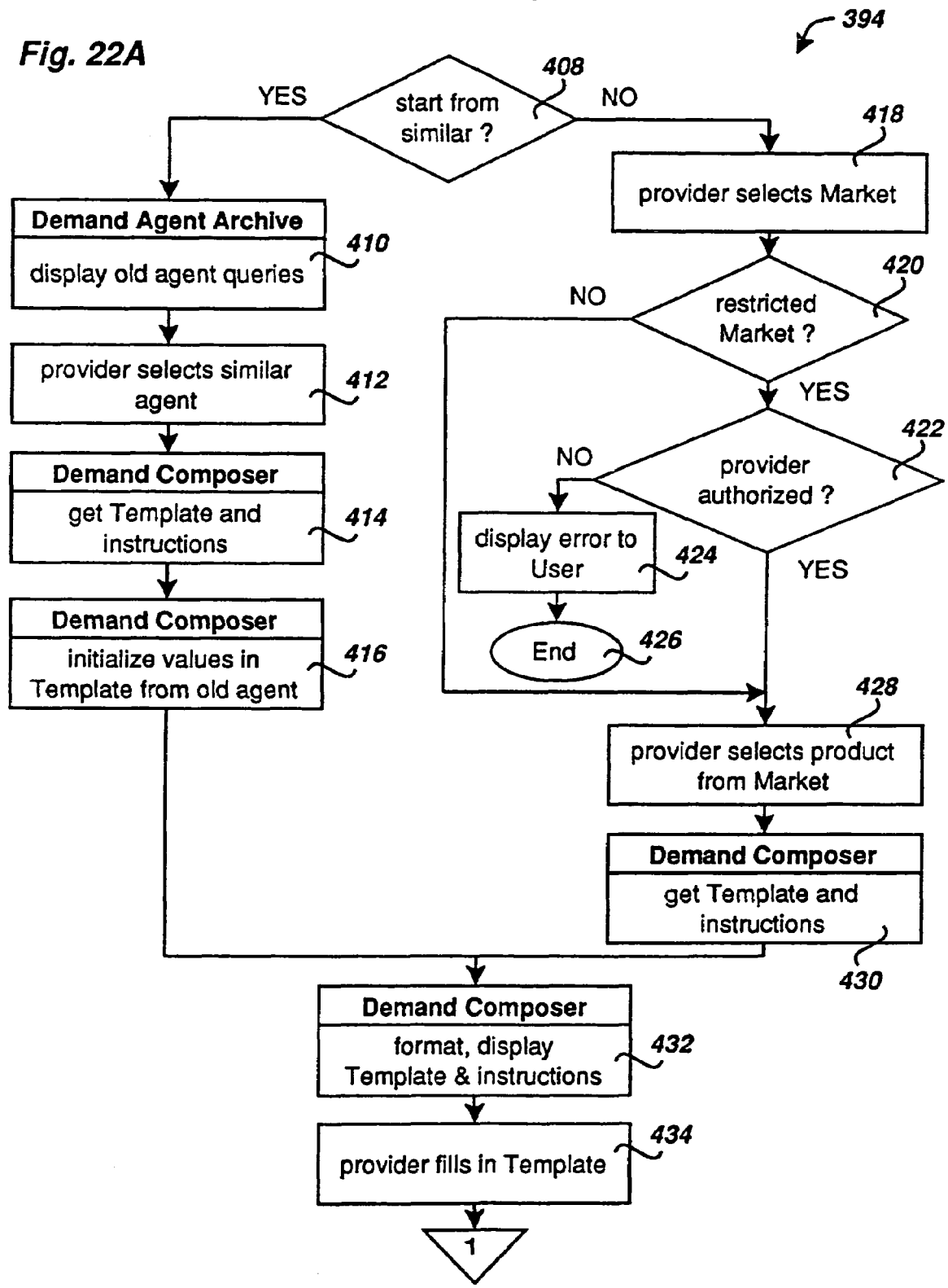
FIGS. 22A-22B comprise a flow diagram representation of a method for composing a Demand query.

Still referring to FIG. 22A, if the provider alternatively wishes to specify an entirely new search, the provider selects a Market 18 in which to search (step 418). If the selected Market is a Restricted Market for which the provider is not authorized, an error message is displayed to the provider, and the provider is returned to the initial menu where another action may be selected (steps 422-426). If the provider is authorized for the restricted Market, or if the Market is not restricted, the provider selects a product for which to search (steps 428). Demand Composer 82 retrieves Product Template and instructions from the Market's Template Dispenser 134 (step 430).

At this point Demand Composer 82 arranges to format and display the Product Template and the instructions (step 432). The provider, following the instructions, completes the search criteria in the Product Template (step 434). When the provider's interface is a Web browser, the Product Template is typically displayed as a combination of fill-in fields, selection lists, radio buttons, etc. For example, the provider might use screens similar to the sample consumer screens previously illustrated in FIGS. 40 and 41.

Figure 22B:
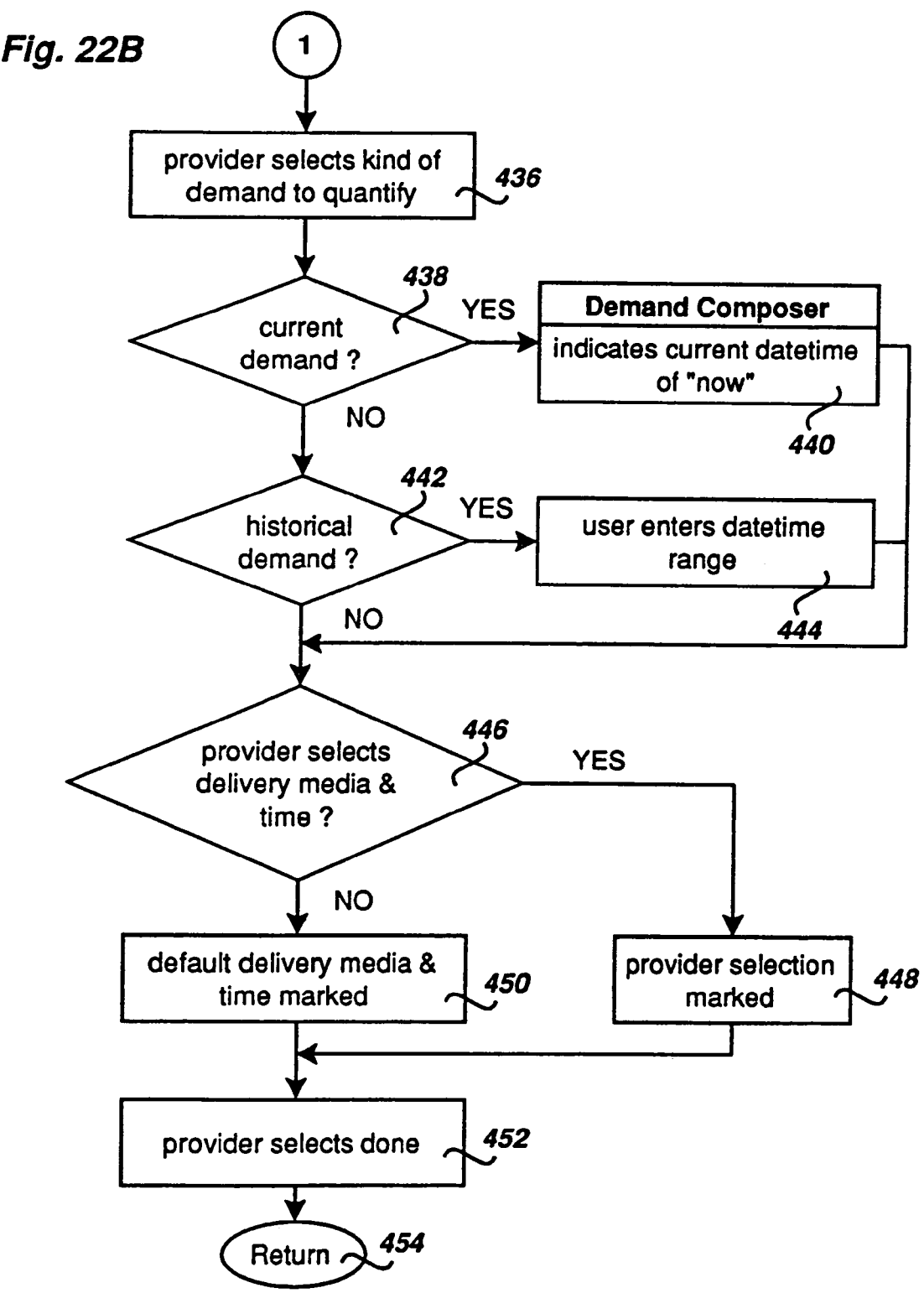

Referring to FIG. 22B, the provider selects the type of demand to quantify (step 436). If the provider chooses to quantify current demand, Demand Composer fills in the datetime range to indicate that only currently active. Decision Agents should be searched (steps 438-440). If the provider chooses to quantify historical demand, the provider selects a datetime range (steps 442-444) to indicate that only Decision Agents that were active during that datetime range should be searched. The provider may select a delivery media (e-mail, Web page display, etc.) and a delivery time and period (e.g., 6:00 p.m. daily, Monday noon weekly, etc.), or default media and time is noted (steps 446-450). At this point the Demand Query composition is complete (step 452).

Figure 23:
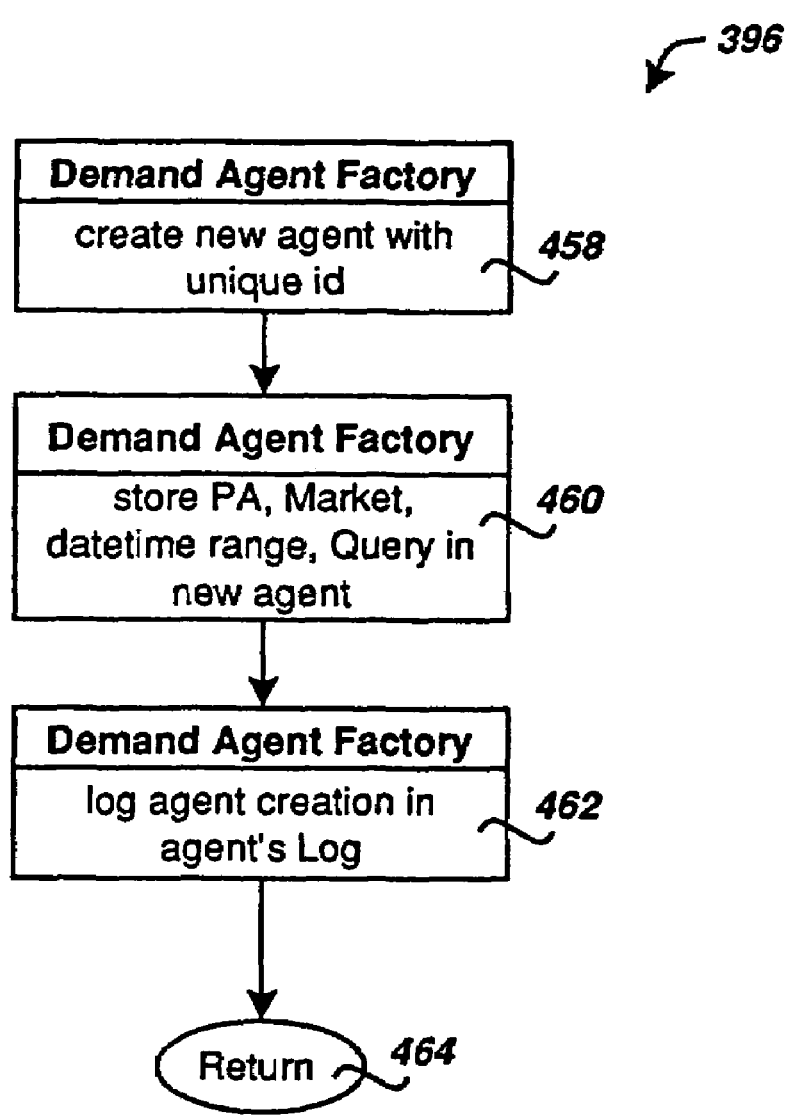
FIG. 23 is a flow diagram representation of a method for creating a Demand Agent.

Referring briefly to FIG. 21, Demand Agent Factory 84 invokes a Create Demand Agent subroutine to create a new Demand Agent 16 (step 396). Referring now to FIG. 23, a Create Demand Agent subroutine is referred to generally by reference numeral 396. Demand Agent Factory 84 creates a new Demand Agent 16 possessing a unique identifier (step 458). This unique identifier can be used to send messages to the agent even after the agent has expired (completed its task). Demand Agent Factory 84 also initializes the other data components of the new agent by storing a reference to the Personal Agent of the provider, a reference to the Market that is to be searched, a datetime range indicating that only Decision Agents that were (are) active during that datetime range should be searched, the delivery media, time, and period, and the query (search criteria) (step 460).

Demand Agent Factory 84 logs the creation of the new agent with the new agent's Log function (step 462). Now the new Demand Agent 16 is ready to be launched.

Figure 24:
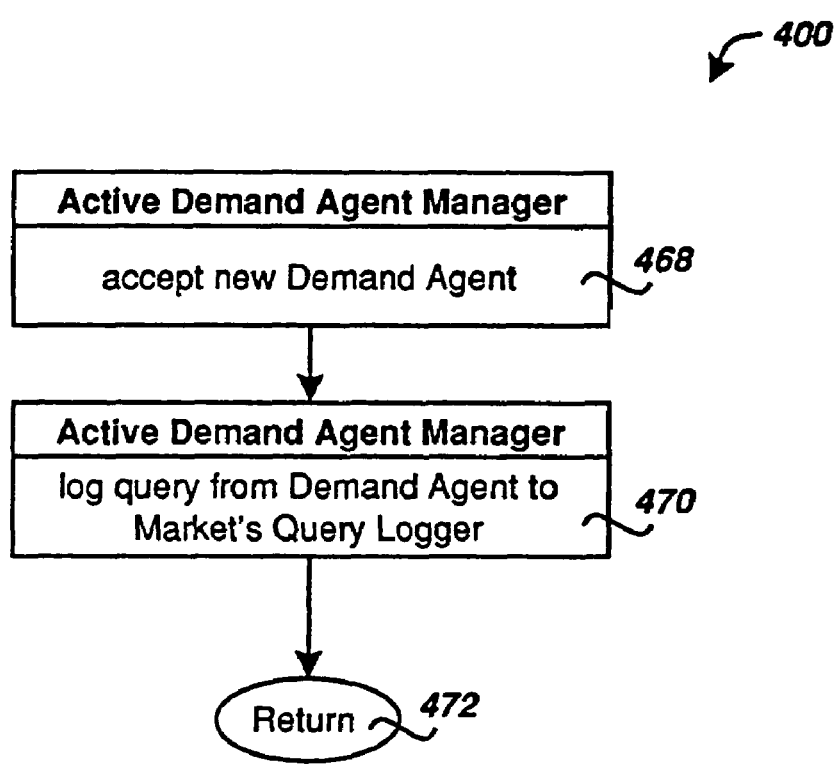
FIG. 24 is a flow diagram representation of a method for accepting a new Demand Agent into a Market.

Referring again to FIG. 21, Demand Agent Factory 84 delivers the new Demand Agent to the specified Market (step 398), where an Accept New Demand Agent subroutine is invoked (step 400). Referring now to FIG. 24, an Accept New Demand Agent subroutine is referred to generally by reference numeral 400. Active Demand Agent Manager 132 of the Market accepts the new agent, and logs the query from the agent to the Market's Query Logger 136 function (steps 468-470).

Figure 25:
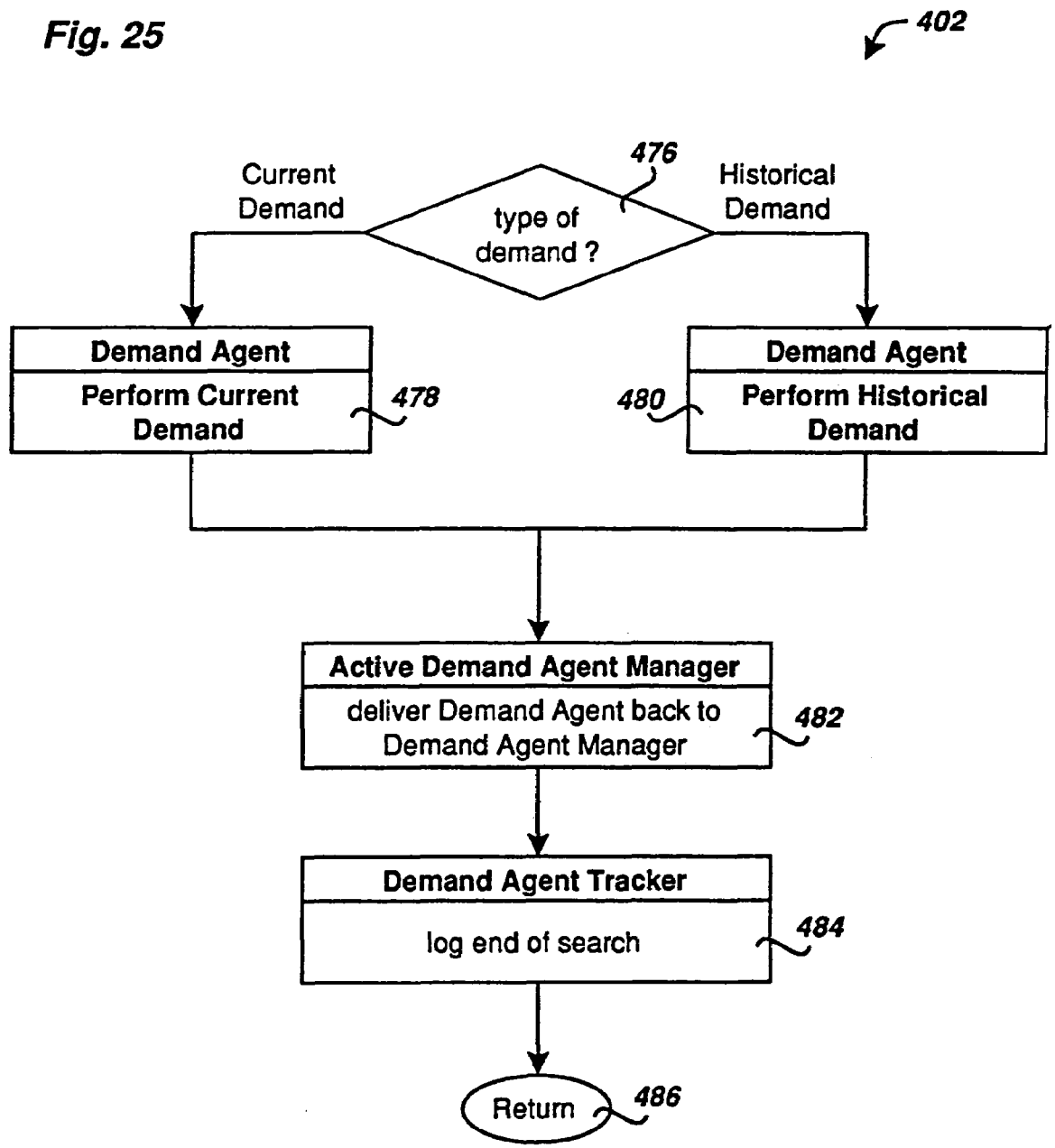
FIG. 25 is a flow diagram representation of a method for performing a Demand search.

Referring back to FIG. 21, Demand Agent 16 is now ready to perform the search for Decision Agents 14 that satisfy the provider's criteria, so it invokes a Perform Demand Search subroutine (step 402). Referring to FIG. 25, a Perform Demand Search subroutine is referred to generally by reference numeral 402. Demand Agent 16 determines if the search is for current or historical demand, and invokes an appropriate subroutine, either a Perform Current Demand subroutine, or a Perform Historical Demand subroutine (steps 476-480).

Figure 26:
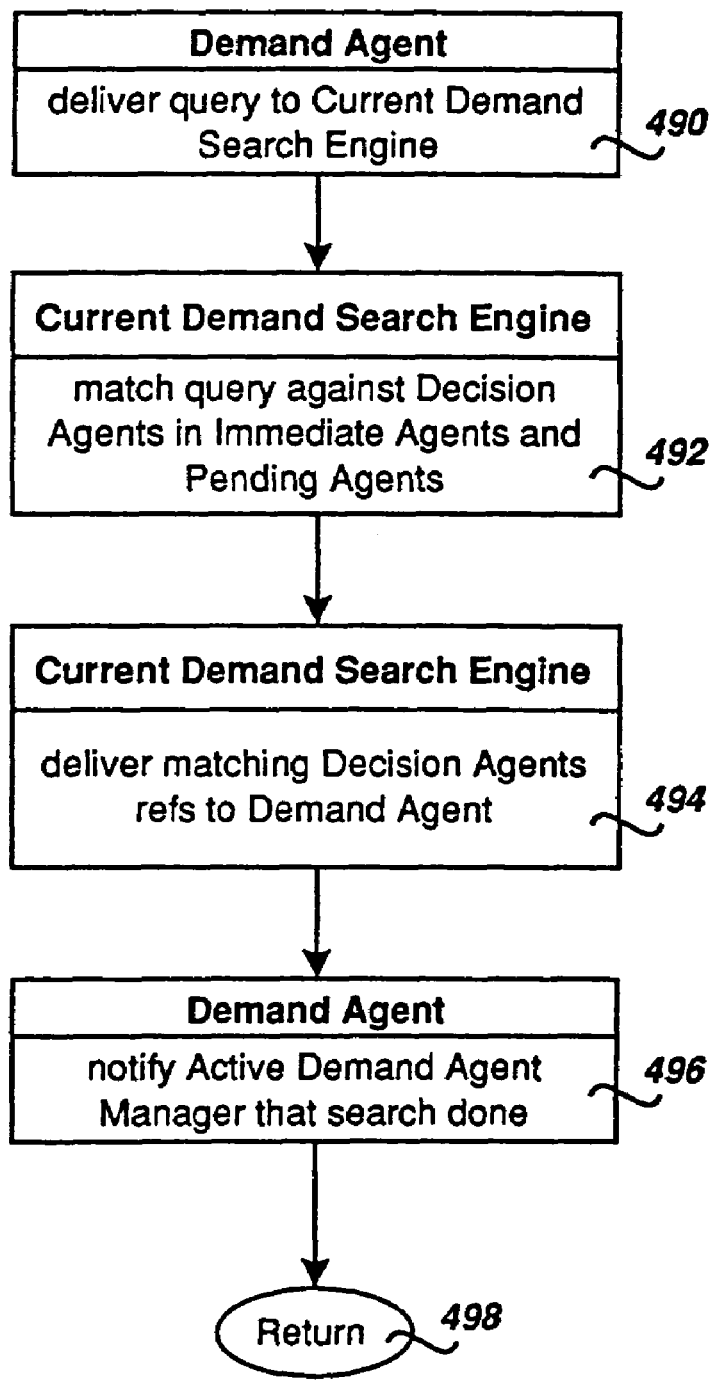
FIG. 26 is a flow diagram representation of a method for performing a search for current demand.

Referring now to FIG. 26, a Perform Current Demand subroutine is referred to generally by reference numeral 478. Demand Agent 16 delivers its query to a Current Demand Search Engine 164 (step 490). Current Demand Search Engine 164 matches the query, using conventional database techniques, against the Decision Agents that are listed in Immediate Agents 156 and Pending Agents 160 (step 492), as these Decision Agents are the ones that are currently searching for products. During the search, Current Demand Search Engine 164 collects references to Decision Agents 14 whose queries satisfy the query of the Demand Agent 16. For example, if the Demand Agent is looking for consumers who are currently looking for sports shoes, the Current Demand Search Engine will collect references to Decision Agents that are searching for sports shoes. Current Demand Search Engine 164 delivers the collected list of references to the Demand Agent (step 494). When the search is complete, Demand Agent notifies Active Demand Agent Manager 132 that the search is complete (step 496).

Figure 27:
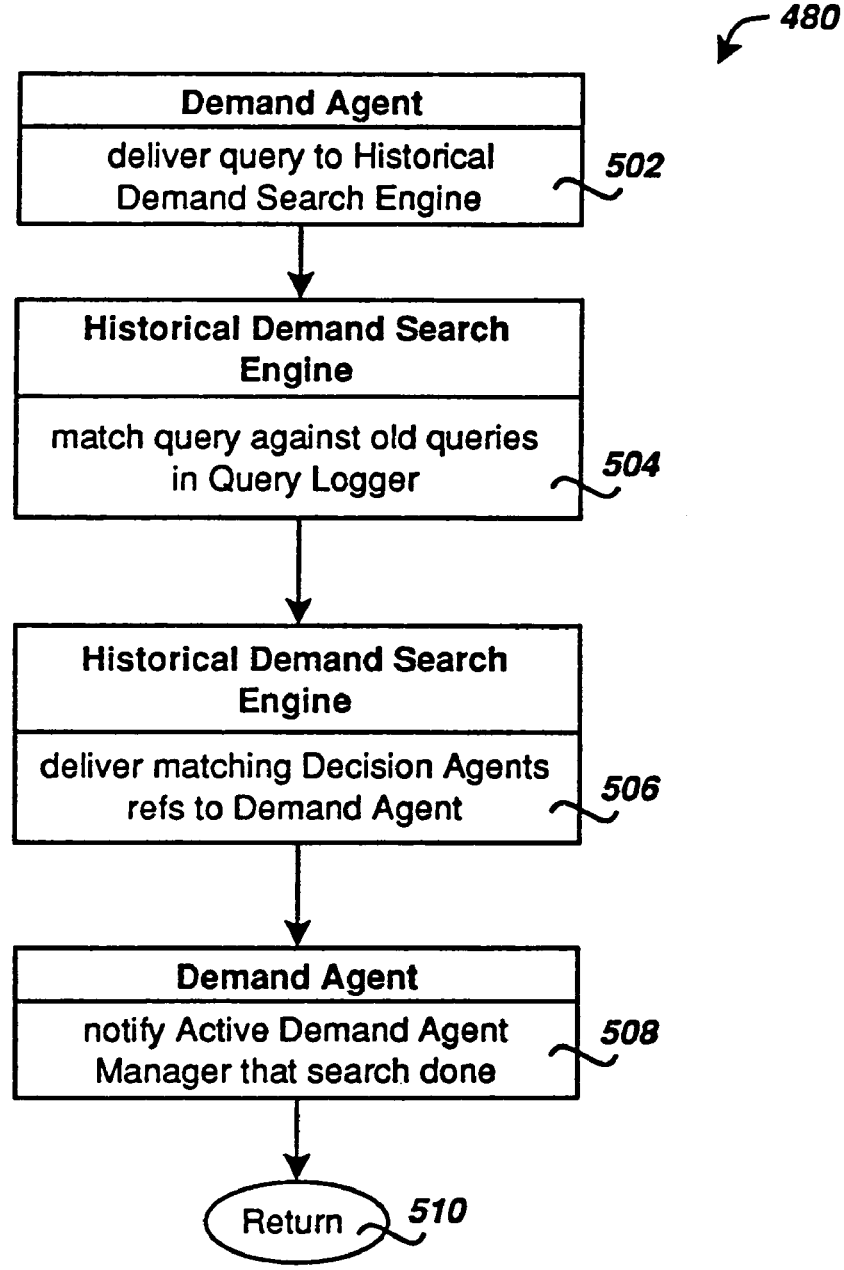
FIG. 27 is a flow diagram representation of a method for performing a search for historical demand.

Referring now to FIG. 27, a Perform Historical Demand subroutine is referred to generally by reference numeral 480. Demand Agent 16 delivers its query to an Historical Demand Search Engine 138 (step 502). Historical Demand Search Engine 138 matches the query, using conventional database techniques, against the expired queries that are kept in Query Logger 136 (step 504). During the search, Historical Demand Search Engine 138 collects references to expired queries, and the Decision Agents to which they belong, that were active during the specified datetime range of the Demand Agent's query and that otherwise satisfy the Demand Agent's query. Historical Demand Search Engine 138 delivers the collected list of references to the Demand Agent (step 506). When the search is complete, Demand Agent notifies Active Demand Agent Manager 132 that the search is complete (step 508).

Referring back to FIG. 25, the search is complete, so Active Demand Agent Manager 132 delivers the Demand Agent back to Personal Agent's Demand Agent Manager 62 (step 482), and Personal Agent's Demand Agent Tracker 86 logs the search completion (step 484). The demand search results are held by the Demand Agent 16 until the provider's desired delivery time (which may be immediately if the provider has so requested).

Figure 28:
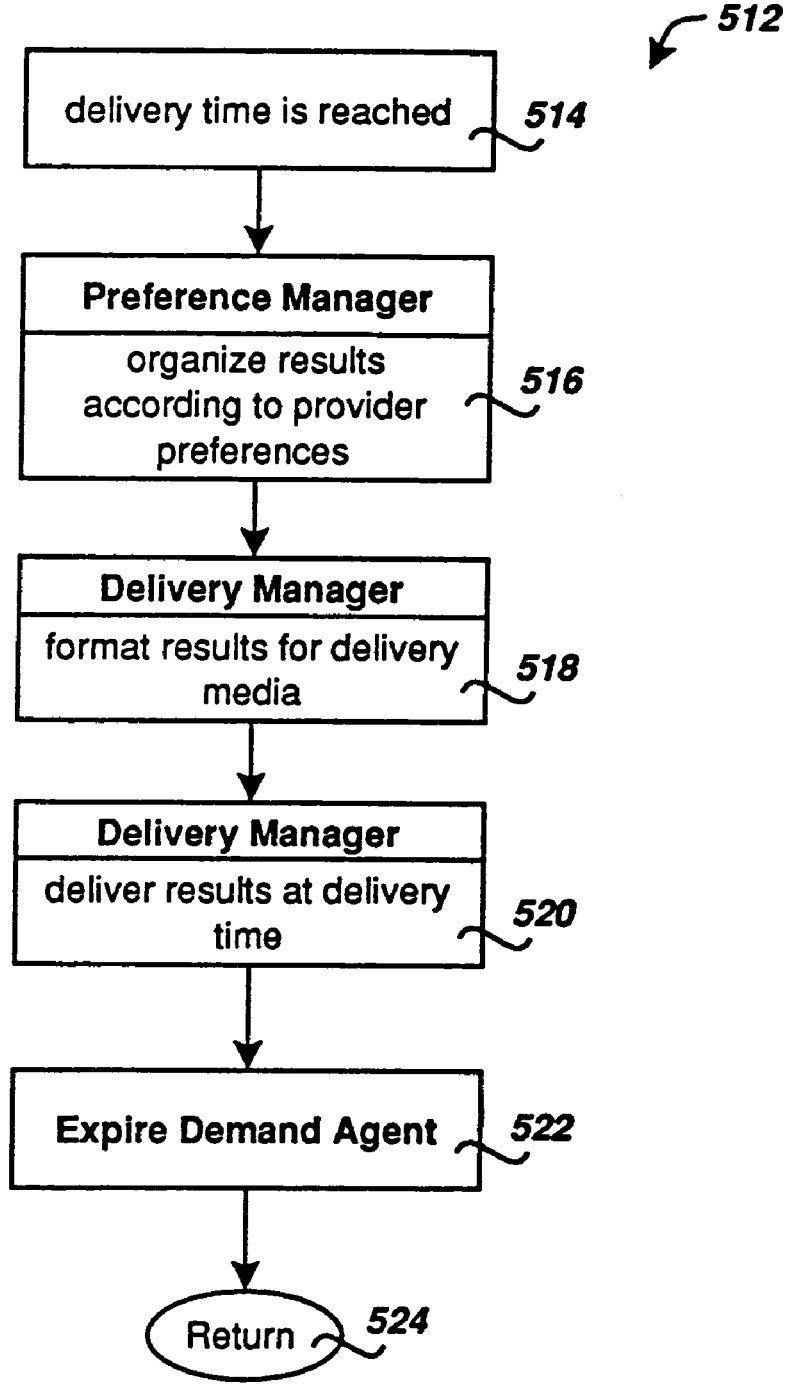
FIG. 28 is a flow diagram representation of a method for delivering Demand search results to a provider.

The search has now ended. It remains for Demand Agent 16 to deliver the demand search results to the provider. Referring to FIG. 28, a Deliver Demand Results subroutine is referred to generally by reference numeral 512. When the desired delivery time is reached (step 514), Preference Manager 54 organizes the not-yet-delivered results according to the provider's preferences (step 516). For example, the provider may prefer to see only numeric totals, or the provider may prefer to see a detailed listing of all the Decision Agent queries that satisfied the demand search. Delivery Manager 56 formats the responses according to the provider's desired delivery media (step 518). For example, if the provider's desired delivery media is the Web, a Web page in HTML is generated. If the provider desires e-mail delivery, a suitable representation is generated. When formatting is complete, Delivery Manager 56 arranges the actual delivery of the search results (step 520). The Demand Agent has completed its task, so it can be expired (step 522).

Figure 29:
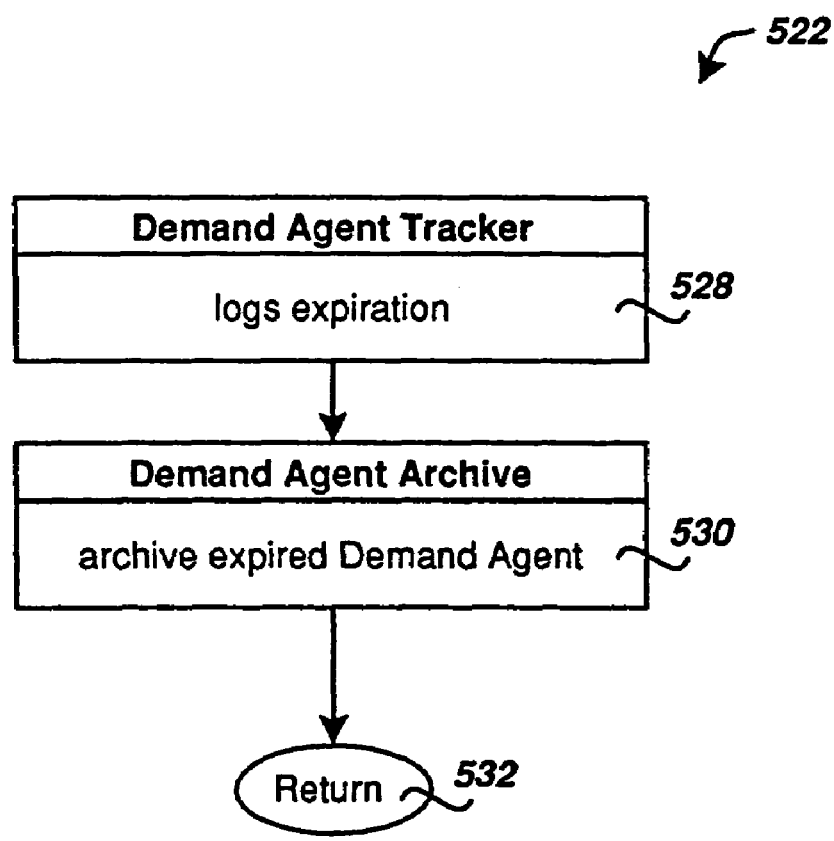
FIG. 29 is a flow diagram representation of a method for expiring a Demand Agent that has completed its task.

Referring to FIG. 29, an Expire Demand Agent subroutine is generally referred to by reference numeral 522. The Demand Agent Tracker 86 notes that the agent is now expired (step 528), and the agent is permanently archived in Demand Agent Archive 88 (step 530).

Place Ad

Figure 30:
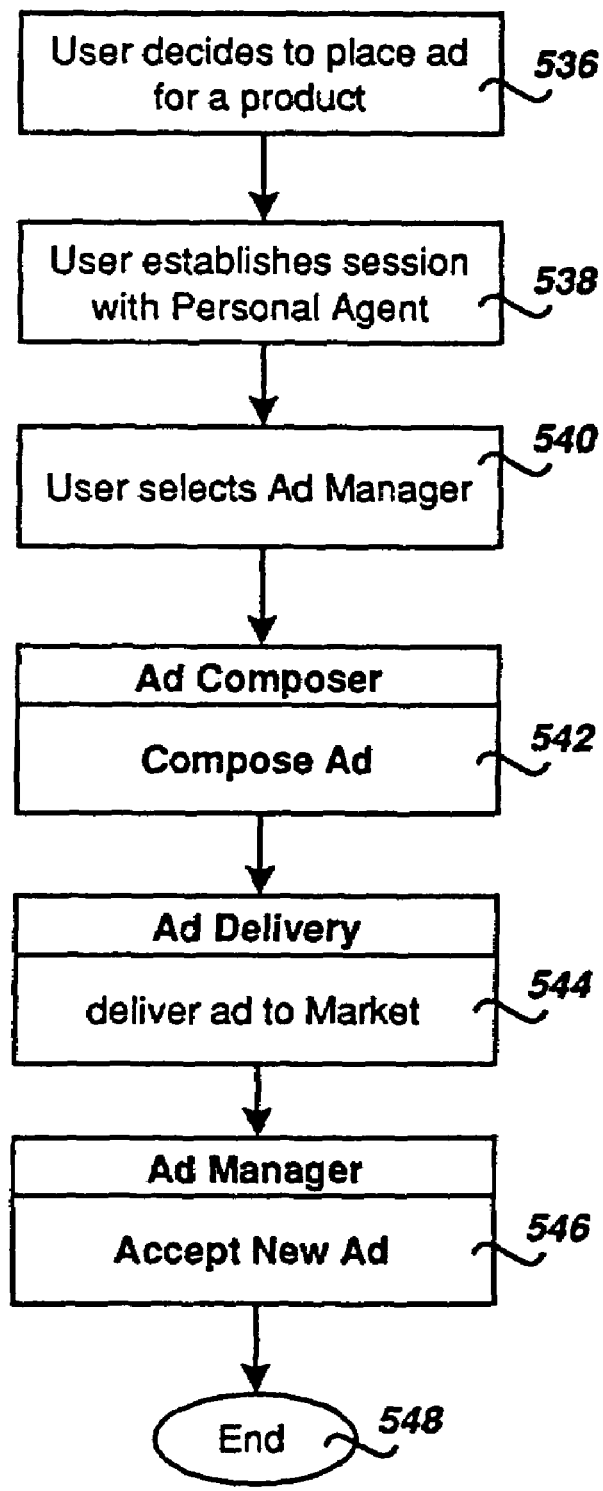
FIG. 30 is a flow diagram representation of an overall method for placing an Ad in a Market.

Both providers and consumers may place ads in Agent System 10. An advertisement may be an offer to sell or an offer to buy. A placed advertisement becomes effective at a particular time and expires at a particular time, and searching Decision Agents consider an advertisement only during the ad's effective time. Even after ads expire, they may be accessed for historical reasons. Users may place ads manually, or they may cause ads to be loaded from or referenced from remote systems via a remote database adapter. Referring to FIG. 30, an overall method according to the present invention for placing a sell or buy advertisement is referred to generally by reference numeral 534. When a provider (a user acting in the role of a provider) desires to place an advertisement manually within Agent System 10 for a product, the provider establishes a communication session with provider's Personal Agent 13 (steps 536-538). Typically the provider, using a personal computer, connects to provider's Internet access provider, directs provider's Web browser software to Agent System's electronic address (known as a URL), and enters a login name and password. A sample login screen has already been illustrated in FIG. 39.

Referring to FIG. 30, the provider invokes Sell Ad Manager 128 or Buy Ad Manager 130 as appropriate (step 540) to supervise the subsequent steps of placing the advertisement. A Compose Ad subroutine of Ad Composer 90 is called to assist the provider in composing the advertisement (step 542).

Figure 31B:
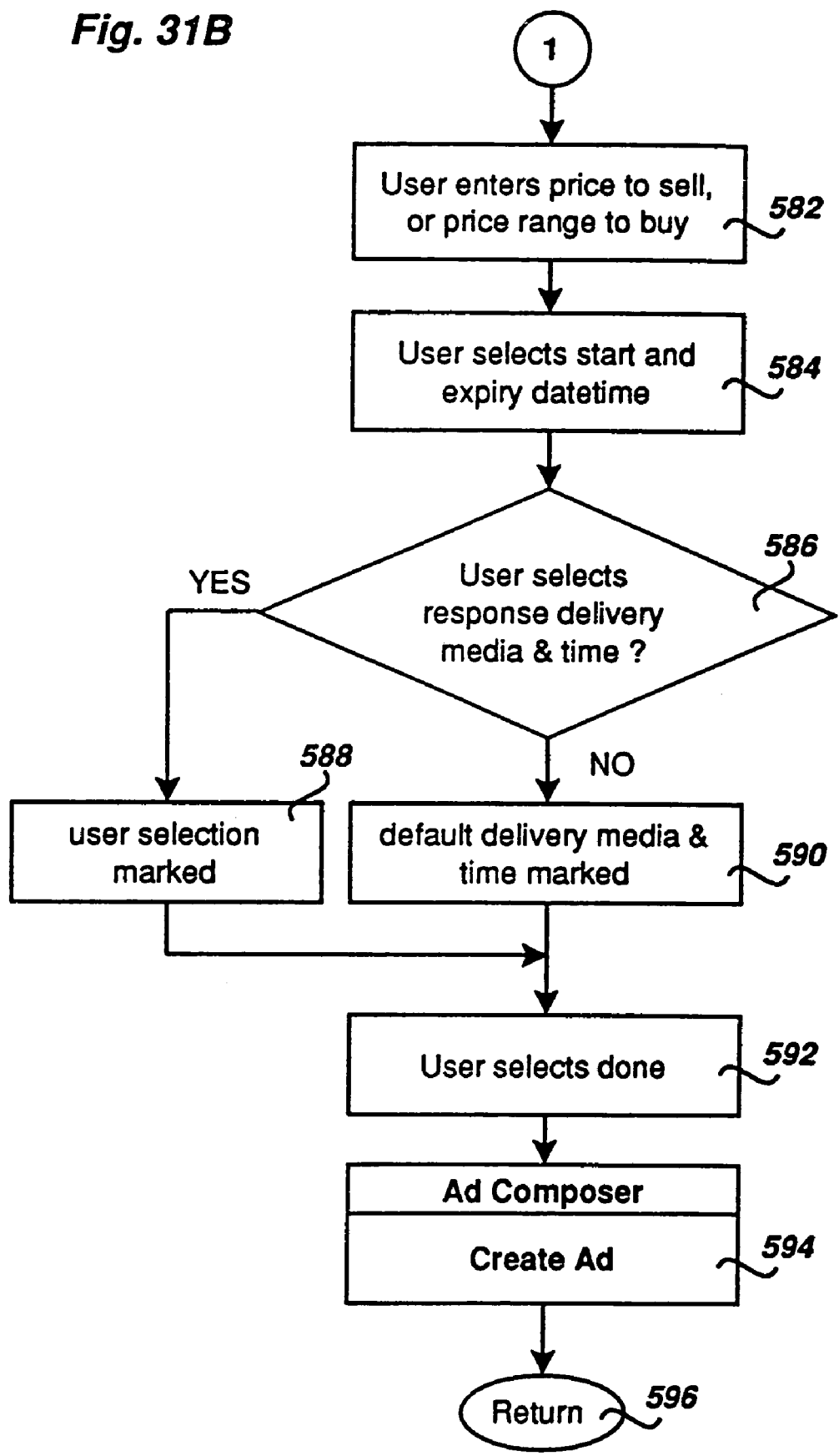

Referring now to FIG. 31, a Compose Ad subroutine is referred to generally by reference numeral 542. The provider selects the type of ad: a sell advertisement (an offer to sell) or a buy advertisement (an offer to buy) (step 552). If the provider wishes to compose an advertisement that is similar to a previously placed ad, Ad Archive 96 displays a list of expired ads from Ad Archive 96 from which the provider may select (steps 554-558). Ad Composer 90 retrieves the Product Template mentioned in the selected ad, and also the current instructions, from the Market mentioned in the selected advertisement (step 560). The values from the selected advertisement are used to initialize the new advertisement (step 562).

Still referring to FIG. 31A, if the provider alternatively wishes to specify an entirely new ad, the provider selects a Market 18 in which the advertisement will be placed (step 564). If the selected Market is a Restricted Market for which the provider is not authorized, an error message is displayed to the provider, and the provider is returned to the initial menu where another action may be selected (steps 566-570). If the provider is authorized for the restricted Market, or if the Market is not restricted, the provider selects a product for which to search (steps 568-574). Ad Composer 90 retrieves Product Template and instructions from the Market's Template Dispenser 134 (step 576). If the particular product is not listed in the Market, the provider instead indicates a "generic" ad, and Template Dispenser 134 supplies a generic template that can be used for any product suitable for the Market.

Ad Composer 90 arranges to format and display the Product Template and the instructions (step 578). The provider, following the instructions, selects and enters values describing the product in the Product Template (step 580), adding additional description if desired. When the provider's interface is a Web browser, the Product Template is typically displayed as a combination of fill-in fields, selection-lists, radio buttons, etc. as illustrated in the sample screen of FIG. 42.

Referring again to FIG. 31B, the provider enters the price for the product (step 582). Generally, a sell advertisement will contain a specific price for the product, while a buy advertisement will contain a price range. The provider specifies the datetime that the advertisement should become effective and the datetime that the advertisement should expire (step 584). This allows providers to compose batches of ads ahead of time, for example with lower prices during a sale, and arrange for the ads to become affective when the sale starts. For receiving responses to the ad, the provider may select a delivery media (e-mail, Web page display, etc.) and a delivery time and period (e.g., immediately, 6:00 p.m. daily, Monday noon weekly, etc.), or default media and time is noted (steps 586-590). At this point the advertisement composition is complete (step 592), and Ad Composer 90 can create the actual advertisement with a Create Ad subroutine (step 594).

Figure 32:
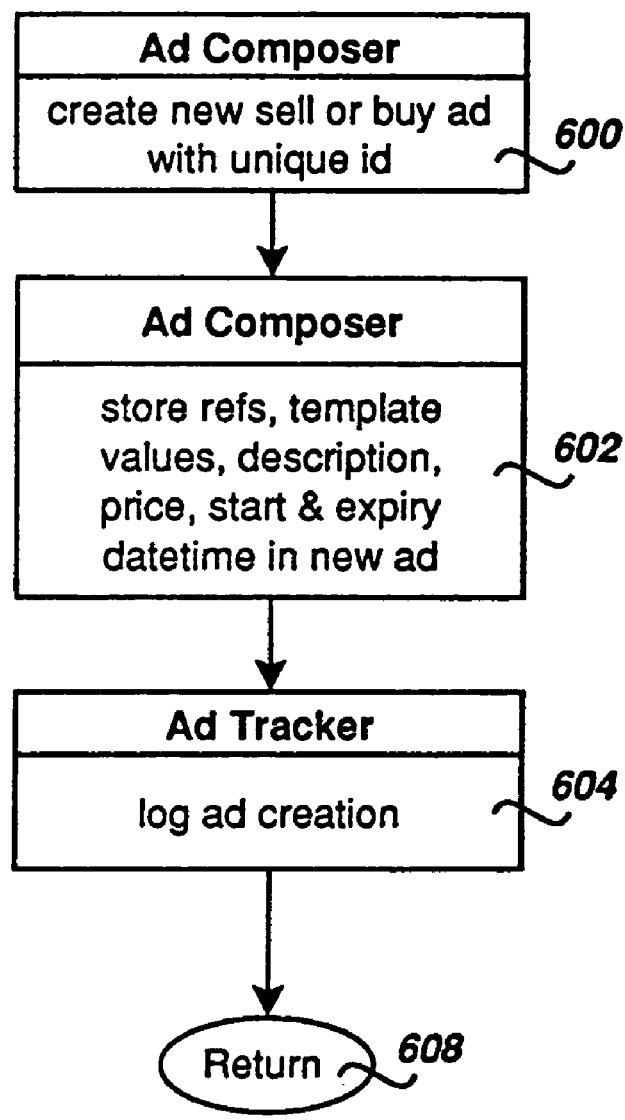
FIG. 32 is a flow diagram representation of a method for creating an Ad.

Referring now to FIG. 32, a Create Ad subroutine is referred to generally by reference numeral 594. Ad Composer 90 creates a new Ad 186 possessing a unique identifier (step 600). This unique identifier can be used to access Ad 186 even after the advertisement has expired. Ad Composer 90 indicates that this is a buy advertisement or sell advertisement. Ad Composer 90 also inserts values (step 602) for the other data components as specified by the provider in previous steps: Template Values, Description, Price, Start and Expiry Datetime. Ad Composer 90 inserts references to the Personal Agent 12 or 13 that is controlling the advertisement creation, and to the Personal Agent 12 or 13 of the principal (buyer or seller). Ad Composer 90 notes in which Market 18 the advertisement is to be placed, and inserts a reference to the standard data about the product from the Product Listing 124. Ad Tracker 94 logs the creation of the new Ad 186 (step 604). Now the new Ad is ready to be delivered.

Referring again briefly to FIG. 30, Ad Delivery function 92 delivers the newly created Ad 186 to the Sell Ad Manager 128 or Buy Ad Manager 130, as appropriate, of the provider's chosen Market (step 544), and the Ad Manager invokes an Accept New Ad subroutine to incorporate the new advertisement (step 546).

Figure 33:
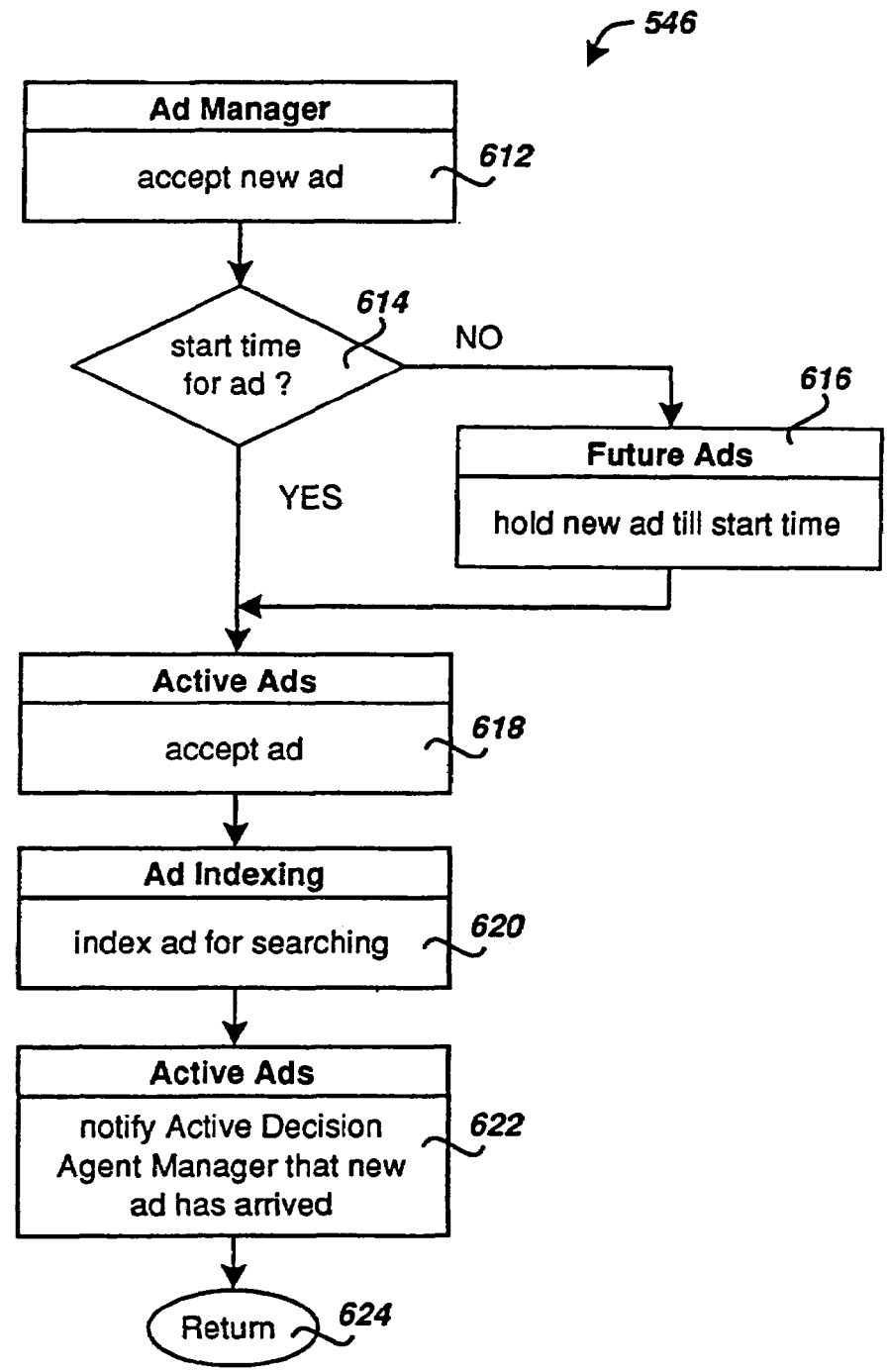
FIG. 33 is a flow diagram representation of a method for accepting a new Ad into a Market.

Referring now to FIG. 33, an Accept New Ad subroutine is referred to generally by reference numeral 546. Sell Ad Manager 128 or Buy Ad Manager 130, as appropriate, accepts the Ad 186 and checks the ad's Start Datetime to see if the advertisement should become active (effective) now. (steps 612-614). If it is not time for the advertisement to become effective, the advertisement is passed to Future Ads 148, which holds the advertisement until the appropriate future time (step 616). Future Ads arranges to give the advertisement back to the appropriate Ad Manager for activation at the appropriate time.

If it is time for the advertisement to become active, Active Ads 146 inserts the advertisement into its internal queue and Ad Indexing 144 indexes the advertisement for searching (steps 618-620). Active Ads notifies Active Decision Agent Manager 152 that a new advertisement has arrived (step 622), so that ongoing extended searches may be matched against the new advertisement.

Once Ad 186 is in Active Ads 146, the advertisement is available for searching by Decision Agents 14 that are looking for products. The advertisement remains available for searching until its Expiry Datetime is reached, when Ad Manager invokes an Expire Ad subroutine.

Figure 34:
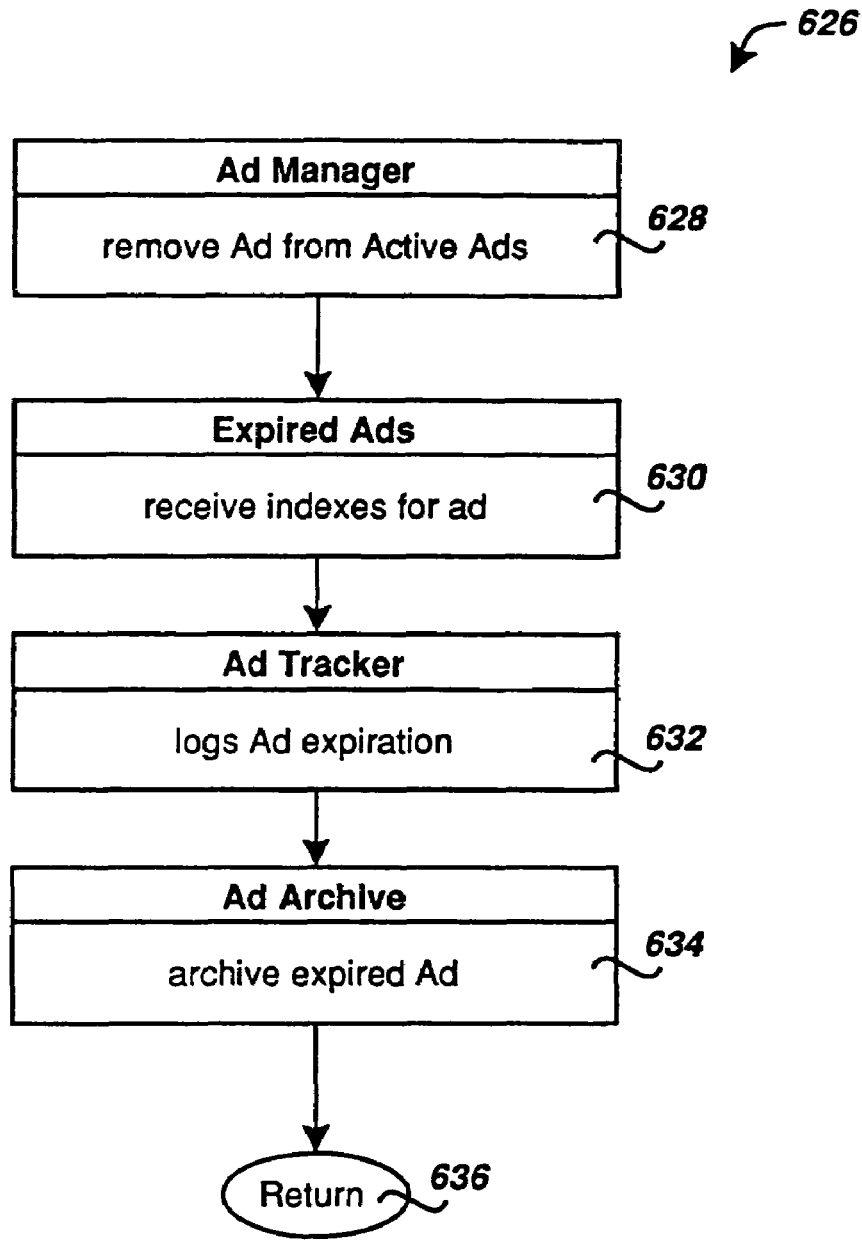
FIG. 34 is a flow diagram representation of a method for expiring an Ad that has reached its expiry time.

Referring now to FIG. 34, an Expire Ad subroutine is referred to generally by reference numeral 626. Sell Ad Manager 128 or Buy Ad Manager 130, as appropriate, removes the Ad 186 from Active Ads 146 so that the advertisement is no longer visible to searching Decision Agents 14 (step 628). The indexes for the advertisement are transferred to Expired Ads 150 (step 630) to make historical searches easier. Ad Tracker 94 logs the expiration of the advertisement (step 632). Ad Archive 96 permanently archives the advertisement (step 634). Even though the advertisement is expired, it can still be referenced out of the Ad Archive for historical searches.

Target Consumers

To "target" a message is to select message recipients according to certain criteria intended to yield recipients that are interested in receiving the information, as opposed to delivering the message to a wider audience where fewer recipients are truly interested in the information. Within Agent System 10, targeting consumers is a process of targeting Personal Agents 12 that represent consumers that satisfy the desired criteria. Providers use the targeting process, for example, to send ads to consumers that have previously searched in a particular Market 18 or for a particular product. Providers may also use targeting to offer a product at a different price to a different groups of consumers. Providers might also send market surveys, brand name awareness notices, etc.

Providers can also target consumers who have recently searched a Market 18 to deliver a "reason for sale" or "lost sales" questionnaire. The questionnaire inquires if the consumer actually bought a product, and if the purchased product was the one offered by the inquiring provider or some other provider. The questionnaire typically includes a list of sales reasons, that is, reasons why the consumer purchased the product or purchased from the inquiring provider. For example, some sales reasons are: price suitable, available in desired color, a particular special feature, etc. The questionnaire also typically includes a list of lost sales reasons, that is, reasons why the consumer purchased a competing product or purchased from another provider. For example, some lost sales reasons are: price too high, prefer another brand, store location not convenient, etc. The questionnaire may also include a place for general comments from the consumer. By analyzing returned questionnaires, the provider gains valuable information about why a sale was gained or why a competitor got the sale.

Figure 35:
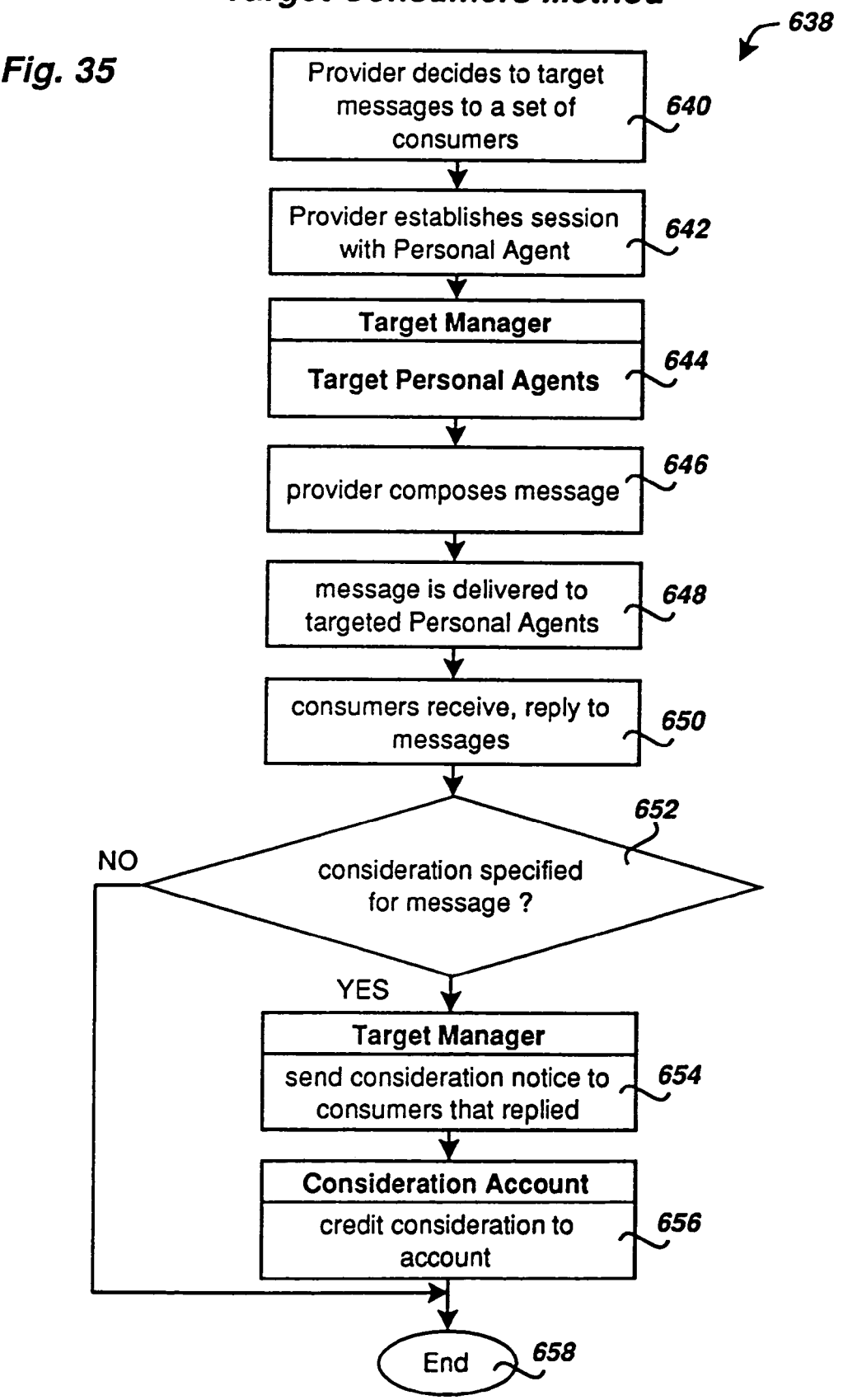
FIG. 35 is a flow diagram representation of an overall method for targeting a group of consumers.

Referring to FIG. 35, an overall method according to the present invention for targeting consumers is referred to generally by reference numeral 638. When a provider (a user acting in the role of a provider) desires to target a message to a select group of consumers, the provider establishes a communication session with provider's Personal Agent 13 (steps 640-642). Typically the provider, using a personal computer, connects to provider's Internet access provider, directs provider's Web browser software to Agent System's electronic address (known as a URL), and enters a login name and password. A sample login screen has already been illustrated in FIG. 39.

Figure 36:
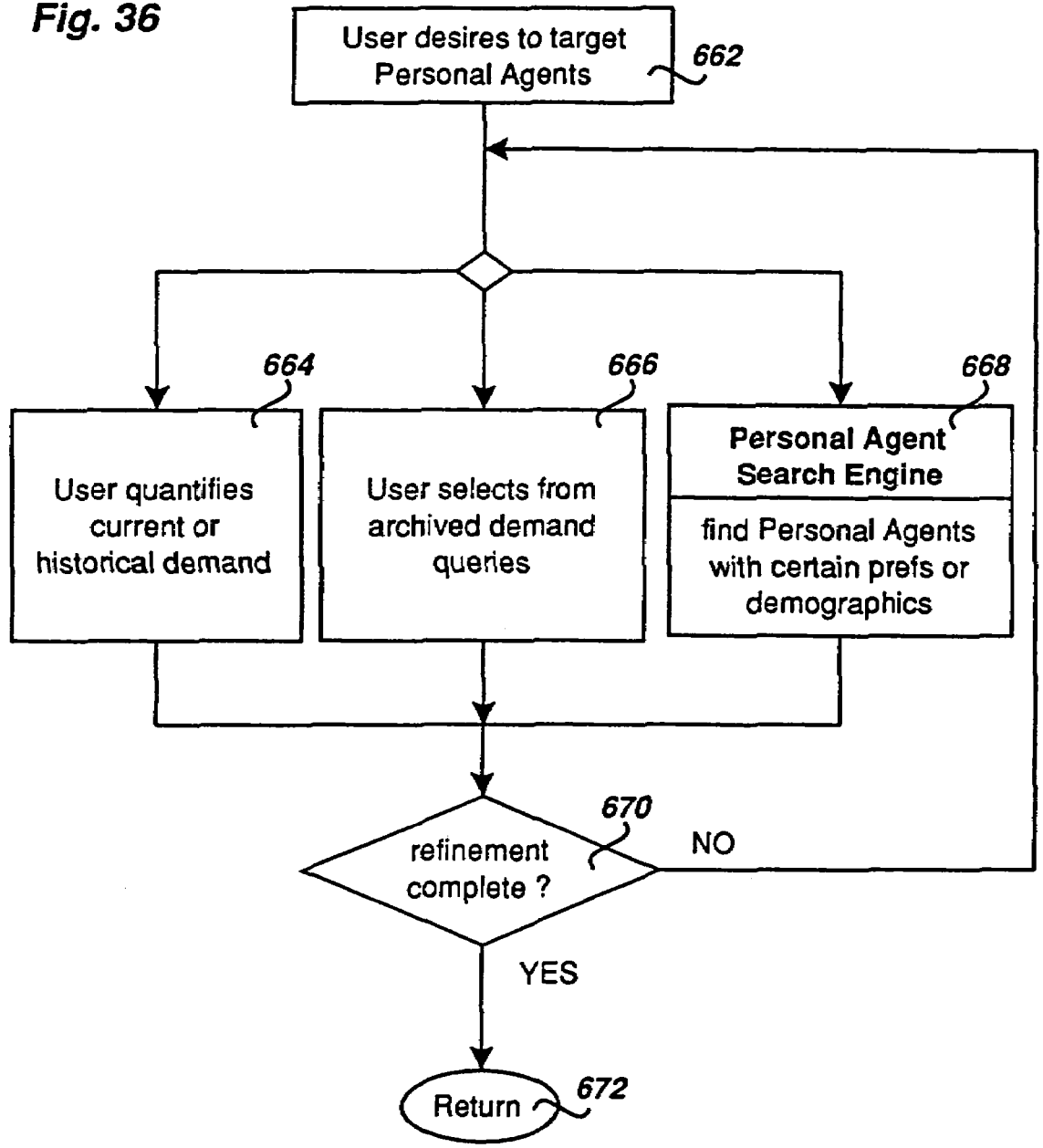
FIG. 36 is a flow diagram representation of a method for selecting Personal Agents that represent targeted consumers.

Referring again to FIG. 35, Target Manager 66 assists the provider in identifying the target set of Personal Agents that will receive the message by invoking a Target Personal Agents subroutine. Referring to FIG. 36, a Target Personal Agents subroutine is referred to generally by reference numeral 644. The provider executes a process of refinement (steps 662-670) to collect references to appropriate Personal Agents.

The provider may start by quantifying demand, previously described in conjunction with FIG. 21, and use the set of consumer Personal Agents 12 thereby identified. For example, the provider may quantify current demand for sports shoes, and collect the Personal Agents that currently have Decision Agents that are looking for sports shoes.

Alternatively, the provider may select, from Demand Agent Archive 88, a Demand Agent 16 that previously identified an appropriate set of consumer Personal Agents 12.

As yet another alternative, the provider may use Personal Agent Search Engine 26 to collect references to a set of consumer Personal Agents 12 that have certain preferences or demographic characteristics. For example, the provider may search for Personal Agents that list a preference for a certain favorite brand, or for Personal Agents whose owners are males between the ages of 25 and 40. Personal Agent Search Engine 26 also identifies Personal Agents that are willing to accept unsolicited notices only if accompanied by a consideration. In this context, Personal Agent Search Engine 26 automatically filters out Personal Agents that belong to persons or organizations that are no longer users of the system.

The provider may keep applying search criteria to filter the set of consumer Personal Agents 12 at will, until the provider is satisfied that an appropriate set has been identified. By choosing suitable search criteria, the provider may also select a set of consumers to quantify anticipated or future demand. For example, the provider may select consumers that have recently searched a real estate market, and anticipate that those consumers will soon desire mortgage lending information.

Referring again to FIG. 35, the provider composes the actual message to be sent (step 646). For example, if the provider wants to send an ad, the provider may use the Ad Composer 90 to assist in the composition, using a Compose Ad subroutine previously described. Other notices, messages, consumer surveys, etc. could also be composed (not shown) for delivery.

The message is delivered to each consumer Personal Agent 12 that was identified with the help of Target Manager 66 (step 648). For example, if the message is an ad, Ad Delivery 92 arranges the delivery.

Consumers receive the messages via their Personal Agents 12 and compose replies if they wish (step 650). This may involve filling out an on-line form presented by the provider. The replies are sent back to the originating provider.

The provider may have specified a consideration amount to be paid to consumers that reply to the message (step 652). If so, Target Manager 66 arranges to send a consideration notice to the consumer Personal Agent 12 of each consumer that replies (step 654). Consideration Account 67 of each consumer receiving a consideration notice credits the consideration account with the amount of the consideration (step 656).

Reject Unsolicited Message

Even unsolicited advertisements and other unsolicited messages that are rejected by a consumer's Personal Agent 12 become sources of market data to a provider, if the rejection generates a rejection reason back to the provider.

Referring to FIG. 37, an overall method according to the present invention for rejecting an unsolicited message is referred to generally by reference numeral 674. When a consumer's Delivery Manager 56 receives an ad, market survey, notice, or other message that is unsolicited, Delivery Manager 56 matches the data in the message against the preferences maintained by Preference Manager 54 (steps 676-678). If the message content does not violate any of the consumer's preferences, the message is delivered by Delivery Manager 56 in the usual fashion according to the delivery media and delivery time preferences of the consumer (step 682).

If, however, the message content violates the consumer's preference in some way, Delivery Manager 56 composes a rejection message indicating the reason for rejection, and sends the rejection message back to the Personal Agent 13 of the provider that originated the unsolicited message (steps 684-686).

For example, if a provider sends, to Personal Agent 13, an unsolicited advertisement about sports shoes, specifying a consideration amount of fifty cents, and the user has previously specified a consideration preference of seventy-five cents, Delivery Manager 56 will reject the advertisement and reply with a rejection message indicating that the consideration amount must be at least seventy-five cents.

As another example, perhaps a provider sends an unsolicited advertisement about a Chinese food dinner, and the advertisement does not specify the MSG content of the food. If the user has specified a preference for "no MSG", Delivery Manager 56 will reject the advertisement and reply with a rejection message indicating that the consumer prefers food without MSG.

The provider has gained valuable market information about consumer preferences, even though the provider's message was not successfully delivered.

Simulate Demand

Providers may also simulate demand using current market data. To simulate demand is to determine the demand for a hypothetical product or service, or for an actual product or service with different features or pricing.

Figure 38A:
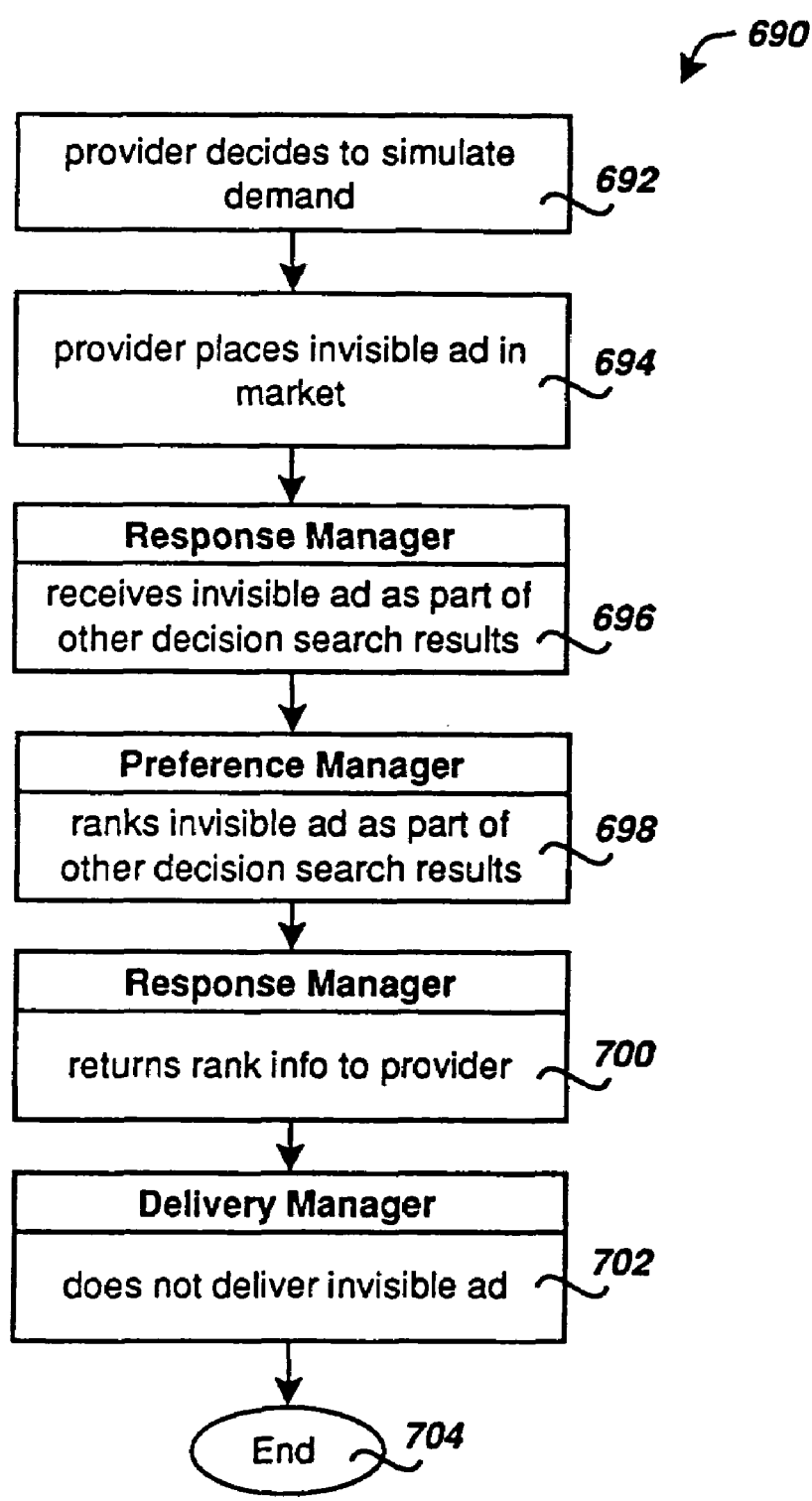
FIGS. 38A-B is a flow diagram representation of an overall method for simulating demand and for replaying demand.

Referring to FIG. 38A, when a provider decides to simulate demand for a product, the provider composes and places an Ad 186 in a Market 18 in the regular fashion, but the provider additionally marks the Ad as "invisible" (step 694). The provider composes the Ad to represent the hypothetical product, or the product with different features or pricing. The Ad is (during its effective datetime) available to be matched by consumers' Decision Agents 14 performing decision searches.

When a searching Decision Agent 14 matches the invisible Ad 186, the Ad is referred to the Response Manager 108 and the Preference Manager 54 ranks the Ad in the normal fashion (steps 696-698). However, because the Ad is marked invisible, the Response Manager additionally sends a reply to the provider indicating that the invisible Ad was matched by a Decision Agent 14, and indicating the ranking of the invisible Ad (step 700). The Ad 186 reference is not removed from the Decision Agent 14, but remains with the other Ad references of the Decision Agent in the normal fashion. When Delivery Manager 56 is preparing search results for delivery to the consumer, it does not include the invisible Ad (step 702), so that the consumer remains unaware that the invisible Ad existed. The provider has collected valuable market data without annoying the consumers who generated the data.

Figure 38B:
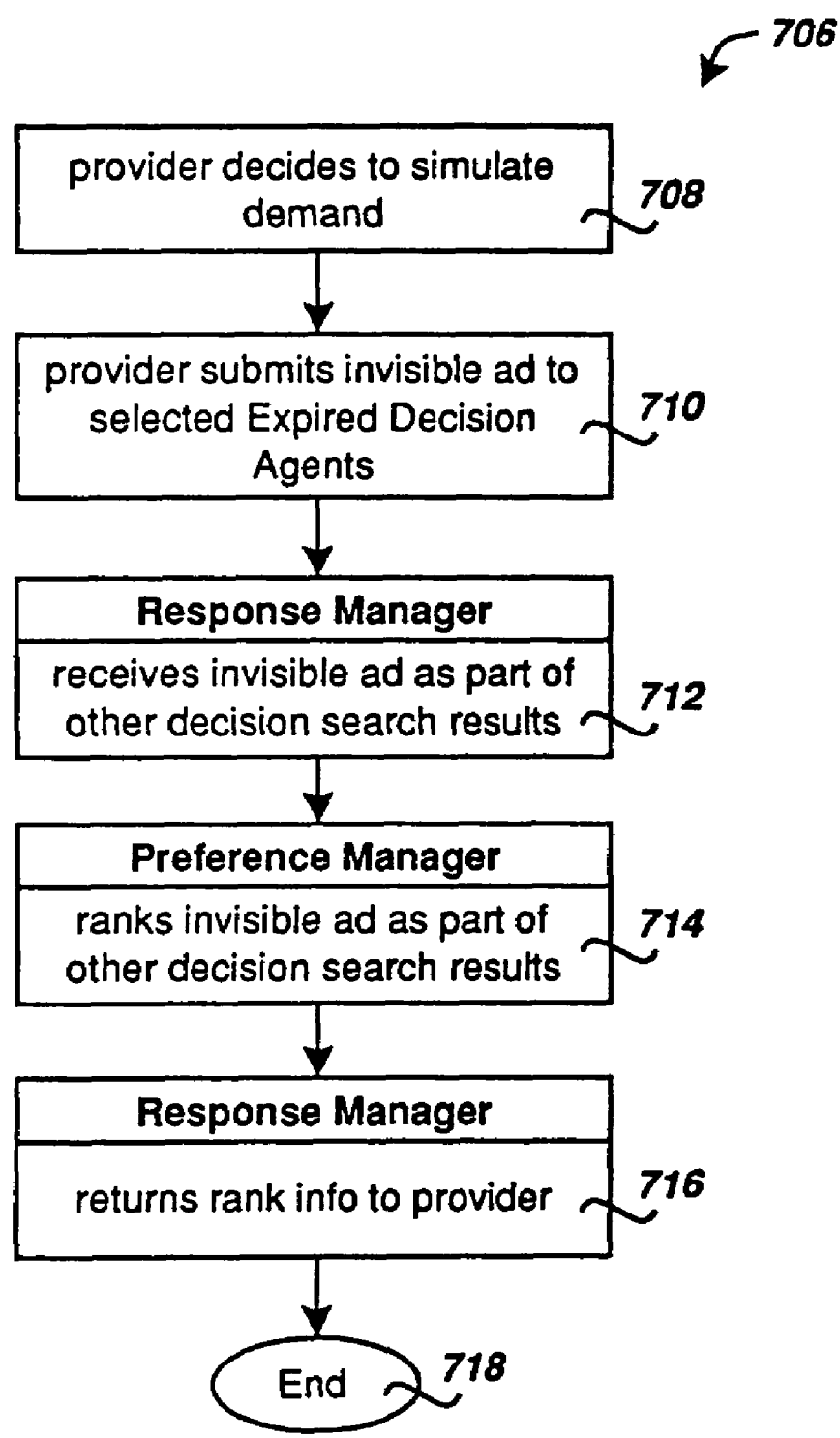

Referring to FIG. 38B, a variation of this process allows providers to "replay" a product offering, that is, to estimate what effect an advertisement would have had if, for example, the price had been lower. This process variation matches the invisible advertisement against expired Decision Agents 14 over a datetime range.

Other Embodiments

The foregoing description is of a preferred embodiment of the invention. Other embodiments are anticipated. For example, it is expected that future embodiments of the invention will use a variety of communication devices, such as, but not limited to, facsimile machines, pagers, Personal Digital Assistants (PDAs), Network Computers (NCs), postal mail, telephone voice recognition, satellite links, video cable, etc.

It is also anticipated that, in the future, the system will further comprise actual purchase transactions.

It is also anticipated that additional kinds of data will be collected by the system, and additional methods of analysis of such data will be developed.

CONCLUSION

From the foregoing it will be seen that this invention is well adapted to attain all of the ends and objectives hereinabove set forth, together with other advantages which are inherent to the apparatus.

It will be understood that certain features and sub-combinations are of utility and may be employed without reference to other features and sub-combinations. This is contemplated by and is within the scope of the claims.

The foregoing description of the preferred embodiment of the invention has been presented for the purposes of illustration and description. It is not intended to be exhaustive or to limit the invention to the precise form disclosed. Many modifications and variations are possible in light of the above teaching.

The invention claimed is:

1. A method comprising:
receiving one or more actual offerings for a product or service and one or more hypothetical offerings for a product or service from one or more providers;
receiving one or more inquiries from one or more consumers, each inquiry relating to a specified type of offering;
for each of the inquiries, identifying the offerings that match that inquiry;
for each of the inquiries, supplying the associated consumer with information that is a function of the actual offerings determined to match that inquiry, without regard to the hypothetical offerings determined to match that inquiry; and
for each hypothetical offering, supplying the associated provider with information that is a function of the inquiries determined to match that hypothetical offering.

2. A method according to claim 1, including configuring each of the offerings and inquiries to be an advertisement.

3. A method according to claim 1, wherein each actual offering is visible to and available to consumers; and
wherein each hypothetical offering is invisible to and unavailable to consumers.

4. A method according to claim 3, including configuring one of the hypothetical offerings to be for a hypothetical product or service.

5. A method according to claim 3, including configuring one of the hypothetical offerings to be for an actual product or service with a hypothetical price.

6. A method according to claim 1, wherein the identifying of offerings that match each inquiry includes associating with each matching offering an interest indication representing an estimated degree of relative interest thereof to the consumer associated with that inquiry; and
wherein the supplying the associated provider with information includes supplying the interest indications for the matching inquiries.

7. A method according to claim 6, including:
maintaining profile information within the electronic system for each of the consumers; and
determining the estimated degree of relative interest as a function of the profile information for the consumer associated with the inquiry being matched.

8. A method according to claim 7, including automatically modifying the profile information for each of the consumers as a function of at least one of the inquiries of that consumer and information supplied to that consumer in response to the inquiries of that consumer.

9. A method according to claim 1, including establishing a pseudo identity for at least one of the consumers; and
wherein the supplying of the associated provider with information includes structuring that information to exclude information which would permit that provider to determine an actual identity of the consumer having the pseudo identity.

10. A computer-readable medium encoded with logic operable, when executed by a computer processor, to perform the steps comprising:
receiving one or more actual offerings for a product or service and one or more hypothetical offerings for a product or service from one or more providers;
receiving one or more inquires from one or more consumers, each inquiry relating to a specified type of offering;
for each of the inquiries, identifying the offerings that match that inquiry;
for each of the inquiries, supplying the associated consumer with information that is a function of the actual offerings determined to match that inquiry, without regard to the hypothetical offerings determined to match that inquiry; and
for each hypothetical offering, supplying the associated provider with information that is a function of the inquiries determined to match that hypothetical offering.

11. The computer readable medium of claim 10, wherein each of the offerings and inquiries is an advertisement.

12. The computer readable medium of claim 10, wherein each of the actual offerings is visible to and available to consumers; and
wherein each of the hypothetical offerings is invisible to and unavailable to consumers.

13. The computer readable medium of claim 12, wherein one of the hypothetical offerings is for a hypothetical product or service.

14. The computer readable medium of claim 12, wherein one of the hypothetical offerings is for an actual product or service with a hypothetical price.

15. The computer readable medium of claim 10, wherein identifying of the offerings that match each inquiry includes associating with each matching offering an interest indication representing an estimated degree of relative interest thereof to the consumer associated with that inquiry; and
wherein supplying of the associated provider with information includes supplying the interest indications for the matching inquiries.

16. The computer readable medium of claim 15, further operable to perform the steps comprising:
maintaining profile information for each of the consumers; and
determining the estimated degree of relative interest as a function of the profile information for the consumer associated with the inquiry being matched.

17. The computer readable medium of claim 16, further operable to perform the steps comprising:
automatically modifying the profile information for each of the consumers as a function of at least one of the inquiries of that consumer and information supplied to that consumer in response to the inquiries of that consumer.

18. The computer readable medium of claim 10, further operable to perform the steps comprising:

establishing a pseudo identity for at least one of the consumers; and wherein supplying of the associated provider with information includes structuring that information to exclude information which would permit that provider to determine an actual identity of the consumer having the pseudo identity.

* * * * *